(12) United States Patent
Patterson et al.

(10) Patent No.: US 7,672,751 B2
(45) Date of Patent: Mar. 2, 2010

(54) SYSTEM AND METHOD FOR CONTROLLING TEMPERATURE OF A LIQUID RESIDING WITHIN A TANK

(75) Inventors: Wade C. Patterson, Huntsville, AL (US); Terry G. Phillips, Meridianville, AL (US)

(73) Assignee: A. O. Smith Corporation, Milwaukee, WI (US)

( * ) Notice: Subject to any disclaimer, the term of this patent is extended or adjusted under 35 U.S.C. 154(b) by 97 days.

(21) Appl. No.: 11/691,723

(22) Filed: Mar. 27, 2007

(65) Prior Publication Data

US 2007/0191994 A1 Aug. 16, 2007

Related U.S. Application Data

(63) Continuation of application No. 11/409,229, filed on Apr. 21, 2006, which is a continuation of application No. 10/772,032, filed on Feb. 4, 2004, now Pat. No. 7,065,431, which is a continuation of application No. 10/298,135, filed on Nov. 15, 2002, now abandoned.

(60) Provisional application No. 60/332,602, filed on Nov. 15, 2001, provisional application No. 60/353,546, filed on Jan. 31, 2002, provisional application No. 60/417,926, filed on Oct. 11, 2002.

(51) Int. Cl.
*G06F 19/00* (2006.01)

(52) U.S. Cl. .................................. 700/206; 700/282

(58) Field of Classification Search ................. 700/282, 700/299, 17, 29, 300, 206; 419/483, 490; 371/561; 432/36, 44
See application file for complete search history.

(56) References Cited

U.S. PATENT DOCUMENTS

| | | | |
|---|---|---|---|
| 3,787,729 A | 1/1974 | Bennett | |
| 4,333,002 A | 6/1982 | Kozak | |
| 4,511,790 A | 4/1985 | Kozak | |
| 4,522,333 A | 6/1985 | Blau, Jr. et al. | |
| 4,620,667 A | 11/1986 | Vandermeyden et al. | |
| 4,700,884 A * | 10/1987 | Barrett et al. | 236/12.12 |
| 4,837,713 A * | 6/1989 | Tahara et al. | 700/300 |
| 5,056,712 A | 10/1991 | Enck | |
| 5,103,078 A | 4/1992 | Boykin et al. | |
| 5,113,057 A | 5/1992 | Tsai | |

(Continued)

FOREIGN PATENT DOCUMENTS

| | | |
|---|---|---|
| WO | 03/044610 | 5/2003 |
| WO | 2007/100318 | 9/2007 |

OTHER PUBLICATIONS

Japanese Patent Abstract for Japanese Patent Application No. JP2003130458, published on May 8, 2003.
Japanese Patent Abstract for Japanese Patent Application No. JP2003290043, published on Oct. 14, 2003.
Patterson, et al., U.S. Appl. No. 10/772,032 entitled, "System and Method for Controlling Temperature of a Liquid Residing Within a Tank," filed Nov. 15, 2002.

*Primary Examiner*—Kidest Bahta
(74) *Attorney, Agent, or Firm*—Michael Best & Friedrich LLP

(57) ABSTRACT

A system for controlling a temperature of a liquid residing within a tank comprises a tank, a first heating element, a first switch, a temperature-based switch, and logic. The first heating element is mounted on the tank, and the temperature-based switch is coupled to the first heating element and to the first switch. The logic is configured to control a state of the first switch based on a temperature of a liquid residing in the tank.

9 Claims, 35 Drawing Sheets

U.S. PATENT DOCUMENTS

| | | | |
|---|---|---|---|
| 5,123,256 A | | 6/1992 | Oltman |
| 5,337,955 A | * | 8/1994 | Burd ..................... 236/91 F |
| 5,797,358 A | | 8/1998 | Brandt et al. |
| 5,805,856 A | | 9/1998 | Hanson |
| 5,808,277 A | | 9/1998 | Dosani et al. |
| 5,866,880 A | * | 2/1999 | Seitz et al. ................. 219/483 |
| 5,968,393 A | | 10/1999 | Demaline |
| 6,002,114 A | | 12/1999 | Lee |
| 6,053,130 A | | 4/2000 | Shellenberger |
| 6,064,801 A | * | 5/2000 | Stokes et al. ............... 392/501 |
| 6,212,894 B1 | | 4/2001 | Brown et al. |
| 6,216,956 B1 | | 4/2001 | Ehlers et al. |
| 6,246,831 B1 | | 6/2001 | Seitz et al. |
| 6,259,074 B1 | | 7/2001 | Brunner et al. |
| 6,265,699 B1 | | 7/2001 | Scott |
| 6,286,764 B1 | | 9/2001 | Garvey et al. |
| 6,293,471 B1 | | 9/2001 | Stettin et al. |
| 6,308,009 B1 | | 10/2001 | Shellenberger et al. |
| 6,350,967 B1 | | 2/2002 | Scott |
| 6,351,603 B2 | | 2/2002 | Waithe et al. |
| 6,375,087 B1 | | 4/2002 | Day et al. |
| RE37,745 E | | 6/2002 | Brandt et al. |
| 6,562,205 B1 | | 5/2003 | Ban et al. |
| 6,633,726 B2 | | 10/2003 | Bradenbaugh |
| 6,721,609 B1 | * | 4/2004 | Wojsznis et al. .............. 700/28 |
| 6,989,514 B2 | | 1/2006 | Patterson |
| 7,099,572 B2 | | 8/2006 | Phillips |
| 7,117,825 B2 | | 10/2006 | Phillips |
| 2003/0091091 A1 | | 5/2003 | Patterson et al. |
| 2003/0093185 A1 | | 5/2003 | Patterson et al. |
| 2003/0093186 A1 | | 5/2003 | Patterson et al. |
| 2004/0069768 A1 | | 4/2004 | Patterson et al. |
| 2004/0225414 A1 | | 11/2004 | Patterson et al. |
| 2005/0231318 A1 | | 10/2005 | Bullington |
| 2005/0275993 A1 | | 12/2005 | Phillips |
| 2006/0047870 A1 | | 3/2006 | Phillips |
| 2006/0190141 A1 | | 8/2006 | Patterson et al. |
| 2006/0257127 A1 | | 11/2006 | Patterson |
| 2007/0034169 A1 | | 2/2007 | Phillips |
| 2007/0183758 A1 | * | 8/2007 | Bradenbaugh .............. 392/478 |
| 2007/0210067 A1 | | 9/2007 | Patterson et al. |
| 2007/0245980 A1 | | 10/2007 | Phillips |
| 2007/0246551 A1 | | 10/2007 | Phillips |
| 2007/0246552 A1 | | 10/2007 | Patterson |
| 2007/0246556 A1 | | 10/2007 | Patterson |
| 2007/0246557 A1 | | 10/2007 | Phillips |
| 2007/0248143 A1 | | 10/2007 | Phillips |
| 2007/0248340 A1 | | 10/2007 | Phillips |

* cited by examiner

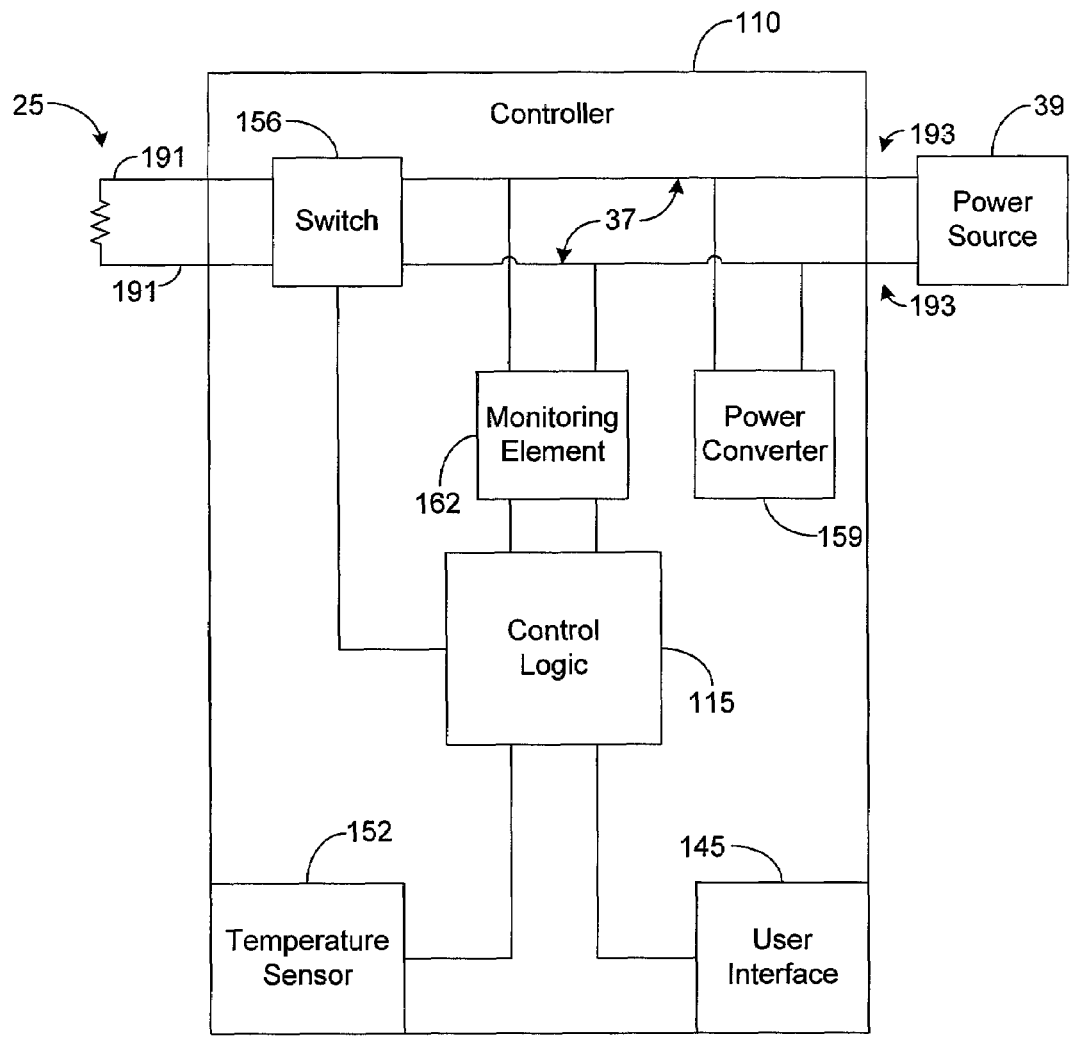
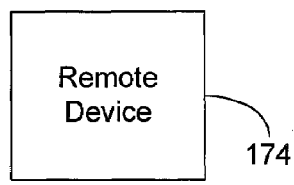
FIG. 6B

|  | Monday | Tuesday | Wednesday | Thursday | Friday | Saturday | Sunday |
|---|---|---|---|---|---|---|---|
| 1:00 | low | low | low | low | low | low | low |
| 2:00 | low | low | low | low | low | low | low |
| 3:00 | low | low | low | low | low | low | low |
| 4:00 | low | low | high | low | high | low | low |
| 5:00 | low | high | low | high | high | low | low |
| 6:00 | high | low | high | low | low | low | high |
| 7:00 | high | high | low | high | low | low | high |
| 8:00 | low | high | high | low | low | high | low |
| 9:00 | low | low | low | low | low | high | low |
| 10:00 | low | low | low | low | low | low | low |
| 11:00 | low | high | low | high | high | low | low |
| 12:00 | high | low | low | low | low | high | low |
| 13:00 | low | high | low | high | low | high | low |
| 14:00 | low | low | low | low | low | low | low |
| 15:00 | low | low | low | low | low | low | low |
| 16:00 | low | low | low | low | high | high | high |
| 17:00 | high | high | low | high | high | high | high |
| 18:00 | high | high | low | high | high | high | high |
| 19:00 | high | high | low | high | low | high | low |
| 20:00 | low | low | low | low | low | low | low |
| 21:00 | low | low | low | low | low | low | low |
| 22:00 | low | low | low | low | low | low | low |
| 23:00 | low | low | low | low | low | low | low |

FIG. 17

SYSTEM AND METHOD FOR CONTROLLING TEMPERATURE OF A LIQUID RESIDING WITHIN A TANK

CROSS-REFERENCE TO RELATED APPLICATIONS

This document is a continuation of commonly assigned U.S. patent application Ser. No. 11/409,229, filed on Apr. 21, 2006, and entitled "System and Method for Controlling Temperature of a Liquid Residing within a Tank," which is incorporated herein by reference. U.S. patent application Ser. No. 11/409,229 is a continuation of U.S. patent application Ser. No. 10/772,032, filed on Feb. 4, 2004, and entitled "System and Method for Controlling Temperature of a Liquid Residing within a Tank," which is incorporated herein by reference. U.S. patent application Ser. No. 10/772,032 is a continuation of U.S. patent application Ser. No. 10/298,135, filed on Nov. 15, 2002, and entitled "System and Method for Controlling Temperature of a Liquid Residing within a Tank," which is incorporated herein by reference. U.S. patent application Ser. No. 10/298,135 claims priority to and the benefit of the filing date of the following commonly assigned provisional applications: (a) U.S. Provisional Application No. 60/332,602, entitled "Water Heating System and Method," and filed on Nov. 15, 2001; (b) U.S. Provisional Application No. 60/353,546, entitled "System and Method for Controlling Water Temperature within a Water Tank," and filed on Jan. 31, 2002; and (c) U.S. Provisional Application No. 60/417,926, entitled "System and Method for Controlling Water Temperature within a Water Tank," and filed on Oct. 11, 2002. All of the foregoing provisional patent applications are incorporated herein by reference.

BACKGROUND OF THE INVENTION

1. Field of the Invention

The present invention generally relates to liquid heating and cooling techniques and, in particular, to a system and method for controlling temperatures of liquids residing within tanks.

2. Related Art

Water tanks are often employed to provide users with heated water, which is drawn from a water tank and usually dispensed from a faucet, showerhead, or like device. During operation, a water tank normally receives unheated water from a water source, such as a water pipe. The water tank includes a controller having a user interface that allows a user to set a desired temperature for the water being held by the tank. If the tank's water temperature falls below the desired temperature, then the controller activates a heating element for warming the tank's water. When activated, the heating element begins to heat the water within the tank, and the heating element continues to heat the water until the water's temperature reaches or exceeds the desired temperature.

The water tank typically does not provide total thermal insulation, and heat from the water often dissipates through the tank and into the surrounding environment. Therefore, over time, the temperature of the water typically decreases. Furthermore, as water is drawn from the tank and used, unheated water from the water source is drawn into the tank to replenish the tank's water supply. This new water is typically at a lower temperature than the heated water within the tank causing the overall temperature of the tank's water to rapidly decrease during times of significant water usage. Due to the foregoing factors that tend to reduce the tank's water temperature, activation of the heating element is frequently required to maintain the temperature of the water at or close to the desired temperature. Moreover, activation of the heating element can be particularly frequent and/or long during times of high water usage and for water tanks providing poor thermal insulation.

Activation of the heating element typically requires electrical power. In this regard, a heating element is normally comprised of one or more resistive elements that emit heat when electrical current is passed through the heating element. As a result, the operational costs associated with a water heater are directly related to the amount of heat generated by the heating element. More specifically, any increase in the amount of heat generated by the heating element normally increases the energy costs and, therefore, the overall operational costs associated with the water heater. Indeed, many consumers utilize a tank's energy efficiency as a primary factor when purchasing a water tank. Thus, there exists a need in the art for more efficient water tanks that operate with lower energy costs.

Another problem with conventional water tanks pertains to failure of the heating element. For the reasons set forth above, a heating element within a water tank may be frequently activated and deactivated in an attempt to maintain the tank's water temperature at the desired level. Over time, the frequent transitions of the heating element increase the wear experienced by the heating element, and the heating element eventually fails. When the heating element fails, a user can either replace the water tank entirely or fix the water tank by replacing the failed heating element. However, during the time that it takes to fix or replace the water tank, the water tank often fails to maintain the water temperature at the desired level. In most situations, a user has no alternative source for heated water and, therefore, is not able to keep water at the desired temperature until the water tank is either fixed or replaced. This can be very inconvenient for the user, and the longer that it takes to fix or replace the water tank, the more the user is inconvenienced.

Some water tanks referred to as "water coolers," have cooling elements instead of heating elements in order to keep the water within the tanks at or below a desired temperature. Such tanks commonly hold drinking water that can be dispensed through a faucet, fountain, nozzle or other type of water dispensing device. In order to keep the water within a particular tank at or below the desired temperature, the cooling element is activated when it is detected that the water temperature has risen above the desired temperature. The cooling element cools the water within the tank until the water temperature falls below the desired temperature. Like the heating element, electrical power is typically required to activate the cooling element. Thus, the operational costs associated with a water cooler are directly related to the amount of cooling performed by the cooling element. More specifically, any increase in the amount of cooling performed by the cooling element normally increases the energy costs and, therefore, the overall operational costs associated with the water cooler.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

FIG. 6B is a block diagram illustrating a more detailed view of a controller depicted in FIG. 5.

FIG. 17 depicts an exemplary usage history schedule that may be created by the controller of FIG. 6 while operating in the learn mode.

DETAILED DESCRIPTION

Figure 1:
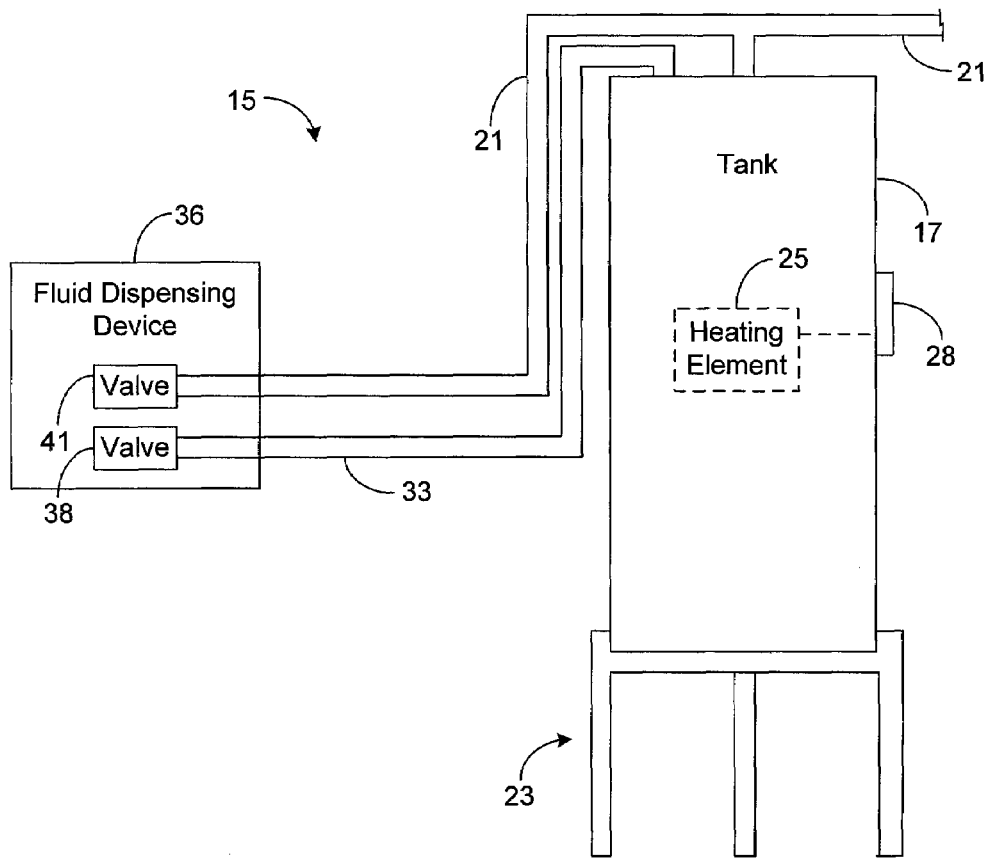
FIG. 1 is a block diagram illustrating a water heating system in accordance with the prior art.

FIG. 1 depicts a conventional water heating system 15. The system 15 includes a water tank 17 that receives and stores water from a water pipe 21. If desired, the tank 17 may reside on a base or stand 23 that supports the tank 17, as shown by FIG. 1. A temperature control element, referred to as a "heating element 25," within the tank 17 heats, under the direction and control of a controller 28, the water within the tank 17 to a desired temperature. The heated water within the tank 17 may be drawn through a pipe 33 to one or more dispensing devices 36, such as a faucet, nozzle, or shower head, for example, which dispenses the heated water for use by a user. The dispensing device 36 normally includes a valve 38 for controlling water flow and, more particularly, for controlling whether or not the device 36 dispenses water from the pipe 33. When the valve 38 is opened, water flows out of the dispensing device 36 and water from the tank 17 flows out of the tank 17 and into the pipe 33. When the valve 38 is closed, no water is dispensed from the dispensing device 36. If no water is being dispensed by any dispensing device 36 within the system 15, then water does not typically flow out of the tank 17.

Each dispensing device 36 may receive unheated water from a water source, such as water pipe 21, for example, and mix the unheated water with the heated water from the pipe 33 in order to dispense water at a desired temperature. Note that another valve 41 may be used to control the unheated water flow. Alternatively, there may be a single valve (not shown) for controlling the dispensing of both the unheated and heated water. It should be noted that the pipes 21 and 33 can be connected to the tank 17 at locations other than those shown by FIG. 1.

Figure 2:
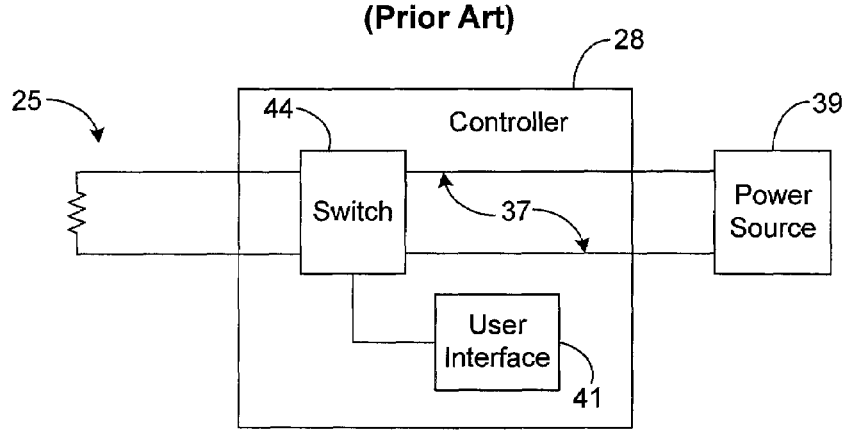
FIG. 2 is a block diagram illustrating a controller depicted in FIG. 1.

A more detailed view of the controller 28 is shown in FIG. 2. The controller 28 includes a pair of input connections 37 for receiving electrical power from an electrical power source 39. Furthermore, a user interface 41 enables a user to provide an input for setting a desired temperature for the water within the tank 17. This desired temperature, which may be set by the user, will be referred to hereafter as a "temperature threshold."

A temperature-based switch 44 detects whether the tank's water temperature is above or below the temperature threshold, and activates the heating element 25 when the switch 44 detects the water temperature to be below the temperature threshold. Typically, the switch 44 activates the heating element 25 by enabling current to flow from the connections 37 and through the heating element 25. By having current flow through the resistance of the heating element 25, heat is generated and transferred to the water within the tank 17 causing the temperature of the water to increase.

Once the water temperature reaches or exceeds the temperature threshold, the switch 44 deactivates the heating element 25. Deactivation of the heating element 25 is typically achieved by preventing current from flowing from the connections 37 to the heating element 25.

A common configuration of the switch 44 includes two conductive contacts (not shown) having dissimilar thermal properties. Each of the contacts is coupled to one of the connections 37 and to the heating element 25. Heat from the water within the tank 17 passes from the water through the tank 17 and to the contacts. As the water temperature changes, thermal stresses within the contacts tend to cause one of the contacts to move with respect to the other contact. The configuration of the contacts is such that the two contacts are separated when the water temperature is below the temperature threshold. The amount of separation is such that the thermal stresses cause the contacts to engage when the water temperature reaches the temperature threshold and to remain engaged if the water temperature exceeds the temperature threshold. Furthermore, when the temperature of the water falls back below the temperature threshold, the thermal stresses are insufficient for keeping the contacts engaged, causing the contacts to separate.

When the two contacts are engaged with one another, current is able to flow over the two contacts and through the heating element 25. In other words, the switch 44 is in a closed state, and the heating element 25 is activated. While the switch 44 is in the closed state, the heating element 25 generates heat. However, when the contacts separate, current is prevented from flowing through the switch 44 and, therefore, through heating element 25. In other words, the switch 44 is in an open state, and the heating element 25 is deactivated. While the switch 44 is in an open state, the heating element 25 fails to generate heat.

Figure 3:
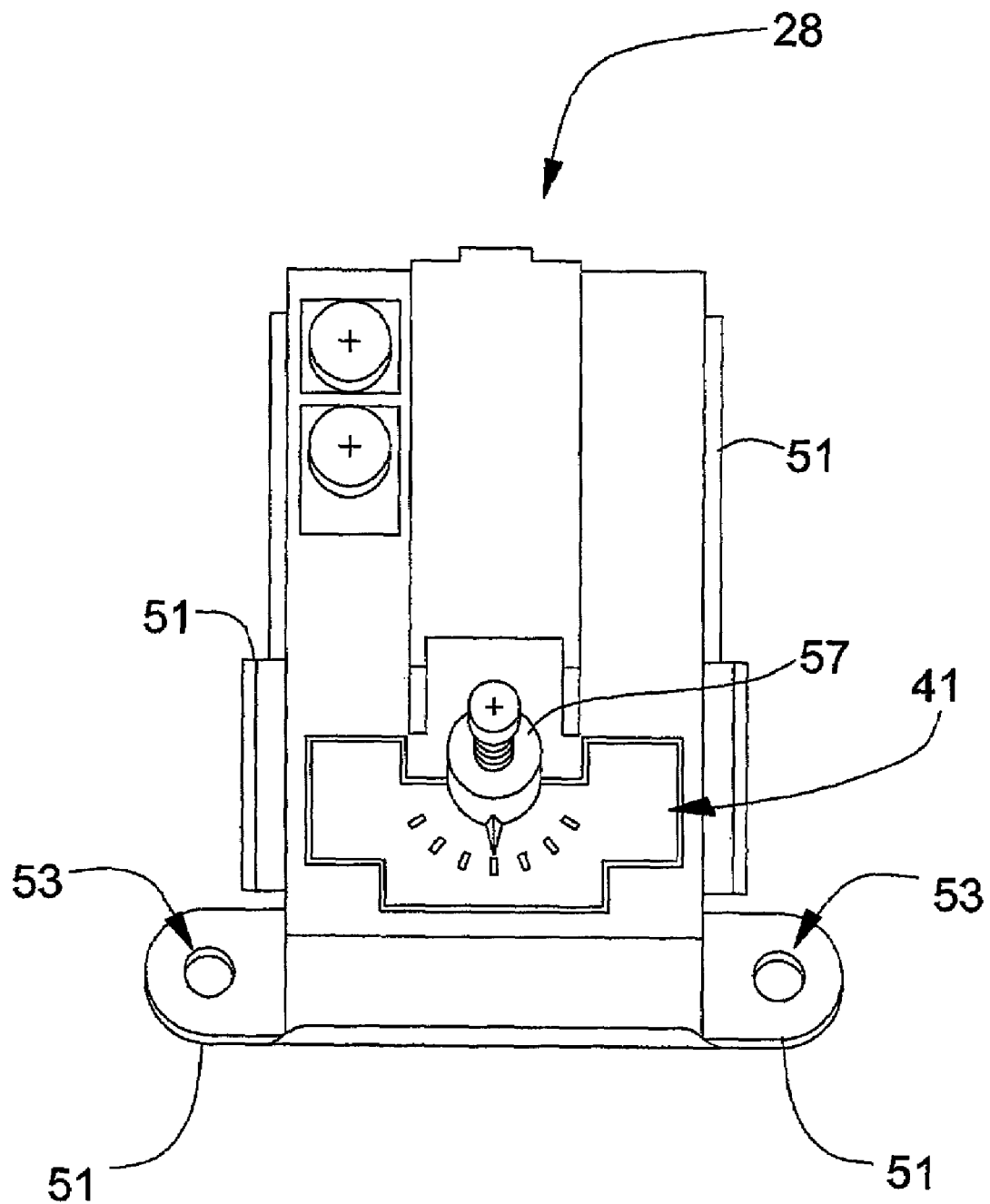
FIG. 3 is three-dimensional diagram illustrating a front view of the controller depicted in FIG. 2.
Figure 4:
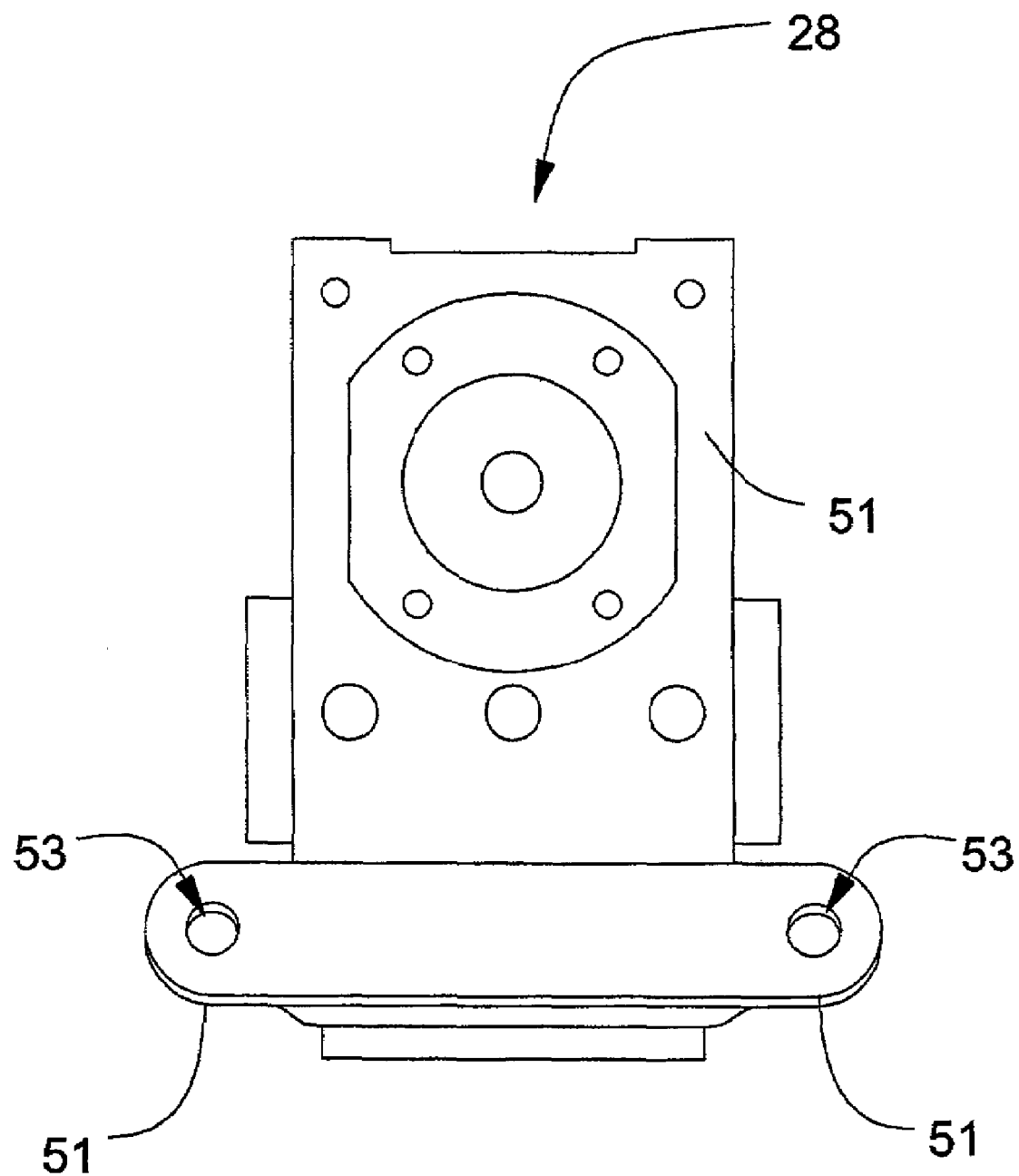
FIG. 4 is a three-dimensional diagram illustrating a back view of the controller depicted in FIG. 2.

FIGS. 3 and 4 show three-dimensional front and back views, respectively, of a typical controller 28. As shown by FIG. 4, the controller 28 includes a thermally conductive base 51, which can be mounted on the side of the tank 17 (FIG. 1). Furthermore, the conductive base 51 includes holes 53. To fixedly attach the base 51 to the tank 17, screws (not shown) can be passed through the holes 53 and into the tank 17. When the controller 28 is mounted on the tank 17, heat from the tank's water can pass through the tank 17 and through the thermally conductive base 51, which is thermally connected to the temperature-based, switch 44 (FIG. 2). Thus, the switch 44 should be able to efficiently receive heat from the water within the tank 17 and operate as described above.

The user interface 41 shown by FIG. 3 comprises a turnable dial 57. Each position of the dial 57 corresponds to a different temperature, and the user establishes the temperature threshold by turning the dial 57 to the position that corresponds to the desired water temperature. In this regard, the dial 57 is mechanically coupled to at least one of the aforementioned contacts (not shown) within the switch 44. As the dial 57 is turned to a new corresponding temperature, the position of one of the contacts, with respect to the other contacts, is changed such that the two contacts engage one another as the temperature of the tank's water reaches the new corresponding temperature. Moreover, turning the dial 57 to a new corresponding temperature establishes the new corresponding temperature as the temperature threshold until the dial 57 is later turned to another corresponding temperature. Thus, a user can change the temperature threshold utilized to control activation of the heating element 25 by turning the dial 57.

Heating System Configuration

Figure 5:
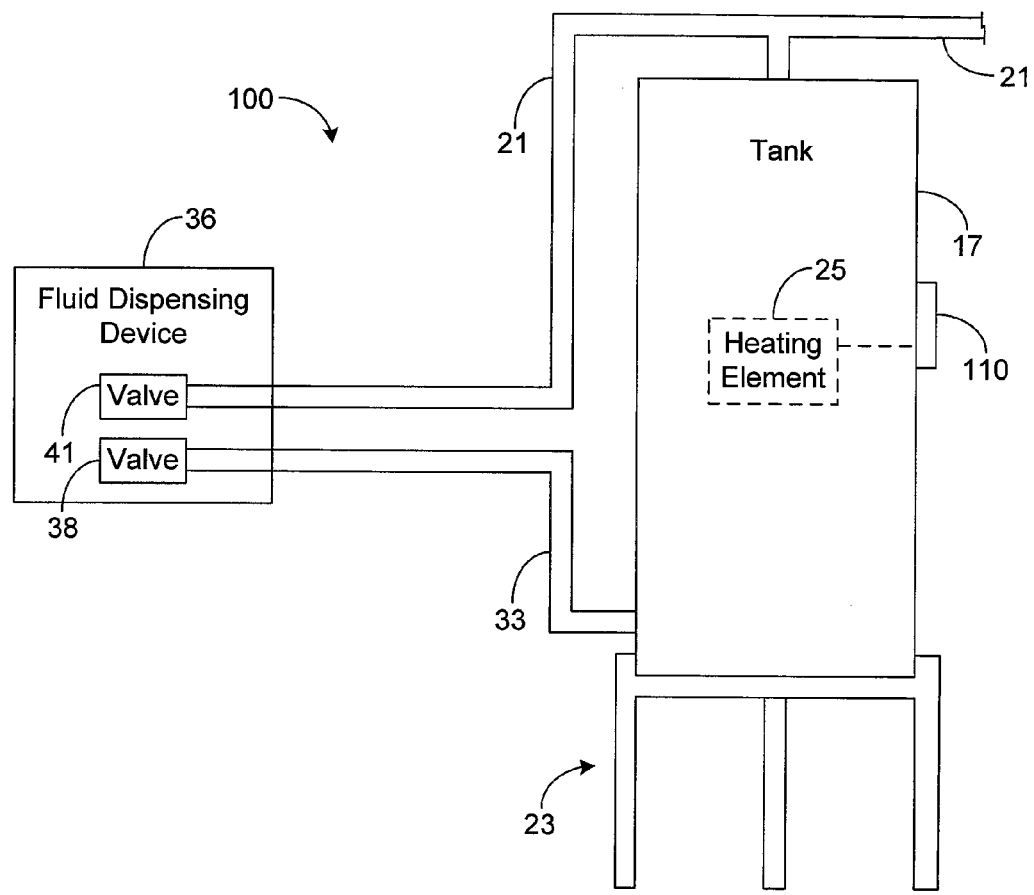
FIG. 5 is a block diagram illustrating a liquid heating system in accordance with an exemplary embodiment of the present invention.

FIG. 5 depicts a liquid heating system 100 that may be used to provide a heated liquid, such as water, for example, in accordance with the present invention. As can be seen by comparing FIG. 1 to FIG. 5, the liquid heating system 100 may be similar to or identical to conventional water heating system 15 except that the liquid heating system 100 of the present invention is controlled by a different controller 110. A more detailed view of an exemplary embodiment of the controller 110 is depicted in FIG. 6. Note that the liquid heating system 100 will be described hereafter as a providing heated water to users of the system 100. However, in other embodiments, the system 100 may be used to provide other types of heated liquids.

As shown by FIG. 6, the controller 110 includes control logic 115 configured to control the operation and functionality of the controller 110. The control logic 115 can be implemented in software, hardware, or a combination thereof. In one exemplary embodiment, as illustrated by way of example in FIG. 7, the control logic 115, along with its associated methodology, is implemented in software and stored in memory 121 of an instruction execution system 123, such a microprocessor, for example.

Note that the control logic 115, when implemented in software, can be stored and transported on any computer-readable medium. In the context of this document, a "computer-readable medium" can be any means that can contain, store, communicate, propagate, or transport a program. The computer readable-medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the control logic 115 may be magnetically stored and transported on a conventional portable computer diskette.

Figure 7:
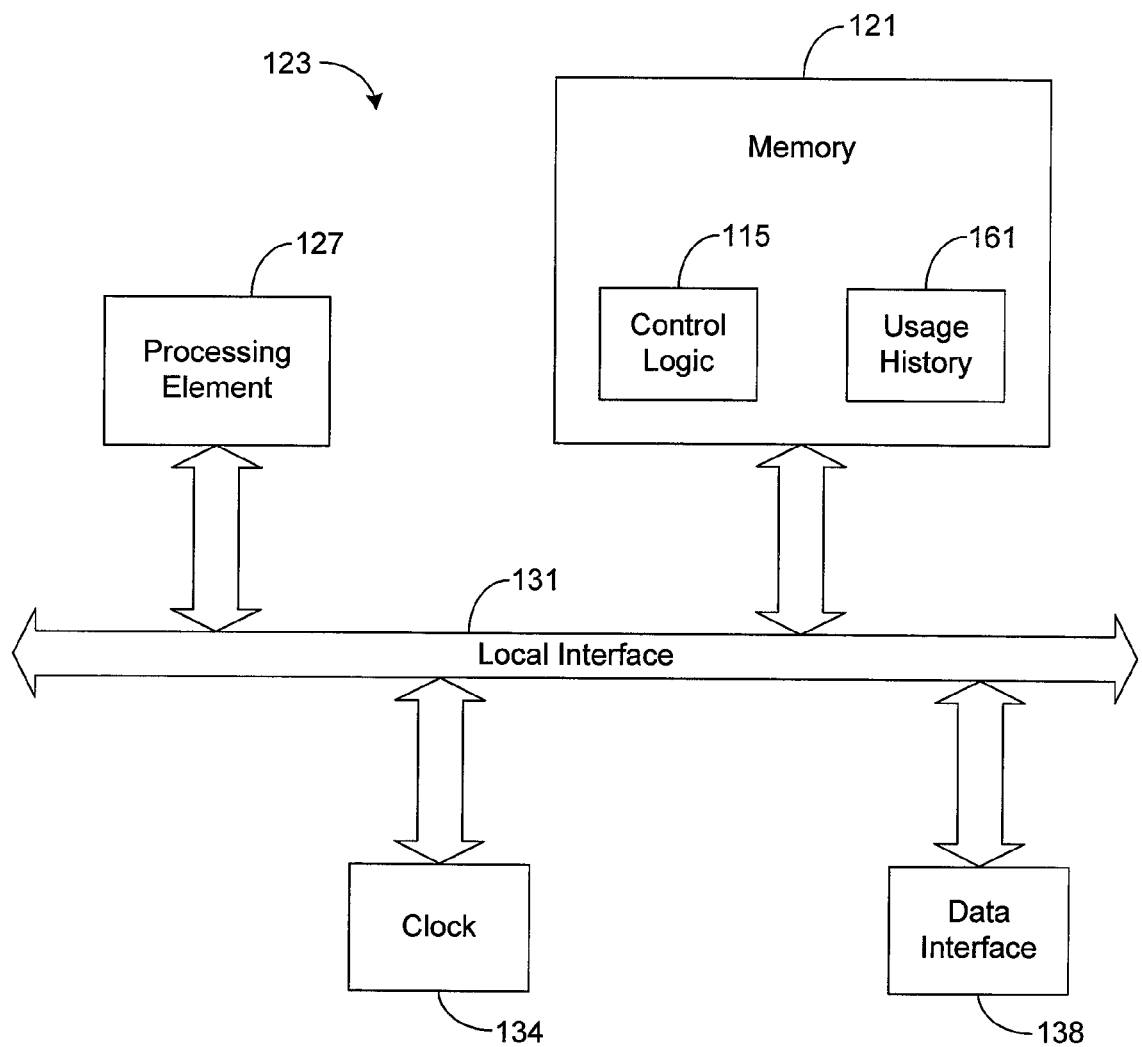
FIG. 7 is a block diagram illustrating an instruction execution system implementing control logic depicted in FIG. 6.

The system 123 of FIG. 7 comprises one or more conventional processing elements 127, such as a central processing unit (CPU) or digital signal processor (DSP), that communicate to and drive the other elements within the system 123 via a local interface 131, which can include one or more buses. Furthermore, the system 123 may include a clock 134 that may be utilized to track time and/or control the synchronization of data transfers within the system 123. The system 123 may also include one or more data interfaces 138, such as analog and/or digital ports, for example, for enabling the system 123 to exchange data with the other elements of the controller 110.

The control logic 115 preferably controls the operation of the heating element 25 based on the temperature of the water within the tank 17. In this regard, the controller 110 includes a user interface 145 that enables a user to provide, to the controller 110, various inputs, such as an input for setting the temperature threshold for the tank 17. During normal operation, the control logic 115 is configured to control the operation of the heating element 25 in an attempt to maintain the water temperature within the tank 17 at or above the temperature threshold, which may change from time-to-time, as will be described in more detail hereafter.

To achieve the foregoing functionality, the controller 110 utilizes a temperature sensor 152, such as a thermistor or thermocoupler, for example, for sensing the current water temperature of the tank 17. The temperature sensor 152 transmits a value of the sensed temperature to the control logic 115, which activates or deactivates the heating element 25 based on the sensed temperature value. More specifically, the control logic 115 preferably activates the heating element 25 if the sensed temperature is below the temperature threshold, and the control logic 115 may keep the heating element 25 in the activation state until the sensed temperature reaches or exceeds the temperature threshold. While the heating element 25 is activated, the heating element 25 generates heat, which is transferred to the tank's water generally causing the water temperature to rise.

Once the sensed temperature reaches or exceeds the temperature threshold, the control logic 115 deactivates the heating element 25 and keeps the heating element 25 in the deactivation state until the sensed temperature falls below the temperature threshold, at which point the control logic 115 again activates the heating element 25. Thus, the controller 110 activates and deactivates the heating element 25, as appropriate, in an attempt to maintain the tank's water temperature within a desired range based on the temperature threshold.

Note that in other embodiments, if desired, the control logic 115 may activate and deactivate the heating element 25 at slightly different temperature thresholds in order to provide hysteresis. For example, the control logic 115 may activate the heating element 25 if the sensed temperature falls below a lower temperature threshold, and the control logic 115 may deactivate the heating element 25 if the sensed temperature exceeds an upper temperature threshold (i.e., a threshold that is higher than the aforementioned lower threshold).

Various types of known heating devices may be utilized to implement the heating element 25, and various types of techniques may be employed to activate and/or deactivate the heating element 25. In the preferred embodiment, the heating element 25 is a resistive device that generates heat when electrical current is passed through its resistive components. The controller 110, therefore, includes a pair of connections 37 capable of receiving electrical power from a power source 39, such as a battery or a wall plug, for example. The connections 37 are coupled to a switch 156, which operates under the direction and control of the control logic 115. In this regard, when the control logic 115 decides to activate the heating element 25, the control logic 115 transmits, to the switch 156, a control signal that causes the switch 156 to close thereby causing electrical current to flow through the heating element 25. When the control logic 115 decides to deactivate the heating element 25, the control logic 115 transmits, to the switch 156, a control signal that causes the switch 156 to open thereby preventing electrical current from flowing through the heating element 25.

Note that the electrical power received by the connections 37 may be utilized to power various controller components, such as user interface 145, temperature sensor 152, and/or instruction execution system 123 (FIG. 7), for example. To this end, the controller 110 may include one or more power converters 159 for converting the power from connections 37 to suitable forms or voltages for powering one or more other components of the controller 110.

In one exemplary embodiment, the control logic 115 is configured to monitor the operational history of the tank 17 and to change or select the temperature threshold, when appropriate, such that the operation of the tank 17 is more efficient. The operational history preferably indicates a schedule of the water usage from tank 17. In this regard, the control logic 115 periodically stores information that is indicative of the tank's water usage over time. In other words, the control logic 115 stores information, including time data from the clock 134, that tracks the tank's water usage. The data stored by the control logic 115 for tracking the water's usage, including the time data stored from clock 134, will be referred to hereafter as "usage history 161." This usage history 161 may be stored in the memory 121 (FIG. 7) of system 123 and can be analyzed by the control logic 115 to determine time periods when water usage from the tank 17 is relatively high, relatively low, and/or average.

There may be various methodologies employed to analyze water usage. In one exemplary embodiment, water usage is analyzed by monitoring the state of the heating element 25. In this regard, since the control logic 115 controls the state of the heating element 25 by controlling the state of the switch 156, the control logic 115 should be aware of when the heating element 25 is activated and when the heating element 25 is deactivated. The control logic 115 preferably tracks the state of the heating element 25 to determine operational patterns associated with the heating element 25.

For example, control logic 115 may determine recurring time periods when the heating element 25 is seldom in the activation state with respect to other time periods. Such recurring time periods should correspond to periods of low water usage from the tank 17 since an increase in the rate at which heating element 25 heats the tank's water is normally caused by an increase in water usage. In this regard, high water usage causes more unheated water to be drawn into the tank 17 from the pipe 21 in order to replenish the heated water flowing out of the tank 17. The introduction of more unheated water generally decreases the overall temperature of the water causing the heating element 25 to remain in the activation state longer and/or more frequently in order to heat the water to the desired temperature range. Thus, low usage of the heating element 25 is generally indicative of low water usage, and conversely, high usage of the heating element 25 is generally indicative of high water usage.

The control logic 115 may utilize a variety of methodologies to determine time periods when the heating element 25 is seldom in the activation state. For example, the control logic 115 may determine, for each hour (or some other time period), how long the heating element 25 is activated and/or deactivated. Such information may be stored in memory 121 as the usage history 161. The control logic 115 may then analyze the usage history 161 and determine that during certain repetitive time periods, such as the early morning hours of each day or during particular time periods of particular days, for example, the heating element 25 is rarely in the activation state. Such time periods should be time periods of low water usage and will be referred to hereafter as "energy savings time periods."

After identifying the energy savings time periods, the control logic 115 monitors the clock 134 to determine when the energy savings time periods occur. During such time periods, the control logic 115 reduces the amount of heating that would otherwise be performed by the heating element 25 in normal operation. For example, the control logic 115 may automatically turn off the heating element 25 by keeping the switch 156 open during energy savings time periods. Alternatively, the control logic 115 may lower the temperature threshold for activating the heating element 25 during energy savings time periods such that the amount of heat generated by the heating element 25 during such time periods is reduced. At the end of such periods, the control logic 115 may resume normal operation.

The foregoing functionality has the effect of allowing, during the energy savings time periods, the overall temperature of the tank water to decrease below the normal temperature threshold without activating the heating element 25. This helps to reduce the amount of heating required during the energy savings time periods and, therefore, helps to reduce the energy costs during such time periods. Furthermore, based on the usage history 161, it may be assumed that water usage is likely to be low during the energy savings time periods. Therefore, it is not likely that users will experience a significant decrease in performance as a result of the reduction in water temperature during the energy savings time periods. Thus, the aforementioned energy cost savings, which can be substantial over the life of the tank 17, are achieved without a significant reduction in performance of the system 100.

It should be noted that other methodologies may be employed to identify the energy savings time periods. For example, the user may input, via input interface 145, data indicative of the energy savings time periods. In other words, the user may program when the control logic 115 is configured to allow the water temperature to fall below the temperature threshold utilized in normal operation without activating the heating element 25. In another example, the control logic 115 may receive readings from a sensor (not shown) that measures or tracks the amount of water that either flows out of or into the tank 17. The control logic 115 can then be configured to identify the time periods of low water flow as the energy savings time periods. Note that, as described above, the time periods of low water flow or, in other words, low water usage should correspond to the same time periods of low activation of the heating element 25. Thus, in either the embodiment, the same time periods should be identified as energy savings time periods. Note that various other methodologies may be employed to identify times of low water usage and, therefore, to identify energy savings time periods.

In one exemplary embodiment, the control logic 115 is further configured to predict when the heating element 25 is about to fail. The control logic 115 is configured to then provide a warning to a user, via user interface 145, for example. Thus, the user can take any desirable steps for proactively dealing with the predicted failure. For example, the user can replace the heating element 25 or the tank 17 at a time that is convenient to the user and prior to the failure, or the user may make preparations for replacing the heating element 25 or the tank 17, such as, for example, purchasing a new heating element 25 or tank 17 for when the heating element 25 does eventually fail. As a result, the user can minimize the consequences of a failing heating element 25 and, more particularly, can minimize the amount of time that the system 100 is incapable of delivering unheated water.

To predict when failure of the heating element 25 is imminent, the control logic 115 preferably monitors the electrical current (I) provided to the heating element 25 and/or the voltage (V) applied to the heating element 25. In this regard, the resistance (R) of the heating element 25 typically increases significantly just prior to a failure of the heating element 25. Thus, by monitoring the voltage and/or the current applied to the heating element 25, it is possible to determine whether or not the resistance of the heating element 25 is increasing by utilizing the equation $V=IR$. When the control logic 115 determines that the resistance of the heating element 25 has increased to a level higher than a predefined threshold or has significantly increased over time, the control logic 115 determines that a heating element failure is imminent and provides the user with a warning.

In one exemplary embodiment, the monitoring element 162 is utilized to enable monitoring of the heating element 25 for failure. In this regard, the monitoring element 162 preferably includes circuitry (e.g., a voltmeter) for determining a voltage value corresponding to the voltage applied to the heating element 25, and the monitoring element 162 preferably includes circuitry (e.g., an ammeter) for determining a current value corresponding to the current applied to the heating element 25. The control logic 115 then divides the voltage value by the current value to determine the resistance of the heating element 25.

Note that if the voltage is regulated such that it is substantially constant, then the logic 115 can be configured to predict when the heating element 25 is about to fail by determining when the current value (I) falls below a predefined threshold or significantly decreases over time. In such a case, a decrease in measured current corresponds to an increase in heating element resistance. Similarly, if the current is regulated such that it is substantially constant, then the logic 115 can be configured to predict when the heating element 25 is about to fail by determining when the voltage value exceeds a predefined threshold or significantly increases over time. In such a case, an increase in measured voltage corresponds to an increase in resistance.

In order to communicate operational information, such as, for example, a warning about an imminent heating element failure, a current tank temperature, the current temperature threshold, etc., the user interface 145 may include various communication devices. For example, the interface 145 may include speakers for generating audio tones (e.g., beeps) or other types of messages and/or may include a display device, such as a liquid crystal display (LCD), for displaying visual messages. Note that the display device may produce textual or non-textual messages. For example, a LCD may be utilized to display a textual message while one or more light emitting diodes (LEDs) may be utilized to display a non-textual message. As an example, a single LED may be used to communicate whether or not a heating element failure is imminent.

The user interface 145 may also include a wireless communication device for transmitting wireless signals, such as infrared or radio frequency (RF) signals, for example. The wireless signals may be transmitted to a remote device 174

(FIG. 6) that interfaces the information from the wireless signals with a user. This remote device 174 may be mounted at any convenient location that is suitable for communicating with the user interface 145. Alternatively, the remote device 174 may be a portable device, such as a Palm Pilot™, for example.

Furthermore, as previously set forth above, the user interface 145 is preferably configured to allow a user to submit inputs, such as a command for changing the temperature threshold or for identifying the energy savings time periods, for example. Furthermore, when the control logic 115 is implemented in software, the user interface 145 may enable the downloading of code for changing or augmenting the code defining the control logic 115. To enable the submission of such inputs, the interface 145 may include any conventional input device, such as a keypad, a switch, and/or a dial, for example. The user interface 145 may also include a data port for receiving wireless (e.g., infrared, RF, etc.) or non-wireless data signals from the remote device 174.

Note that, in embodiments employing the remote device 174, the remote device 174 may be utilized to monitor and/or control a plurality of tanks 17. For example, large residential and, particularly, commercial buildings often have a plurality of tanks 17 to provide users with sufficient warm water. A single remote device 174 may be utilized to monitor and/or control multiple ones of the tanks 17. In this embodiment, each tank 17 may be assigned a unique identifier, and the identifiers may be included in the communications between remote device 174 and the interfaces 145 of the multiple tanks 17.

For example, to transmit a command or other input to the controller 110 of one of the tanks 17, the remote device 174 may transmit the command or other input, along with the identifier of the one tank 17. The controllers 110 of the tanks 17 may be configured to respond to commands or inputs only if such commands or inputs are accompanied by the identifier identifying its tank 17. Thus, only the controller 110 of the identified tank 17 should respond to the transmitted command or input. Similarly, the controller 110, when transmitting an output, such as a heating element warning, may accompany such output with the identifier of its tank 17. Thus, based on the accompanying identifier, the remote device 174 or a user of the remote device 174 can determine which of the tanks 17 transmitted the output (e.g., the heating element warning).

Note that various techniques, in addition to or in lieu of the techniques described above, may be employed to enable data to be exchanged with the controller 110. As an example, U.S. patent application entitled "System and Method for Wireless Data Exchange Between an Applicant and a Handheld Device," filed on Oct. 23, 2001, by Patterson et al., Ser. No. 10/035,370, which is incorporated herein by reference, describes techniques that may be employed for enabling infrared communication between two devices. Such techniques may be employed to enable communication between the user interface 145 and the remote communication device 174, if desired.

Figure 6A:
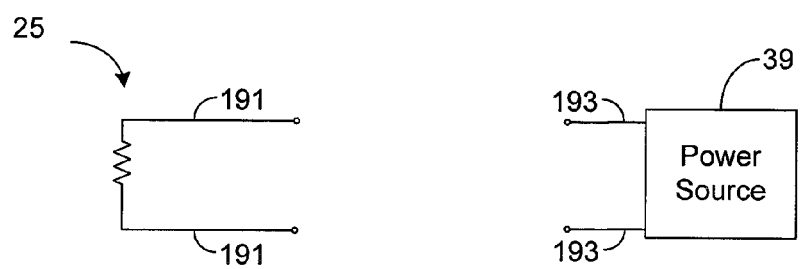
FIG. 6A is block diagram illustrating circuitry depicted in FIG. 2, once the controller of FIG. 2 has been removed from the heating system depicted by FIG. 1.
Figure 8:
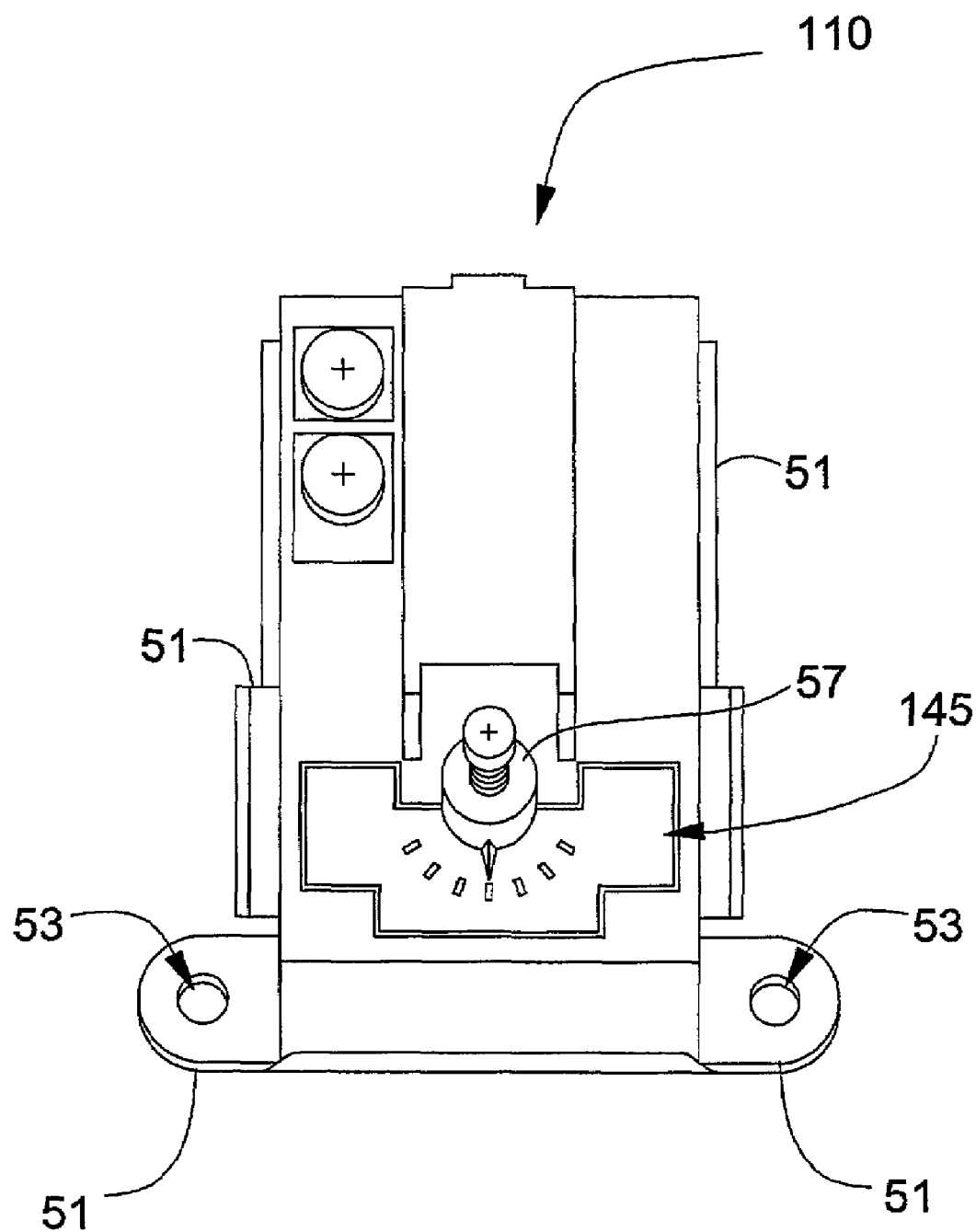
FIG. 8 is three-dimensional diagram illustrating an exemplary front view for the controller depicted in FIG. 6.
Figure 9:
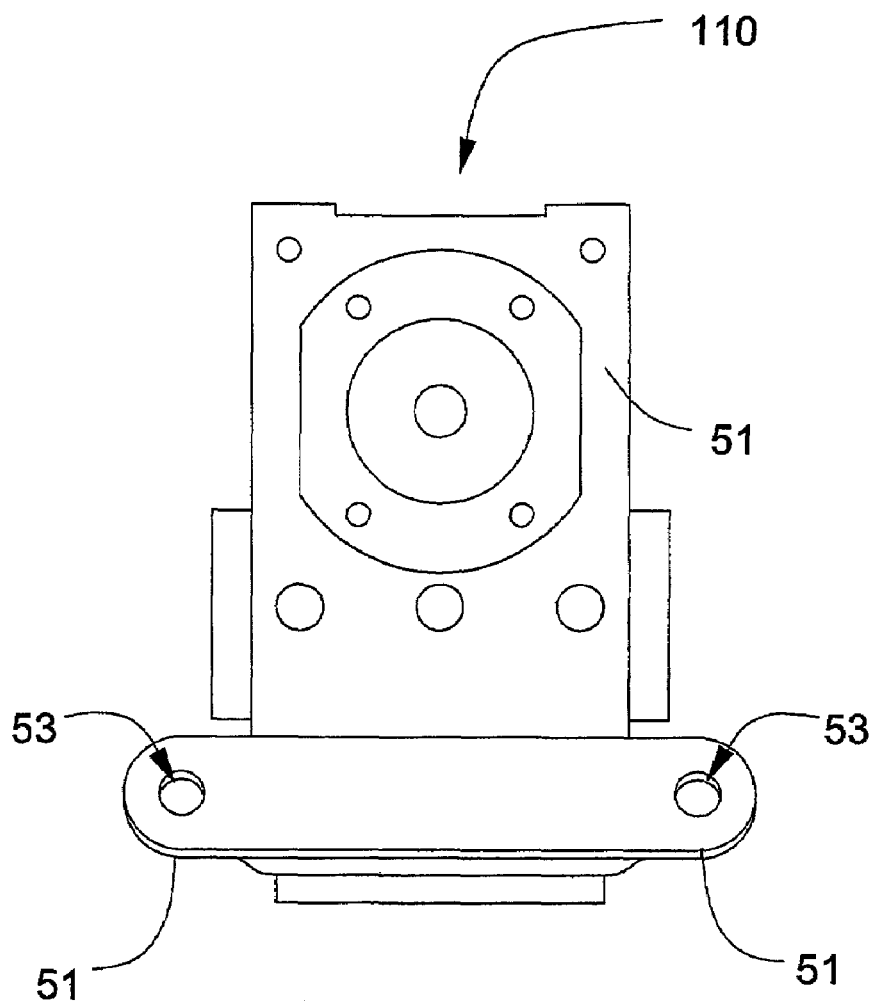
FIG. 9 is a three-dimensional diagram illustrating an exemplary back view for the controller depicted in FIG. 6.

In addition, referring to FIGS. 8 and 9, it is possible to configure the controller 110 to fit within the same or similar base 51 shown by FIGS. 3 and 4. Thus, the controller 110 can be retrofitted to tanks 17 that are currently controlled by conventional controllers, such as the controller 28 shown in FIGS. 3 and 4. In this regard, to retrofit a tank 17 with the controller 110 of the present invention, a user can simply remove the screws passing through the holes 53 of the base 51 mounted on the tank 17. Then, after disconnecting the conventional controller from its power source 39 and from the heating element 25, the user can remove the controller 28 and its base 51 from the tank 17 leaving the heating element 25 and power source 39 with open connections 191 and 193 respectively extending from the heating element 25 and power source 39, as shown by FIG. 6A. The user can then mount the controller 110 and its base 51 to the tank 17 and insert the screws or other attaching mechanisms through the holes 53 and into the tank 17 fixedly attaching the controller 110 to the tank 17 in place of the conventional controller 28. Then, to ensure that the controller 110 may begin controlling the tank 17, the user can ensure that the switch 156 is conductively coupled to the connections 191 and 193, as shown by FIG. 6B. At this point, the newly installed controller 110 should be able to control the operation of the tank 17 according to the techniques described herein. Note that, according to the retrofitting techniques described above, re-wiring of circuitry or wires outside of the controllers 28 and 110 is not necessary It should be noted that the controller 110 shown by FIG. 8 includes a dial 57, similar to conventional controller 28, for enabling a user to set the temperature threshold. However, as previously set forth above, other types of input devices may be utilized in other embodiments to enable the user to submit such an input.

Heating System Operation

Figure 10:
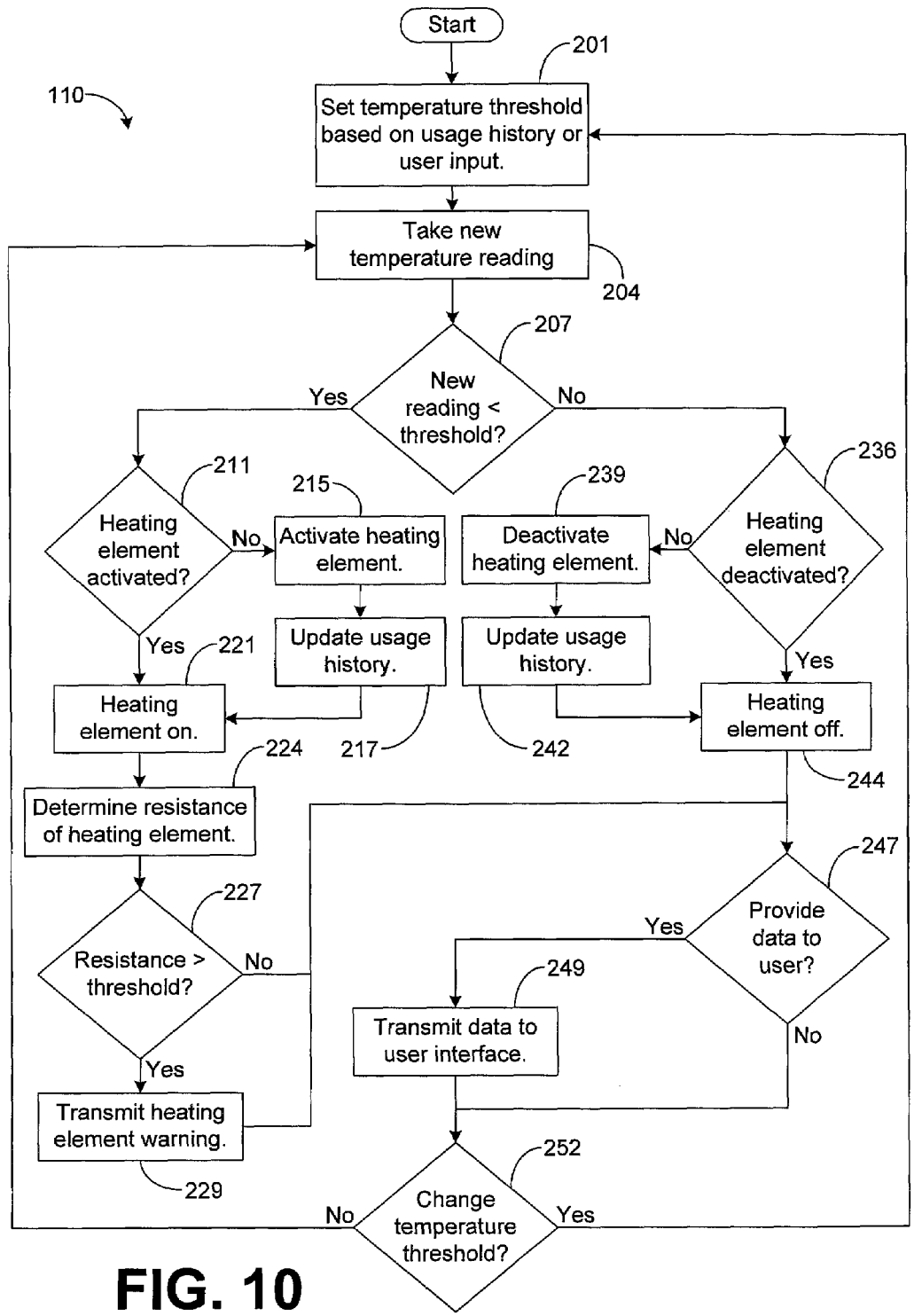
FIG. 10 is a flow chart illustrating an exemplary architecture and functionality of the controller depicted in FIG. 6.

An exemplary use and operation of the liquid heating system 100 and associated methodology are described hereafter with particular reference to FIG. 10.

In block 201 of FIG. 10, a user initially sets the temperature threshold for the tank 17 by providing an input via user interface 145. A temperature reading is then taken via temperature sensor 152, as depicted by block 204. The new temperature reading is analyzed by the control logic 115 in block 207 to determine whether or not it is less than the temperature threshold set in block 201. If the new temperature reading is less than the temperature threshold, then the control logic 115 ensures that the heating element 25 is activated and is, therefore, generating heat. However if the new temperature reading is not less than the temperature threshold, then the control logic 115 ensures that the heating element 25 is deactivated and is, therefore, not generating heat.

To ensure that the heating element 25 is activated, the control logic 115, in block 211, checks the state of the switch 156. If the switch 156 is open, then the heating element 25 is presently deactivated or is, in other words, turned "off," and the heating element 25 is, therefore, not generating heat. Thus, the control logic 115 activates the heating element 25 in block 215 by transmitting, to the switch 156, a control signal that causes the switch 156 to transition from an open state to a closed state. As a result, current flows through the heating element 25 causing the heating element 25 to emit heat and to warm the water within the tank 17.

After activating the heating element 25 in block 215, the control logic 115 preferably updates the usage history 161 (FIG. 7), in block 217, in order to indicate the change in the state of the heating element 25. More specifically, the control logic 115 preferably stores in memory 121 data indicating the occurrence of block 215. This data preferably indicates the time, as determined from clock 134, of such occurrence. At this point, the heating element 25 should be in the activated state or, in other words, should be turned on, as shown by block 221.

If the switch 156 is closed in block 211, then the heating element 25 is presently activated or is, in other words, turned "on," and the heating element 25 is, therefore, generating heat. In such a case, the control logic 115 needs to take no further steps to ensure activation of the heating element 25. Moreover, the process proceeds directly to block 221 skipping blocks 215 and 217.

After ensuring that the heating element 25 is activated, the control logic 115 then determines the resistance of the heating element 25 in block 224. This is preferably achieved by measuring the voltage and current applied to the heating element 25 and by dividing the measured voltage by the measured current. In block 227, the control logic 115 compares the resistance to a resistance threshold. The resistance threshold is preferably set such that, if the heating element's resistance exceeds the threshold, then failure of the heating element 25 is imminent. This may be achieved by setting the resistance threshold at a level significantly higher than the resistance normally measured for the heating element 25. As shown by block 229, if the heating element's resistance exceeds the resistive threshold, then the control logic 115, via user interface 145, provides a warning message in order to notify a user of the impending heating element failure. If the heating element's resistance falls below the resistance threshold, then the control logic 115 skips block 229.

As set forth above, if the control logic 115 determines, in block 207, that the new temperature reading from the sensor 152 is not less than the temperature threshold set in block 201, then the control logic 115 ensures that the heating element 25 is deactivated. To ensure that the heating element 25 is deactivated in the preferred embodiment, the control logic 115, in block 236, checks the state of the switch 156. If the switch 156 is closed, then the heating element 25 is presently activated or is, in other words, turned "on," and the heating element 25 is, therefore, generating heat. Thus, the control logic 115 deactivates the heating element 25 in block 239 by transmitting, to the switch 156, a control signal that causes the switch 156 to transition from a closed state to an open state. As a result, current is prevented from flowing through the heating element 25 causing the heating element 25 to refrain from warming the water within the tank 17.

After deactivating the heating element 25 in block 239, the control logic 115 preferably updates the usage history 161 (FIG. 7) in block 242 in order to indicate the change in the state of the heating element 25. More specifically, the control logic 115 preferably stores in memory 121 data indicating the occurrence of block 239. This data preferably indicates the time, as determined from clock 134, of such occurrence. At this point, the heating element 25 should be in the deactivated state or, in other words, should be turned off, as shown by block 244.

If the switch 156 is open in block 236, then the heating element 25 is presently deactivated or is, in other words, turned "off," and the heating element 25 is, therefore, not generating heat. In such a case, the control logic 115 needs to take no further steps to ensure deactivation of the heating element 25. Moreover, the process proceeds to directly to block 244 skipping blocks 239 and 242.

Note that the control logic 115 may maintain data indicative of the state of the switch 156 in order to enable implementation of blocks 211 and 236. For example, the control logic 115 may maintain a flag that is asserted when the switch 156 is activated and that is deasserted when the switch 156 is deactivated. In such an example, the control logic 115 should assert the flag when performing block 215 and should deassert the flag when performing block 239. Moreover, the control logic 115 can analyze such a flag to determine both the state of the heating element 25 in block 211 and the state of the heating element 25 in block 236.

After controlling the state of the heating element 25, as described above, the control logic 115 preferably determines, in block 247, whether or not data should be provided to a user of the system 100. For example, it may be desirable to provide users with certain data (e.g., the temperature sensed by the sensor 152) during the operation of the system 100 either automatically or upon request. If so, the control logic 115 transmits such data in block 249 to the user interface 145, which interfaces the data with a user.

For example, a user may desire to view an operational history of the system 100. In such an example, the user may input, via user interface 145, a request to retrieve the usage history 161 (FIG. 7). Such a request may be input via an interface device (e.g., a keypad) within interface 145, or such a request may be input via a remote device 174 that wirelessly or non-wirelessly transmits the request to the interface 145 of the controller 110. The control logic 115 preferably detects the user's request and, in response, retrieves the usage history 161 from memory 121. The control logic 115 then transmits the usage history 161 to the user interface 145, which interfaces the usage history 161 with the user in block 249. This may be achieved, for example, by outputting the data via an interface device (e.g., an LCD) within interface 145 or by wirelessly or non-wirelessly transmitting the data to a remote device 174, which then outputs the data to a user.

By controlling the state of the heating element 25 according to the aforedescribed techniques, the controller 110 attempts to maintain the temperature of the water within the tank 17 at or above the temperature threshold. However, it may be desirable to change the temperature threshold. The control logic 115 determines in block 252 whether or not the temperature threshold is to be changed. If the temperature threshold is to be changed, then the control logic 115 proceeds back to block 201 and sets the temperature threshold to the appropriate level. If the temperature threshold is not to be changed, then the control logic 115 proceeds directly to block 204 without performing block 201.

As an example of a situation when the temperature threshold is to be changed, a user may submit an input to increase or decrease the temperature threshold. The control logic 115 preferably detects such an input and, in response, proceeds to block 201 from block 252. In block 201, the control logic 115 sets the temperature threshold to a new value based on the user's input.

In another example, the control logic 115 may be configured to automatically change the temperature threshold based on the usage history 161 (FIG. 7) instead of a user's input. For example, the control logic 115 may analyze the usage history 161 and determine that during a particular repetitive time period (e.g., during early morning hours of every day), the usage of water from the tank 17 is usually low as compared to other time periods. In such an example, the control logic 115 identifies the particular repetitive time period as an energy savings period. Note that other energy savings periods may be identified based on the usage history 161 and/or based upon user inputs. Also note that the control logic 115 can determine when an energy savings period is entered or exited by analyzing data from the clock 134.

Once an energy savings period is entered, the control logic 115 determines, in block 252, that the temperature threshold should be lowered. Thus, the control logic 115 proceeds to block 201 and sets (e.g., lowers) the temperature threshold to the appropriate level. Once the energy savings period is exited, the control logic 115 determines in block 252 that the temperature threshold should be raised perhaps to the original threshold previously set by the user. Thus, the control logic 115 proceeds to block 201 and sets (e.g., raises) the temperature threshold to the appropriate level.

To illustrate the foregoing, assume that a user, in block 201, initially sets the temperature threshold to a first threshold. Also assume that repetitive energy savings time periods (e.g., the first four hours of every day) is identified and that the control logic 115 is configured to lower the temperature threshold to a second threshold during the identified energy savings time periods.

Initially, the temperature threshold is set to the first threshold, and the control logic 115 continually controls the heating element 25 based on comparisons of the temperature sensor readings to the first threshold in block 207 until the energy time savings period is entered. However, the first time that block 252 is performed after entering into the energy savings time period, the control logic 115 determines that the temperature threshold should be lowered to the second threshold. Thus, the control logic 115 proceeds to block 201 and lowers the temperature threshold to the second temperature. The control logic 115 then continually controls the heating element 25 based on comparisons of the temperature sensor readings to the second threshold until the energy savings time period expires. Once the energy timesaving period expires, the control logic 115, in performing block 252 for the first time after expiration of the energy time savings period, determines that the temperature threshold should be raised back to the first threshold. Thus, the control logic 115 proceeds to block 201 and raises the temperature threshold to the first threshold. The control logic 115 then continually controls the heating element 25 based on comparisons of the temperature sensor readings to the first threshold in block 207 until the next energy time period is entered. The foregoing process is continually repeated provided that no other reasons for changing the temperature threshold is detected in block 252.

Cooling System Configuration

Figure 11:
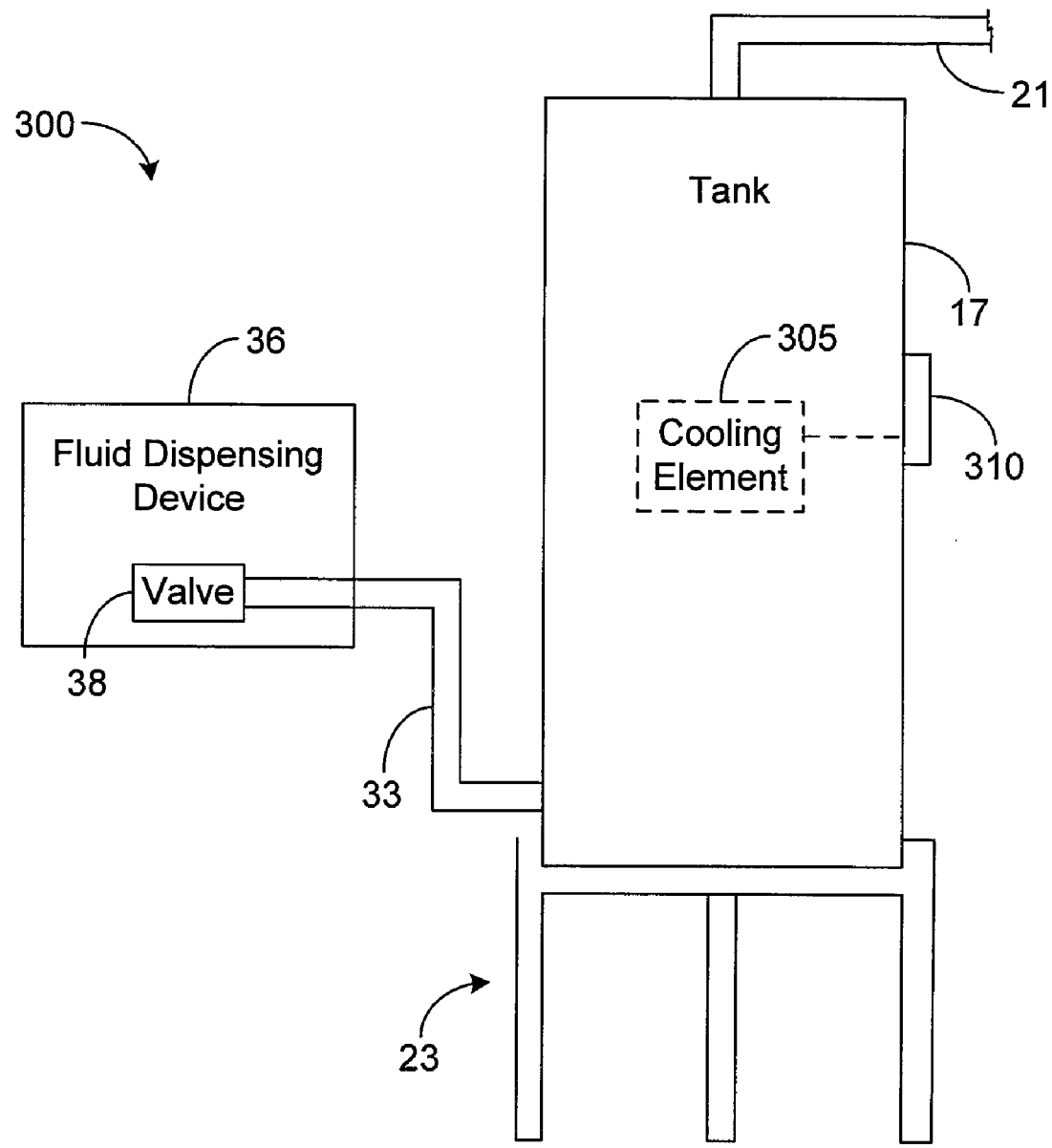
FIG. 11 is a block diagram illustrating a liquid cooling system in accordance with an exemplary embodiment of the present invention.
Figure 12:
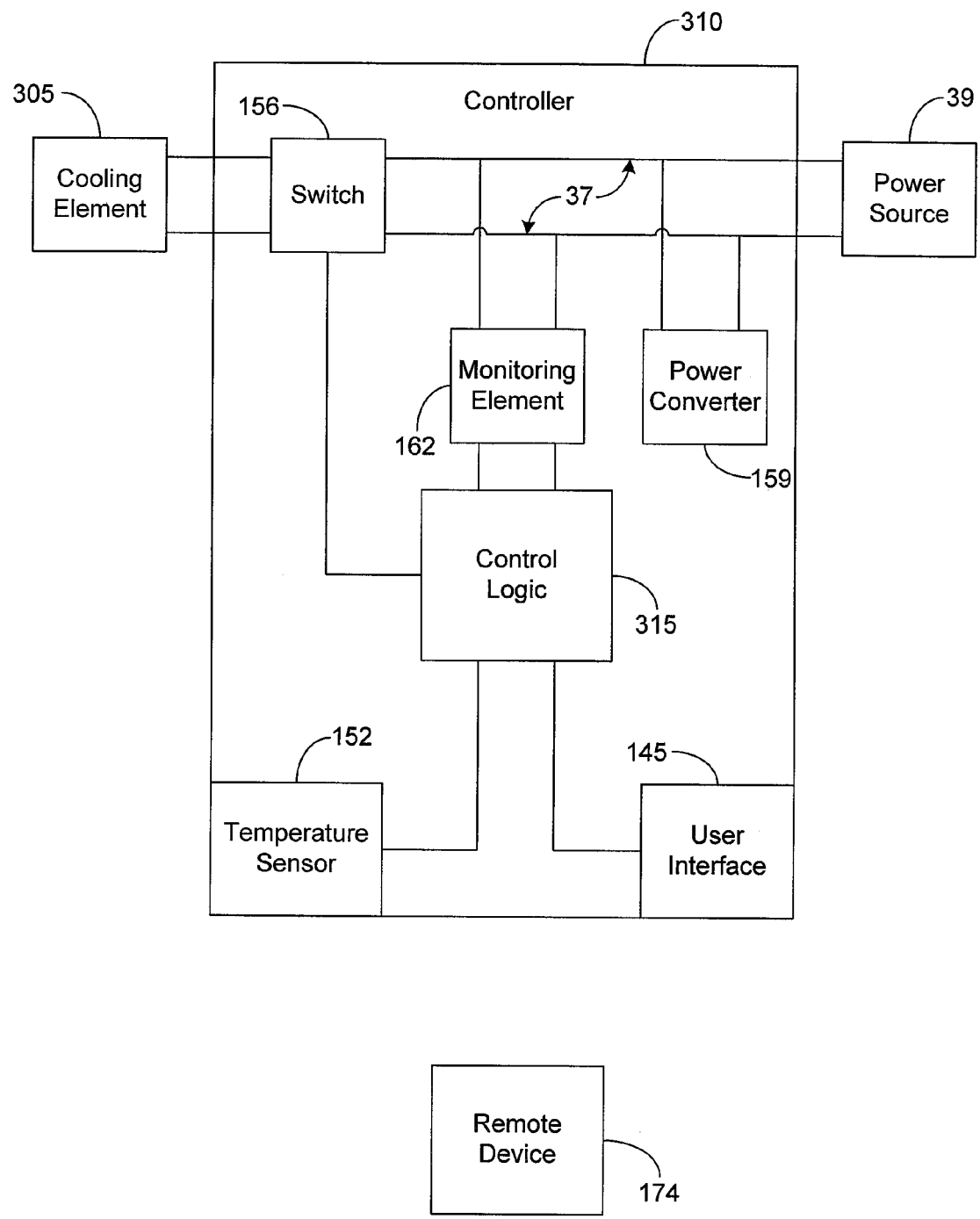
FIG. 12 is a block diagram illustrating a more detailed view of a controller depicted in FIG. 11.

Techniques similar to the ones described above for the liquid heating system 100 may be utilized in an attempt to maintain the temperature of water within a tank 17 below, instead of above, a desired temperature. Moreover, FIG. 11 depicts a liquid cooling system 300 in accordance with the present invention. The liquid cooling system 300 may be similar to or identical to the liquid heating system 100 previously described except that the temperature control element within the liquid cooling system 300 is a cooling element 305, instead of a heating element 25, and except that a controller 310 is configured to keep the temperature of the water within the tank 17 at or below, instead of at or above, a temperature threshold. Referring to FIG. 12, the controller 310 may be similar to or identical to the controller 110 of FIG. 6 except that the controller 310 includes logic 315 for controlling activation and deactivation of the cooling element 305 in accordance with techniques that will be described in more detail hereafter. Note that the liquid cooling system 300 will be described hereafter as a providing cooled water to users of the system 300. However, in other embodiments, the system 300 may be used to provide other types of cooled liquids.

Figure 13:
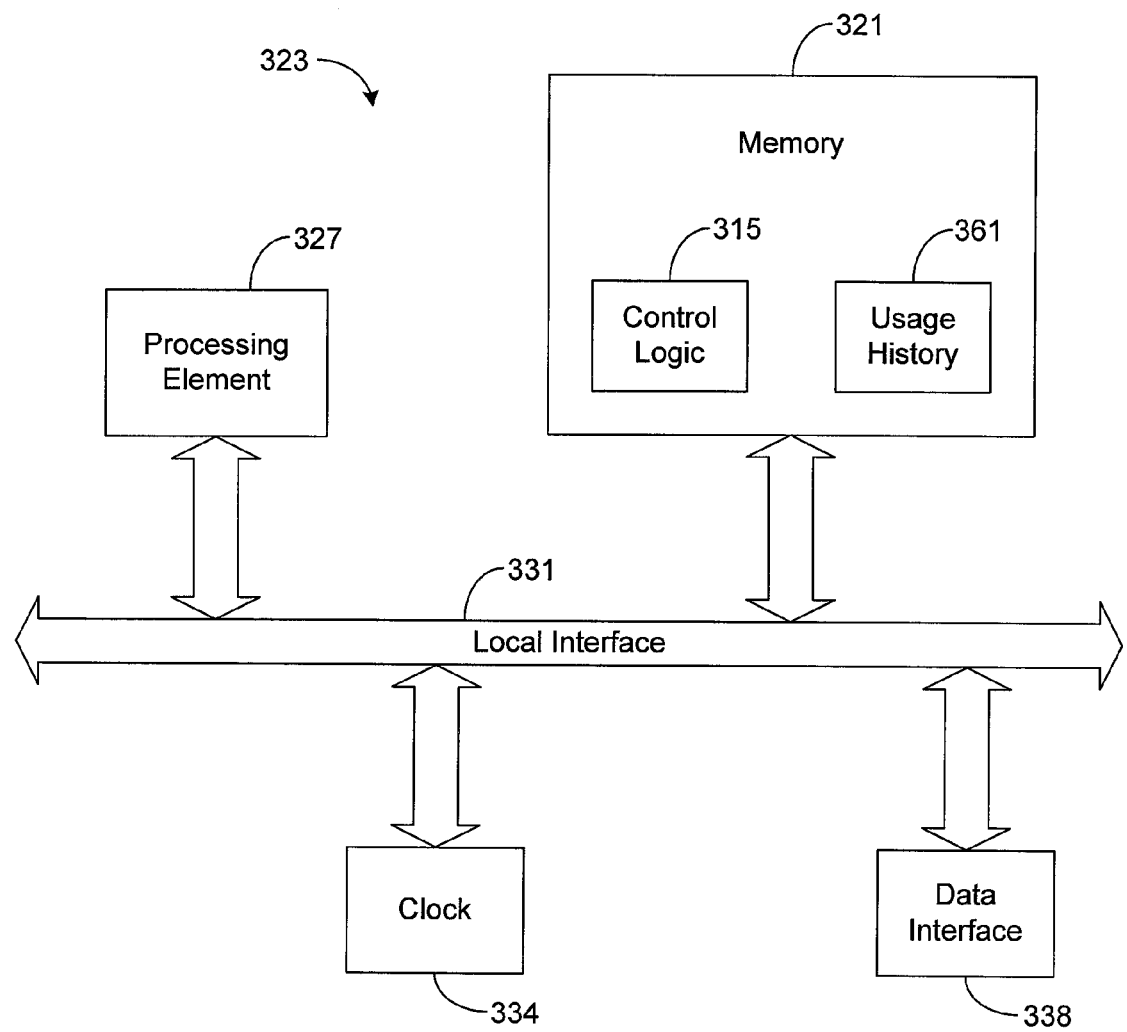
FIG. 13 is a block diagram illustrating an instruction execution system implementing control logic depicted in FIG. 12.

The control logic 315, like the control logic 115 of liquid heating system 100, can be implemented in software, hardware, or a combination thereof. As illustrated in FIG. 13, the control logic 315, along with its associated methodology, may be implemented in software and stored in memory 321 of an instruction execution system 323. When implemented in software, the control logic 315 can be stored and transported on any computer-readable medium.

The system 323 of FIG. 13, like the system 123 of FIG. 7, may comprise one or more conventional processing elements 327, such as a central processing unit (CPU), that communicate to and drive the other elements within the system 323 via a local interface 331, which can include one or more buses. Furthermore, the system 323 may include a clock 334 that may be utilized to track time and/or control the synchronization of data transfers within the system 323. The system 323 may also include one or more data interfaces 338, such as analog and/or digital ports, for example, for enabling the system 323 to exchange data with the other elements of the controller 310.

The controller 310 may utilize techniques similar to those employed by controller 115 (FIG. 6) in order to control the operation of the cooling element 305. In this regard, like the controller 110 (FIG. 6), the controller 310 preferably includes a user interface 145 that enables a user to provide, to the controller 310, various inputs, such as an input for setting the temperature threshold for the tank 17. During normal operation, the control logic 315 is configured to control the operation of the cooling element 305 in an attempt to maintain the water temperature within the tank 17 at or below the temperature threshold, which may change from time-to-time, as will be described in more detail hereafter.

To achieve the foregoing functionality, the temperature sensor 152 senses the current water temperature of the tank 17 and transmits a value of the sensed temperature to the control logic 315, which activates or deactivates the cooling element 305 based on the sensed temperature value. More specifically, the control logic 315 preferably activates the cooling element 305 if the sensed temperature is above the temperature threshold, and the control logic 315 may keep the cooling element 305 in the activation state until the sensed temperature reaches or falls below the temperature threshold. While the cooling element 305 is activated, the cooling element 305 cools the water within the tank 17.

Once the sensed temperature reaches or falls below the temperature threshold, the control logic 315 deactivates the cooling element 305 and keeps the cooling element 305 in the deactivation state until the sensed temperature rises above the temperature threshold, at which point the control logic 315 again activates the cooling element 305. Thus, the controller 310 activates and deactivates the cooling element 305, as appropriate, in an attempt to maintain the tank's water temperature within a desired temperature range based on the threshold. Note that in other embodiments, if desired, the control logic 315 may activate and deactivate the cooling element 305 at slightly different temperature thresholds in order to provide hysteresis.

Various types of known cooling elements may be utilized to implement the cooling element 305, and various types of techniques may be employed to activate and/or deactivate the cooling element 305. To control activation and deactivation of the cooling element 305, the control logic 315 preferably controls the switch 156 similar to how the control logic 115 controls the switch 156 for activating and deactivating the heating element 25. In this regard, when the cooling element 305 is to be activated, the control logic 315 causes the switch 156 to close, thereby allowing electrical power to flow from the power source 39 to the cooling element 305. When powered by the power source 39, the cooling element 305 cools the water within the tank 17. When the cooling element 305 is to be deactivated, the control logic 315 causes the switch 156 to open, thereby preventing electrical power from flowing from the power source 39 to the cooling element 305. When the cooling element 305 fails to receive power from the power source 39, the cooling element 305 fails to cool the water within the tank 17. Thus, by controlling the state of the switch 156, the control logic 315 controls whether or not the cooling element 305 is activated or deactivated.

The control logic 315 preferably tracks the water usage of the tank via similar techniques utilized by the control logic 115 of liquid heating system 100 and then adjusts the temperature threshold based on the tank's water usage over time. In this regard, the control logic 315 preferably maintains a usage history 361 (FIG. 13), similar to the usage history 161 maintained by control logic 115. Note the tank's water usage may be determined by monitoring the amount of water that enters or exits the tank 17 over time or by monitoring the state of the cooling element 305 over time. As with the heating element 25, low usage of the cooling element 305 is generally indicative of low water usage, and high usage of the cooling element 305 is generally indicative of high water usage.

Moreover, the control logic 315 is configured to analyze the usage history 361 to identify energy savings time periods or, in other words, time periods when the usage or activation of the cooling element 315 is usually low. Techniques utilized by the control logic 115 of heating system 100 for identifying energy savings time periods may be utilized by the control logic 315 of cooling system 300 to also identify energy savings time periods.

After identifying the energy savings time periods, the control logic 315 monitors the clock 134 to determine when the energy savings time periods occur. During such time periods, the control logic 315 reduces the amount of cooling that would otherwise be performed by the cooling element 305 in normal operation. For example, the control logic 315 may automatically turn off the cooling element 305 by keeping the switch 156 open during energy savings time periods. Alternatively, the control logic 315 may raise the temperature threshold for activating the cooling element 305 during energy savings time periods such that the amount of cooling performed by the cooling element 305 during such time periods is reduced. At the end of such periods, the control logic 315 may resume normal operation.

The foregoing functionality has the effect of allowing, during the energy savings time periods, the overall temperature of the tank water to increase above the normal temperature threshold without activating the cooling element 305. This helps to reduce the amount of cooling required during the energy savings time periods and, therefore, helps to reduce the energy costs during such time periods. Furthermore, based on the usage history 361, it may be assumed that water usage is likely to be low during the energy savings time periods. Therefore, it is not likely that users will experience a significant decrease in performance as a result of the increase in water temperature during the energy savings time periods. Thus, the aforementioned energy cost savings, which can be substantial over the life of the tank 17, are achieved without a significant reduction in performance of the liquid cooling system 300. Moreover, the control logic 315 of the cooling system 300 essentially performs the same techniques utilized by the control logic 115 of the heating system 100 in order to reduce operational costs except that control logic 315 restricts the amount of cooling performed by cooling element 305 rather than restricting the amount of heating performed by heating element 25.

Note that the control logic 315 may be configured to monitor the current and/or voltage provided from the power source 39 to the cooling element 305 in order to predict when failure of the cooling element 305 is imminent. When the control logic 315 detects such an imminent failure, the control logic 315 may communicate a warning just as the control logic 115 is configured to communicate a warning when it detects an imminent failure of the heating element 25. Note that the same techniques described above for communicating input and output with the controller 110 of the heating system 100 may be employed to communicate input and output with the controller 310 of the cooling system 300. Furthermore, the controller 310 may be retrofitted to a tank 17 of a conventional cooling system in the same manner that the controller 310 is described above as being retrofitted to a tank 17 of a heating system 100.

Cooling System Operation

Figure 14:
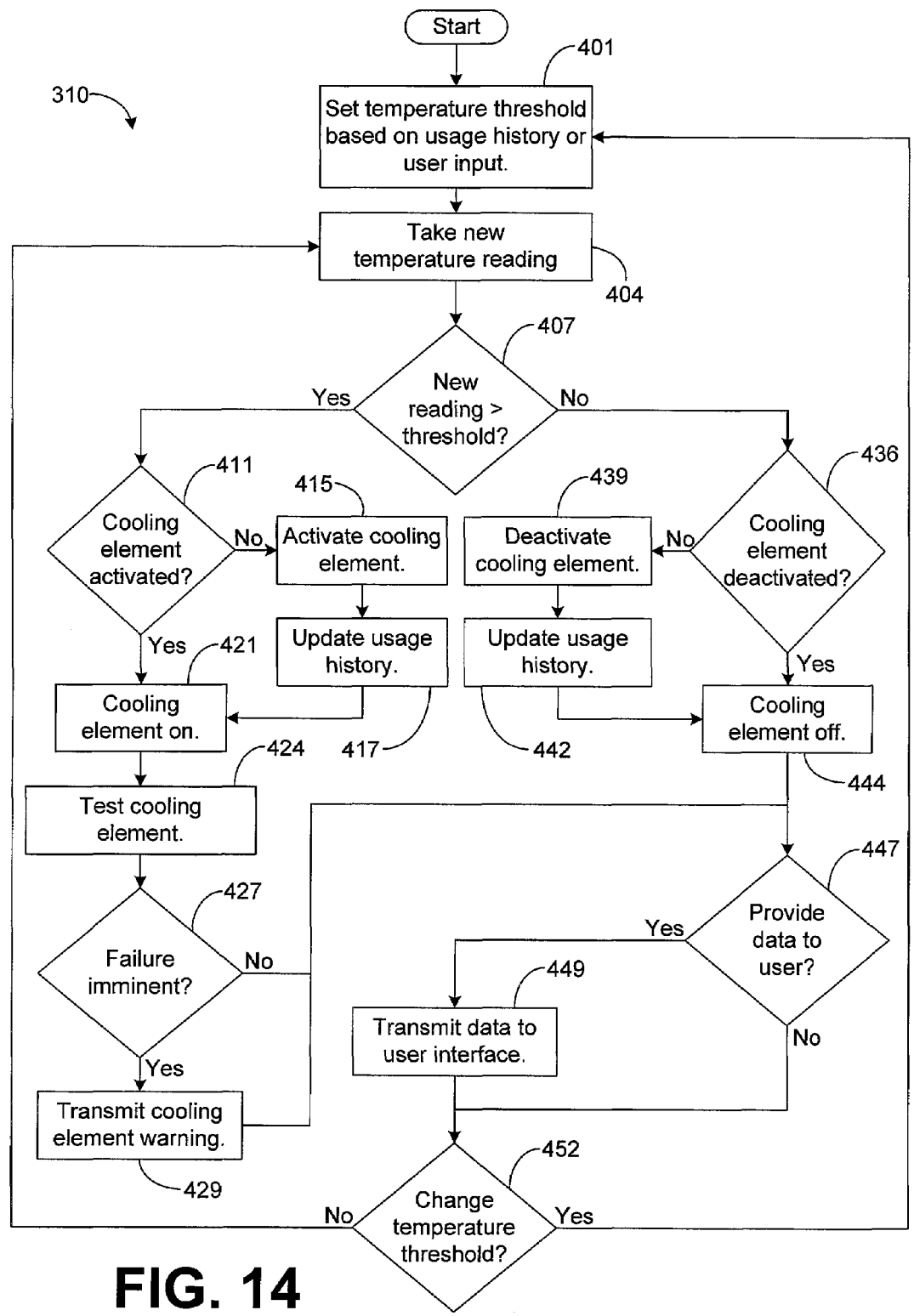
FIG. 14 is a flow chart illustrating an exemplary architecture and functionality of the controller depicted in FIG. 12.

An exemplary operation of the cooling system 300 and associated methodology are described hereafter with particular reference to FIG. 14.

In block 401 of FIG. 14, a user initially sets the temperature threshold for the tank 17 by providing an input via user interface 145. A temperature reading is then taken via temperature sensor 152, as depicted by block 404. The new temperature reading is analyzed by the control logic 315 in block 407 to determine whether or not it is greater than the temperature threshold set in block 401. If the new temperature reading is greater than the temperature threshold, then the control logic 315 ensures that the cooling element 305 is activated and is, therefore, cooling the water within the tank 17. However if the new temperature reading is not greater than the temperature threshold, then the control logic 315 ensures that the cooling element 305 is deactivated and is, therefore, not cooling the water within the tank 17.

To ensure that the cooling element 305 is activated in the preferred embodiment, the control logic 315, in block 411, checks the state of the switch 156. If the switch 156 is open, then the cooling element 305 is presently deactivated or is, in other words, turned "off," and the cooling element 305 is, therefore, not cooling the water with the tank 17. Thus, the control logic 315 activates the cooling element 305 in block 415 by transmitting, to the switch 156, a control signal that causes the switch 156 to transition from an open state to a closed state. As a result, power is provided to the cooling element 305 causing the cooling element 305 to cool the water within the tank 17.

After activating the cooling element 305 in block 415, the control logic 315 preferably updates the usage history 361 (FIG. 13), in block 317, in order to indicate the change in the state of the cooling element 305. More specifically, the control logic 315 preferably stores in memory 321 data indicating the occurrence of block 415. This data preferably indicates the time, as determined from clock 334, of such occurrence. At this point, the cooling element 305 should be in the activated state or, in other words, should be turned on, as shown by block 421.

If the switch 156 is closed in block 411, then the cooling element 305 is presently activated or is, in other words, turned "on," and the cooling element 305 is, therefore, cooling the water within the tank 17. In such a case, the control logic 315 needs to take no further steps to ensure activation of the cooling element 305. Moreover, the process proceeds directly to block 421 skipping blocks 415 and 417.

After ensuring that the cooling element 305 is activated, the control logic 315 then tests the cooling element 305 in block 424 to determine whether or not failure of the cooling element 305 is imminent. As shown by blocks 427 and 429, if failure of the cooling element 305 is imminent, the control logic 315, via user interface 145, provides a warning message in order to notify a user of the impending cooling element failure. If failure of the cooling element 305 is not imminent, then the control logic 315 skips block 429.

As set forth above, if the control logic 315 determines, in block 407, that the new temperature reading from the sensor 152 is not greater than the temperature threshold set in block 401, then the control logic 315 ensures that the cooling element 305 is deactivated. To ensure that the heating element 25 is deactivated in the preferred embodiment, the control logic 115, in block 436, checks the state of the switch 156. If the switch 156 is closed, then the cooling element 305 is presently activated or is, in other words, turned "on," and the cooling element 305 is, therefore, cooling the water within the tank 17. Thus, the control logic 315 deactivates the cooling element 305 in block 439 by transmitting, to the switch 156, a control signal that causes the switch 156 to transition from a closed state to an open state. As a result, the cooling element 305 fails to receive power from the power source 39 causing the cooling element 305 to refrain from cooling the water within the tank 17.

After deactivating the cooling element 305 in block 439, the control logic 315 preferably updates the usage history 361 (FIG. 13) in block 442 in order to indicate the change in the state of the cooling element 305. More specifically, the control logic 315 preferably stores in memory 321 data indicating the occurrence of block 439. This data preferably indicates the time, as determined from clock 334, of such occurrence. At this point, the cooling element 305 should be in the deactivated state or, in other words, should be turned off, as shown by block 444.

If the switch 156 is open in block 436, then the cooling element 305 is presently deactivated or is, in other words, turned "off," and the cooling element 305 is, therefore, not cooling the water within the tank 17. In such a case, the control logic 315 needs to take no further steps to ensure deactivation of the cooling element 305. Moreover, the process proceeds to directly to block 444 skipping blocks 439 and 442.

Note that the control logic 315 may maintain data indicative of the state of the switch 156 in order to enable implementation of blocks 411 and 436. For example, the control logic 315 may maintain a flag that is asserted when the switch 156 is activated and is deasserted when the switch 156 is deactivated. In such an example, the control logic 315 should assert the flag when performing block 415 and should deassert the flag when performing block 439. Moreover, the control logic 315 can analyze such a flag to determine both the state of the cooling element 305 in block 411 and the state of the cooling element 305 in block 436.

After controlling the state of the cooling element 305, as described above, the control logic 315 preferably determines, in block 447, whether or not data should be provided to a user of the system 300. For example, it may be desirable to provide users with certain data (e.g., the temperature sensed by the sensor 152) during the operation of the system 300 either automatically or upon request. If so, the control logic 315 transmits such data in block 449 to the user interface 145, which interfaces the data with a user.

By controlling the state of the cooling element 305 according to the aforedescribed techniques, the controller 310 attempts to maintain the temperature of the water within the tank 17 at or below the temperature threshold. However, it may be desirable to change the temperature threshold. The control logic 315 determines in block 452 whether or not the temperature threshold is to be changed. If the temperature threshold is to be changed, then the control logic 315 proceeds back to block 401 and sets the temperature threshold to the appropriate level. If the temperature threshold is not to be changed, then the control logic 315 proceeds directly to block 404 without performing block 401.

As an example of a situation when the temperature threshold is to be changed, a user may submit an input to increase or decrease the temperature threshold. The control logic 315 preferably detects such an input and, in response, proceeds to block 401 from block 452. In block 401, the control logic 315 sets the temperature threshold to a new value based on the user's input.

In another example, the control logic 315 may be configured to automatically change the temperature threshold based on the usage history 361 (FIG. 13) instead of a user's input. For example, the control logic 315 may analyze the usage history 361 and determine that during a particular repetitive time period (e.g., during early morning hours of every day), the usage of water from the tank 17 is usually low as compared to other time periods. In such an example, the control logic 315 identifies the particular repetitive time period as an energy savings period. Note that other energy savings periods may be identified based on the usage history 361 and/or based upon user inputs. Also note that the control logic 315 can determine when an energy savings period is entered or exited by analyzing data from the clock 334.

Once an energy savings period is entered, the control logic 315 determines, in block 452, that the temperature threshold should be raised. Thus, the control logic 315 proceeds to block 401 and sets (e.g., raises) the temperature threshold to the appropriate level. Once the energy savings period is exited, the control logic 315 determines in block 452 that the temperature threshold should be lowered perhaps to the original threshold previously set by the user. Thus, the control logic 315 proceeds to block 401 and sets (e.g., lowers) the temperature threshold to the appropriate level.

To illustrate the foregoing, assume that a user, in block 401, initially sets the temperature threshold to a first threshold. Also assume that repetitive energy savings time periods (e.g., the first four hours of every day) is identified and that the control logic 315 is configured to lower the temperature threshold to a second threshold during the identified energy savings time periods.

Initially, the temperature threshold is set to the first threshold, and the control logic 315 continually controls the cooling element 305 based on comparisons of the temperature sensor readings to the first threshold in block 407 until the energy time savings period is entered. However, the first time that block 452 is performed after entering into the energy savings time period, the control logic 315 determines that the temperature threshold should be raised to the second threshold. Thus, the control logic 315 proceeds to block 401 and raises the temperature threshold to the second temperature. The control logic 315 then continually controls the cooling element 305 based on comparisons of the temperature sensor readings to the second threshold until the energy savings time period expires. Once the energy timesaving period expires, the control logic 315, in performing block 452 for the first time after expiration of the energy time savings period, determines that the temperature threshold should be lowered back to the first threshold. Thus, the control logic 315 proceeds to block 401 and lowers the temperature threshold to the first threshold. The control logic 315 then continually controls the cooling element 305 based on comparisons of the temperature sensor readings to the first threshold in block 407 until the next energy time period is entered. The foregoing process is continually repeated provided that no other reasons for changing the temperature threshold is detected in block 452.

It should be noted that the methodologies described above for controlling the heating element 25 and the cooling element 305 may be combined in an effort to keep the temperature of the tank's water within a desired range having both an upper temperature threshold and a lower temperature threshold. In such an embodiment, both the heating element 25 and the cooling element 305 are positioned within the tank 17. If the temperature of the water rises above the desired range, the cooling element 305 can be activated in an effort to return the temperature of the water to the desired range. Furthermore, if the temperature of the water falls below the desired range, the heating element 25 can be activated in an effort to return the temperature of the water to the desired range.

Learn Mode

In another exemplary embodiment of the present invention, the controller 110 (FIG. 5) may be configured to monitor the water usage of the tank 17 while operating in one mode of operation, referred to as the "learn mode," and to automatically determine a usage pattern for the tank 17 based on this monitoring. The controller 110 may be configured to then control the operation of the heating element 25 based on the usage pattern determined by the controller 110. Exemplary techniques for controlling the operation of the heating element 25 in such an embodiment will described in more detail hereinbelow.

In this regard, the control logic 115 initially enters into a learn mode and, while operating in the learn mode, attempts to maintain the tank's water temperature within a desired temperature range by activating the heating element 25 when the water temperature within the tank 17 falls below a temperature threshold, which may be a default threshold or may be defined by user inputs received from the user interface 145. In addition, while in the learn mode, the control logic 115 preferably attempts to determine water usage patterns. In this regard, the control logic 115 tracks the water usage of the tank 17 for a specified amount of time. For illustrative purposes, assume that the specified amount of time that the control logic 115 remains in the learn mode tracking water usage is one week. However, it should be noted that other time periods are possible in other embodiments.

Moreover, for each day of the week, the control logic 115 preferably monitors the state of the heating element 25 to determine when the heating element 25 is in an activation state, and the control logic 115 defines the usage history 161 based on this monitoring. In an exemplary embodiment, each day of the week is partitioned into various time periods (e.g., hours), also referred to herein as "time slots," and data indicative of the water usage for each time slot is stored in the usage history 161. Although other partition times are possible, assume that the control logic 115 is configured to partition each day into hours and to monitor the water usage of the tank 17 accordingly, as will be described in more detail hereinbelow.

For reasons previously set forth hereinabove, the amount of heat generated by the heating element 25 during a particular hour generally indicates the amount of water usage that occurs during the particular hour. In this regard, as described above, when water usage is low (i.e., when only a small amount of heated water is drawn from the tank 17), a significant amount of water already heated by the heating element 25 remains in the tank 17, and the temperature of the water within the tank 17 is not likely to rapidly decrease. Thus, the total activation time of the heating element 25 should be relatively low.

However, when water usage is high (i.e., when a large amount of heated water is drawn from the tank 17), a significant amount of water heated by the heating element 25 is drawn from the tank 17 and replenished with unheated water from the pipe 21. Therefore, the temperature of the water in the tank 17 tends to rapidly decrease causing the total activation time of the heating element 25 to significantly lengthen.

Moreover, the control logic 115 for each hour of each day preferably stores, in the usage history 161, data indicative of a total activation time for the heating element 25. By analyzing this data, the control logic 115 can determine which hours during the week correspond to low usage time periods and which hours correspond to high usage time periods. In particular, if the total activation time for a particular hour exceeds a predefined time threshold, then the particular hour is classified as a high usage time period or in other words, is associated with a high usage pattern. Otherwise, the particular hour is classified as a low usage time period or, in other words, is associated with a low usage pattern. As will be described in more detail hereafter, the usage history data may be utilized to control the temperature threshold or thresholds used to activate and deactivate the heating element 25 such that the system 100 operates in an efficient manner.

In this regard, after determining the usage history 161, the control logic 115 preferably places the controller 110 into an operational mode in which the control logic 115 adjusts or otherwise selects the temperature threshold or thresholds for activating and/or deactivating the heating element 25 based on the usage history 161 gleaned from the learn mode. As an example, the usage history 161 may define a week's usage schedule of the system 100. More specifically, as described above, the usage history 161 in such an embodiment may associate each hour of a week with data indicative of whether the control logic 115 detected a low usage pattern or a high usage pattern during the same hour of the week while in the learn mode. Each time the hour of the week repeats for subsequent weeks, the control logic 115 utilizes, based on the hour's associated usage pattern, a particular water temperature threshold for controlling when the heating element 25 is activated. For example, if the associated usage pattern indicates low usage, the control logic 115 preferably utilizes a low temperature threshold (e.g., 110 degrees Fahrenheit). However, if the associated usage pattern indicates high usage, the control logic 115 preferably utilizes a higher temperature threshold (e.g., 140 degrees Fahrenheit).

Thus, the usage history schedule defined by the data 161 corresponds to a schedule of temperature thresholds that may be used to control the heating element 25. If desired, the control logic 110 may define such a threshold schedule and store data indicative of this schedule in the usage history 161. The logic 110 may then control the heating element 25 based on either the usage schedule or the temperature threshold schedule.

To better illustrate the foregoing, assume that between 7:00 a.m. and 8:00 a.m. on a Wednesday during the learn mode, the control logic 115 detects a high usage pattern based on the total activation time of the heating element 25 during this hour (i.e., the total activation time falls below the time threshold). For each Wednesday thereafter between 7:00 a.m. and 8:00 a.m. while the controller 110 is in the operational mode, the control logic 115 preferably utilizes a high temperature threshold to control activation of the heating element 25. In this regard, during the aforementioned hour of each Wednesday, the control logic 115 preferably activates one the heating element 25 when the water temperature measured by the temperature sensor 152 is less than the high temperature threshold. Further, the control logic 115 may deactivate the heating element 25 when the measured water temperature exceeds the high temperature threshold. Alternatively, in order to provide hysteresis, the control logic 115 may deactivate the heating element 25 when the measured water temperatures exceeds a threshold that is slightly higher than the aforementioned high temperature threshold.

However, if the control logic 115 instead detects a low usage pattern during the Wednesday of the learn mode between 7:00 a.m. and 8:00 a.m. (i.e., the total activation time of the heating element 25 exceeds the time threshold), then the control logic 115 utilizes a low temperature threshold to control activation of the heating element 25 between 7:00 a.m. and 8:00 a.m. on each Wednesday during the operational mode. In this regard, during the aforementioned hour of each Wednesday, the control logic 115 preferably activates the heating element 25 when the water temperature measured by the temperature sensor 152 is less than the low temperature threshold. Further, the control logic 115 may deactivate the heating element 25 when the measured water temperature exceeds the low temperature threshold. Alternatively, in order to provide hysteresis, the control logic 115 may deactivate the heating element 25 when the measured water temperatures exceeds a threshold that is slightly higher than the aforementioned low temperature threshold.

By implementing the foregoing techniques, a lower temperature threshold for activating the heating element 25 is utilized during time periods that correspond to low usage patterns, as indicated by the usage history 161, and a higher temperature threshold for activating the heating element 25 is utilized during time periods that correspond to high usage patterns, as indicated by the usage history 161. As a result, the overall operational costs and, in particular, the energy costs associated with the system 100 can be lowered without significantly impacting the system's performance thereby resulting in a system 100 that is more efficient and less costly.

Note that the usage patterns indicated by the usage history 161 based on measurements taken during the learn mode may, for some time periods, represent a poor estimate of the actual usage pattern experienced during the operational mode. For example, during the learn mode, a significant amount of water usage may occur for a particular hour of the week (e.g., Wednesday between 7:00 a.m. and 8:00 a.m.). Therefore, during the operational mode, this same hour of the week may be treated as a high usage time period, and the high temperature threshold may be utilized to control activation of the heating element 25.

However, the high water usage for this particular hour of the week during the learn mode may turn out to have been more of an anomaly than a regular occurrence. Thus, it is possible for low water usage to actually occur during the particular hour of the week for most weeks once the operational mode is begun. Further, it is possible for the actual usage pattern of the tank 17 to change such that time periods indicated as high usage become regular periods of low usage and vice versa.

The control logic 115 is preferably configured to continue monitoring the water usage of the system 100 even after transitioning into the operational mode. Moreover, if the control logic 115 detects that the actual usage for a particular hour of the week does not regularly correspond to the type of usage indicated by the usage history 161, the control logic 115 may modify the usage history 161 such that the usage pattern for the particular hour of the week is changed. Thus, in the foregoing example, the control logic 115 may modify the usage history 161 to change the usage pattern for the aforementioned hour of the week (e.g., Wednesday between 7:00 a.m. and 8:00 a.m.) from a high usage to a low usage. Thus, for the particular hour of the week for subsequent weeks, a low temperature threshold is preferably utilized to control the activation of the heating element 25.

Note that, in an effort to prevent the control logic 115 from changing the usage history 161 in response to an anomaly in the usage pattern, the control logic 115 may be configured to modify the usage history 161, as described above, only if the number of detected usage misclassifications for a particular time period or time slot exceeds a predetermined threshold. A "usage misclassification" refers to an instance where the actual usage pattern for a time period fails to correspond to the type of usage indicated for the time period by the usage history 161. Further, if a relatively large number of usage misclassifications are defined by the usage history 161 (e.g., if the detected number of usage misclassifications exceeds a threshold), the control logic 115 may revert back into the learn mode in order to make another attempt to define the usage history 161 such that the usage history 161 is a more accurate estimate of the weekly usage pattern that will be encountered.

Note that it is possible for the learn mode to continue once the operational mode begins (i.e., the learn mode and the operational mode may simultaneously occur), making reverting back into the learn mode unnecessary. Further, rather than characterizing a time period (e.g., an hour of the week) as a high usage period or a low usage period based on a single trial in the learn mode, multiple occurrences of the time period may be monitored and the results may be averaged. For example, it is possible for the controller 110 to remain in the learn mode for a month. The total activation time measured between 8:00 a.m. and 9:00 a.m. for each Wednesday during this month may be averaged, and the aforementioned time period or time slot (i.e., Wednesday between 8:00 a.m. and 9:00 p.m.) may be characterized based on the averaged total activation time.

It should also be noted that it is not necessary for there to only be two monitored states of pattern usage. For example, rather than just monitoring the operation of the system 100 for low or high water usage patterns, it is possible to monitor the operation of the system 100 for three (e.g., low, medium, or high) water usage patterns. Each such category may be respectively characterized by higher total activation times. For example, an hour of the week in which the total activation time of the heating element 25 is below a low time threshold may be associated with a low usage pattern by the usage history 161. Furthermore, an hour of the week in which the total activation time of the heating element 25 is above the low time threshold but below a high time threshold may be associated with a medium usage pattern, and an hour of the week in which the total activation time of the heating element 25 is above the high time threshold may be associated with a high usage pattern.

Further, the control logic 115 may be configured to utilize a different temperature threshold for controlling activation of the heating element 25 for each of the aforementioned categories. For example, for an hour of the week associated with a low usage pattern, a low temperature threshold may be employed by the control logic 115 to control activation of the heating element 25, thereby maintaining the water temperature in a low temperature range. For an hour of the week associated with a medium usage pattern, a medium temperature threshold, which is higher than the aforedescribed low temperature threshold, may be employed by the control logic 115 to control activation of the heating element 25, thereby maintaining the water temperature in a higher temperature range. For an hour of the week associated with a high usage pattern, a high temperature threshold, which is higher than the aforedescribed medium temperature threshold, may be employed by the control logic 115 to control activation of the heating element 25, thereby maintaining the water temperature in yet a higher temperature range. The monitored states may be further increased to a number higher than three states, if desired.

In addition, during consecutive time periods associated with low usage patterns by the usage history 161, the control logic 115, according to the techniques described above, preferably controls the activation of the heating element 25 based on a low temperature threshold. Thus, the water temperature of the tank 17 is maintained within a lower temperature range as compared to other time periods that are associated with high usage patterns. Due to prolonged periods of maintaining the water within the tank 17 within a lower temperature range, bacteria may begin to develop in the water. To ensure that bacteria levels within the tank 17 remain within acceptable levels, the control logic 115 may be configured to ensure that the water within the tank 17 is raised to a sufficient temperature for a sufficient amount of time to substantially kill bacteria that may be growing within the tank 17. As an example, the control logic 115, once a week, may be configured to utilize (regardless of the usage pattern defined by the usage history 161) a high temperature threshold (e.g., 150 degrees Fahrenheit) such that the water within the tank 17 is maintained within a high temperature range for a sufficient amount of time to ensure that enough bacteria is killed to keep the bacteria within the tank 17 within acceptable levels.

In another example, the control logic 115 may detect how long the temperature of the water remains below a predetermined temperature threshold. If the amount of time exceeds a predetermined time threshold, then the control logic 115 may activate the heating element 25 for a sufficient amount of time to sufficiently heat the water for killing bacteria. Various other techniques for ensuring that bacteria growth remains within acceptable margins are possible.

An exemplary operation of the controller 110 according to the learn mode and operational mode described above will now be described in more detail with reference to FIGS. 15-19. For illustrative purposes, assume that the controller 110 partitions each day into hours, as described above, and assume that the controller 110 monitors and controls the state of the heating element 25 on an hourly basis, as will be described hereafter. Note that each partitioned hour will be generally referred to as a time slot. However, it should be noted that time slots of other durations may be utilized in other embodiments.

In addition, to better illustrate hysteresis of temperature thresholds, assume that (for any given moment in time) two thresholds, a lower threshold and an upper threshold, are used to control the activation and deactivation, respectively, of the heating element 25. The upper threshold is preferably slightly higher (e.g., by 5 degrees Fahrenheit) relative to the lower threshold. As will be described in more detail hereafter, the upper and lower thresholds used for a particular time slot during the operational mode are dependent on the usage pattern associated with the time slot by the usage history 161.

Initially, the control logic 115 enters into the learn mode and begins monitoring the water usage of the tank 17. In this regard, after entering the learn mode, the control logic 115 may wait until the beginning of the first time slot (e.g., wait for the top of the next hour), as shown by block 502 of FIG. 15, before beginning the monitoring process. After beginning the monitoring process, the control logic 115 sets or identifies an upper and lower threshold to be used for controlling the heating element 25 during the learn mode, as shown by block 505. These thresholds may be default thresholds or may be controlled by a user of the system 100. As an example, in block 505, the lower threshold may be set to 135 degrees Fahrenheit, and the upper threshold may be set to 140 degrees Fahrenheit.

In block 508, the control logic 115 takes a temperature reading of the water within the tank 17 via the temperature sensor 152 (FIG. 6). As shown by block 511, the control logic 115 then determines whether the sensed temperature of the water is below the lower threshold. If not, the control logic 115 refrains from activating the heating element 25. Instead, the control logic 115 determines in block 515 whether the current time slot has expired. In the present example, the current time period expires at the top of the next hour.

For example, if a "yes" determination is made in block 502 at 8:00 a.m., then the current time slot begins at 8:00 a.m. and expires at 9:00 a.m. Thus, in performing block 515 in such an example, the control logic 115 may determine whether 9:00 a.m. has been reached. If 9:00 a.m. has not been reached and the current time period has, therefore, not expired, the control logic 115 takes another temperature reading in block 508 and continues monitoring for the current time slot. However, if the current time period has expired, the control logic 115 determines in block 518 the total amount of time, if any, that the heating element 25 was activated during the expired time slot. Techniques for determining this total amount of time, referred to as the "total activation time," will be described in more detail. If the total activation time is less than a predetermined threshold, then the control logic 115 classifies the expired time slot as a low water usage time slot, as shown by blocks 521 and 524. However, if the total activation time is greater than the predetermined threshold, the control logic 115 classifies the expired time slot as a high water usage time slot, as shown by blocks 521 and 527.

After classifying the expired time slot, the control logic 115 determines in block 535 whether all of the time slots for an entire week have been monitored and classified. If so, the control logic 115 transitions to the operational mode, as shown by block 538, and the learn mode ends. If not, the control logic 115 begins monitoring the next time slot (e.g., the time slot beginning at 9:00 a.m. in the aforementioned example), as shown by block 541.

Figure 15:
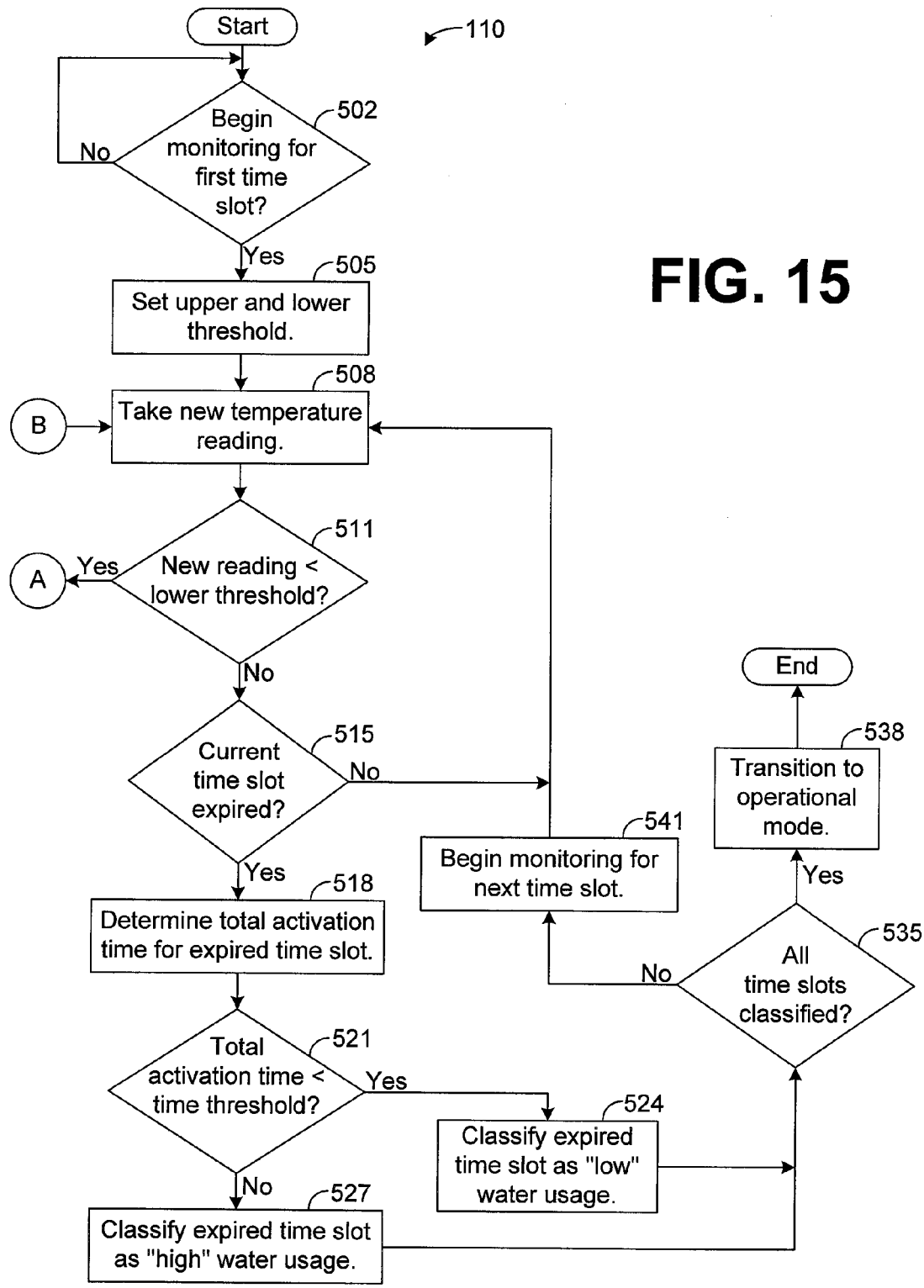
FIGS. 15 and 16 depict a flow chart illustrating an exemplary architecture and functionality of the controller depicted in FIG. 6 when the controller is operating in a learn mode in accordance with an exemplary embodiment of the present invention.
Figure 16:
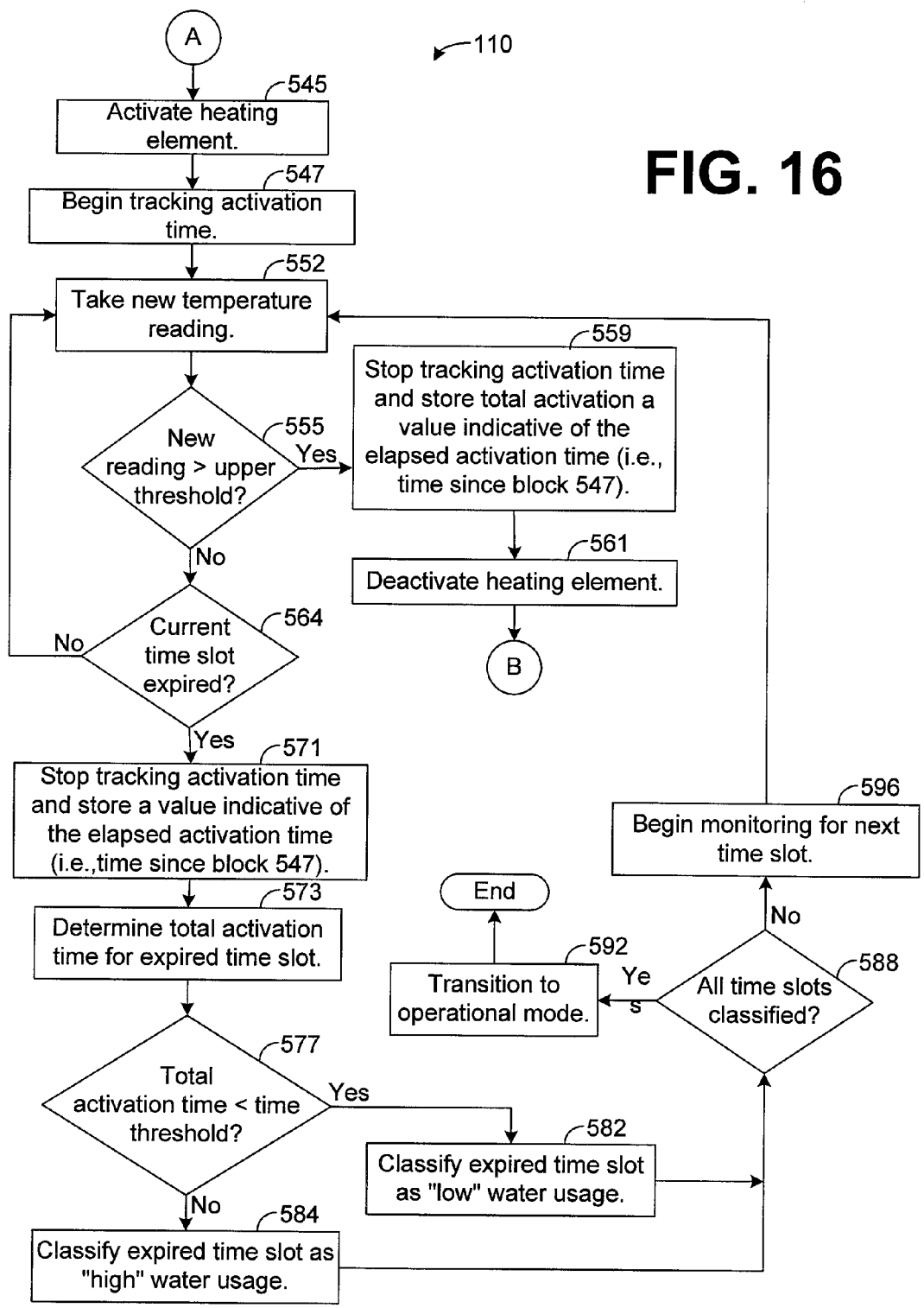

If the control logic 115 determines in block 511 that the temperature just sensed in block 508 is less than the lower threshold, the control logic 115 activates the heating element 25 and begins tracking the activation time of the heating element 25, as shown by blocks 545 and 547 of FIG. 16. In block 552, the control logic 115 takes a new temperature reading and then determines, in block 555, whether the temperature sensed by this new reading is greater than the upper threshold. If so, the control logic 115 stops tracking the activation time and determines a value indicative of the amount of time that elapsed between blocks 547 and 559 (i.e., indicative of the approximate amount of time that the heating element 25 was activated). As shown by blocks 559 and 561, the control logic 115 then stores the value in the usage history 161 and deactivates the heating element 25. The control logic 115 also takes a new temperature reading in block 508 (FIG. 15) and continues monitoring the current time slot.

If the control logic 115 determines in block 555 that the temperature sensed by the new temperature reading is less than the upper threshold, the control logic 115 refrains from deactivating the heating element 25. Instead, the control logic 115 determines whether the current time slot has expired, as shown by block 564. If the current time period has not expired, the control logic 115 returns to block 552. However, if the current time slot has expired, the control logic 115 stops tracking the activation time and a value indicative of the amount of time that elapsed between blocks 547 and 571 (i.e., indicative of the approximate amount of time that the heating element 25 was activated). As shown by blocks 571 and 573, the control logic 115 then stores this value and determines the total activation time for the current time slot, which has now expired. The total activation time corresponds to a sum of all of the values stored during the expired time slot via blocks 559 and 571. If the total activation time determined in block 573 is less than a time threshold, the control logic 115 classifies the expired time slot as a low water usage time slot, as shown by blocks 577 and 582. Otherwise, the control logic 115 classifies the expired time slot as a high water usage time slot, as shown by blocks 577 and 584.

After classifying the expired time slot, the control logic 115 determines in block 588 whether all of the time slots for an entire week have been monitored and classified. If so, the control logic 115 transitions to the operational mode, as shown by block 592, and the learn mode ends. If not, the control logic 115 begins monitoring the next time slot according to the same techniques described above, as shown by block 596.

Moreover, once the learn mode is complete, each time slot for an entire week has preferably been classified, and the classifications of the time slots are indicated by the data defining the usage history 161. As an example, FIG. 17 depicts an exemplary table 599 that may be defined by the usage history 161 once the control logic 115 has completed the learn mode. As shown by FIG. 17, each time slot may be classified as either a high water usage time slot or a low water usage time slot depending on the total amount of water usage that occurred for corresponding times during the learn mode.

Figure 18:
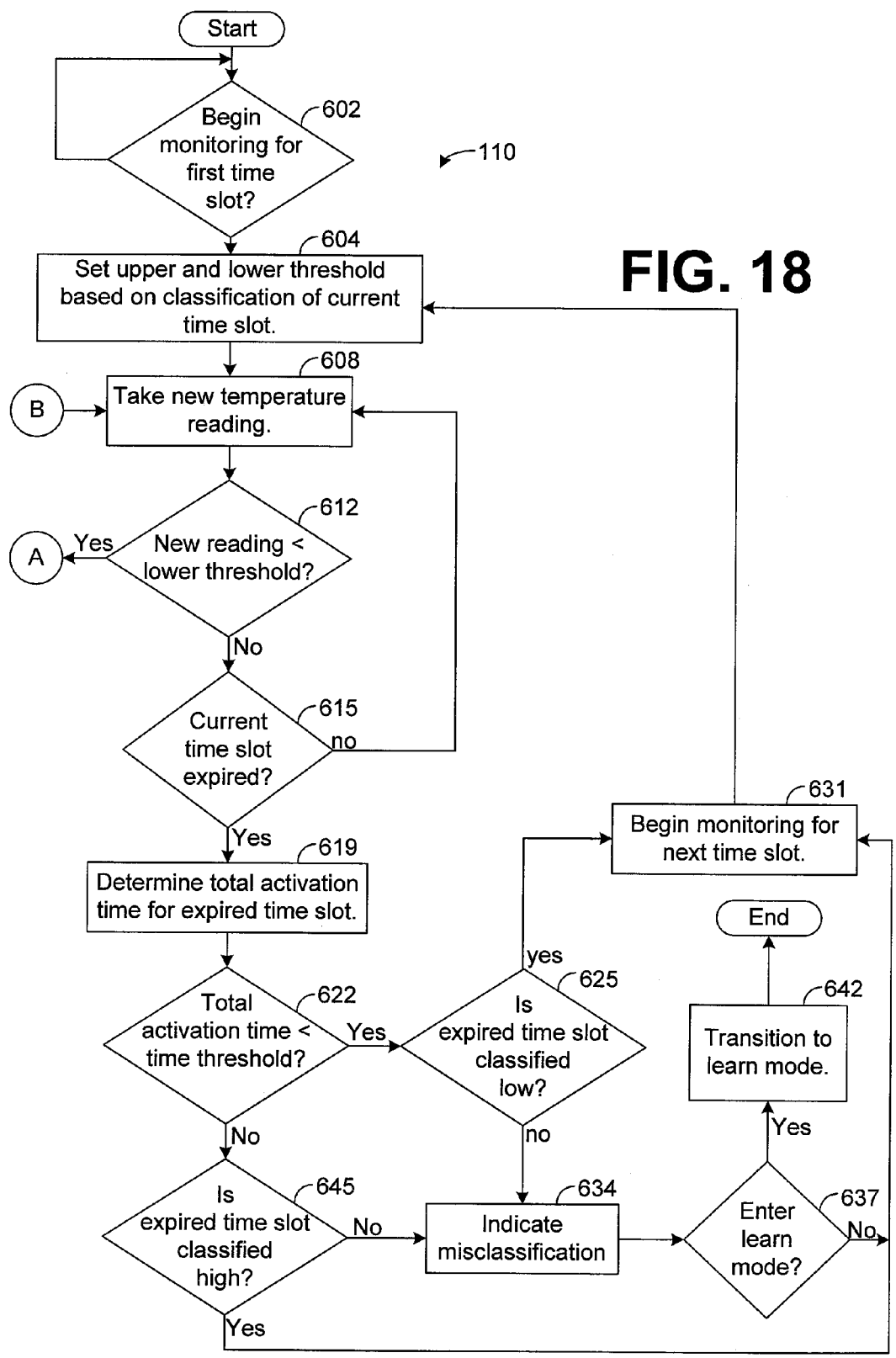
FIGS. 18 and 19 depict a flow chart illustrating an exemplary architecture and functionality of the controller depicted in FIG. 6 when the controller is operating in an operational mode in accordance with an exemplary embodiment of the present invention.
Figure 19:
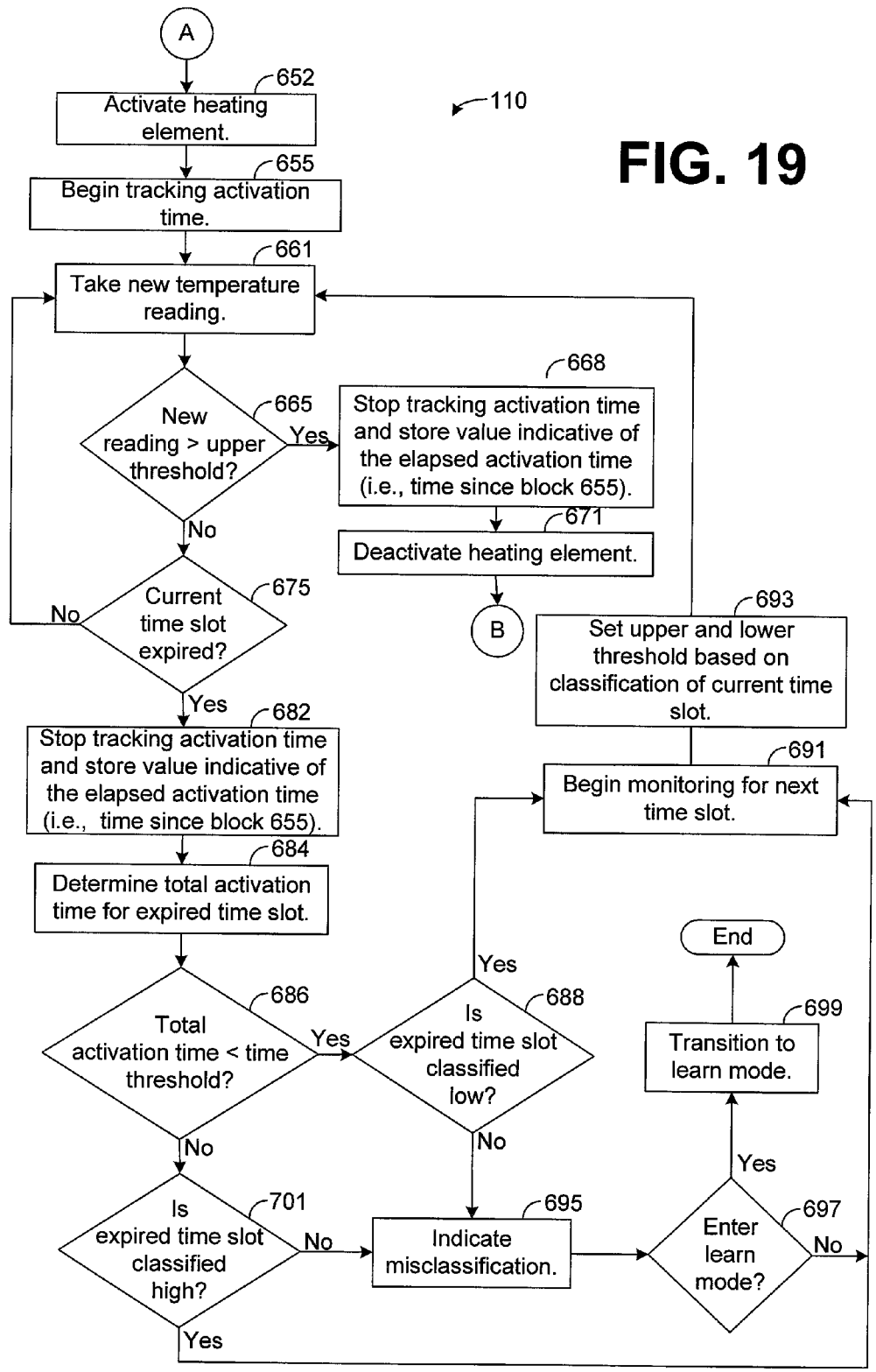
Figure 20:
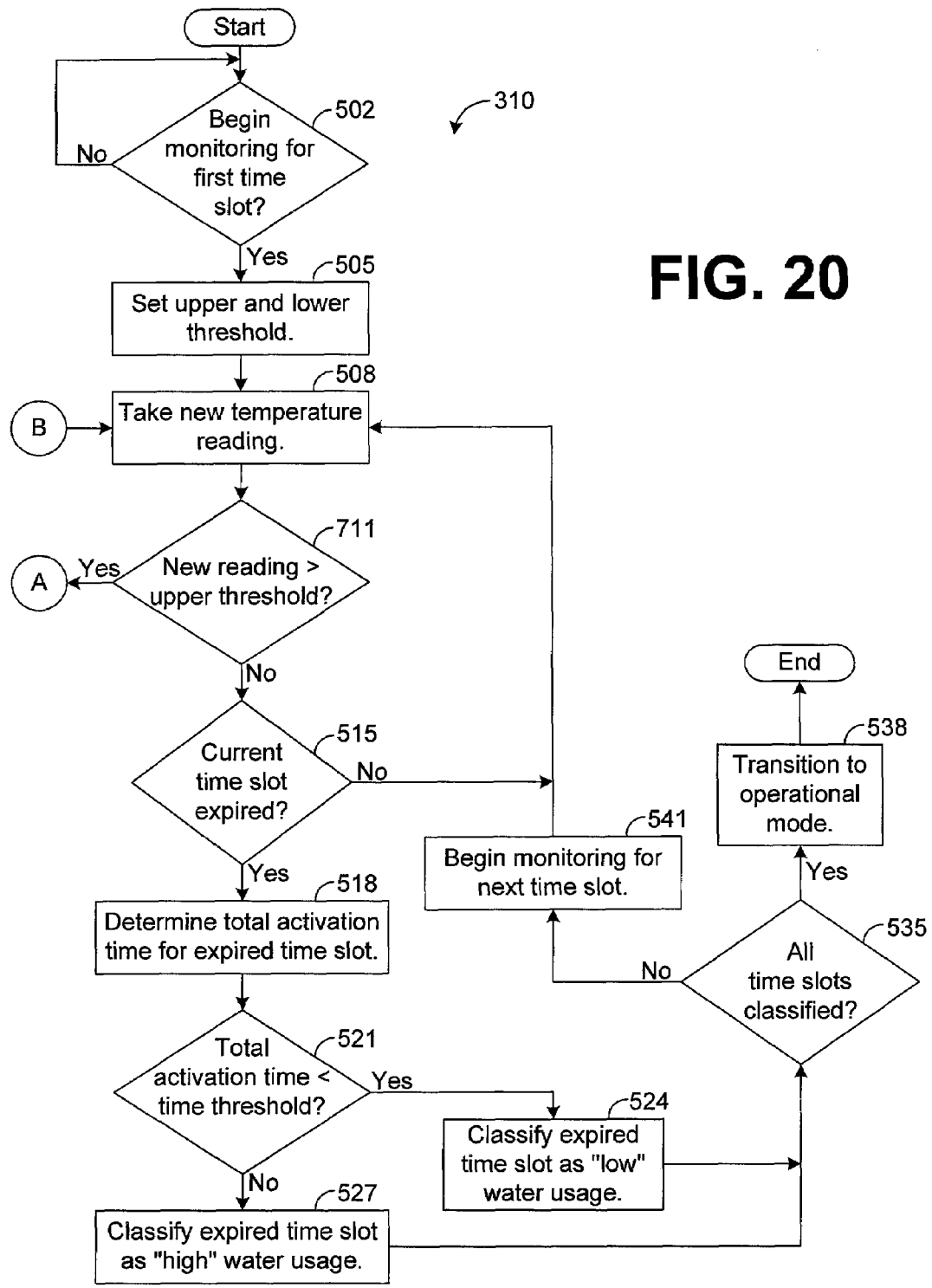
FIGS. 20 and 21 depict a flow chart illustrating an exemplary architecture and functionality of the controller depicted in FIG. 12 when the controller is operating in a learn mode in accordance with an exemplary embodiment of the present invention.
Figure 21:
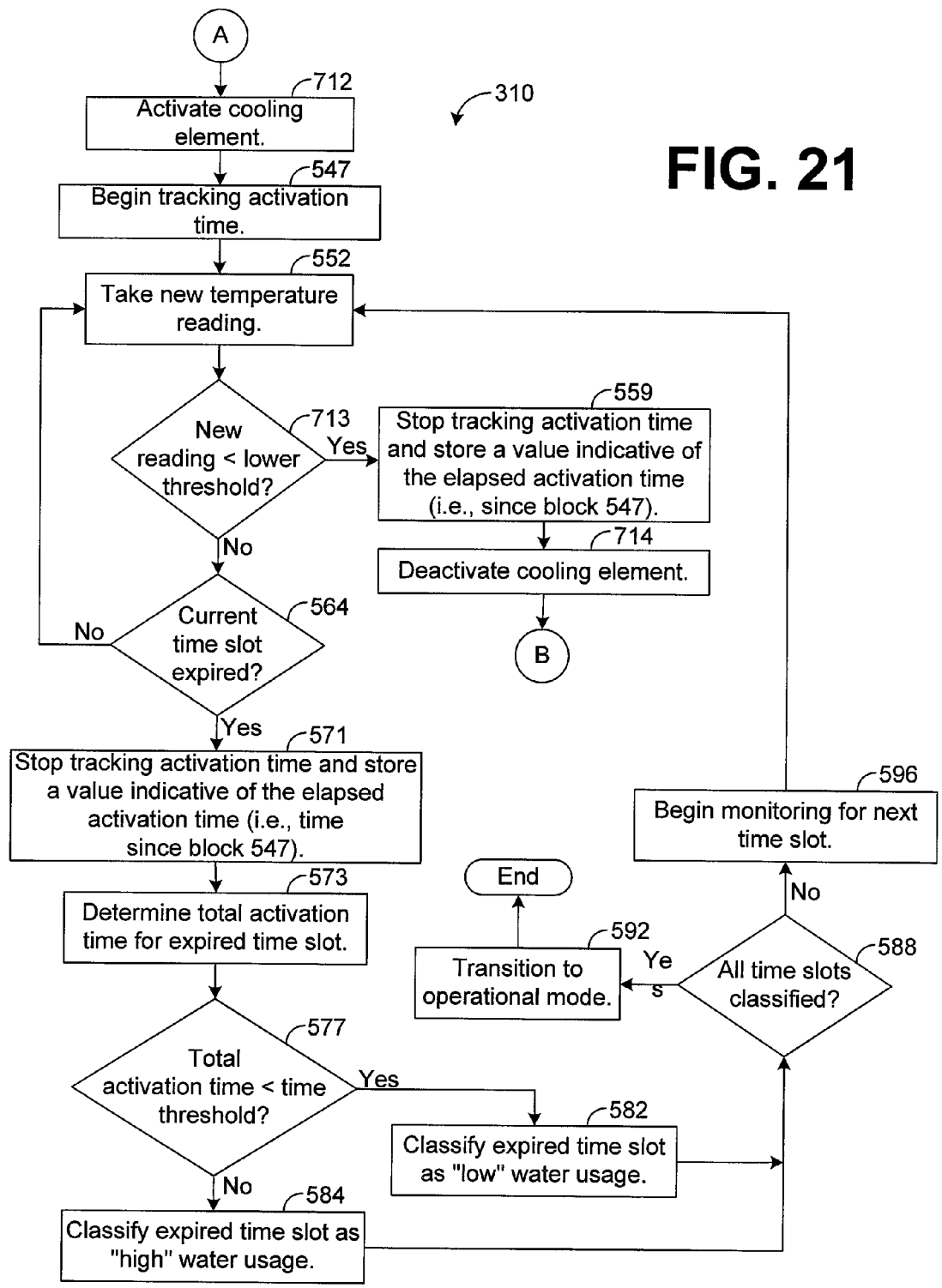

After entering the operational mode, the control logic 116, as shown by block 602 of FIG. 18, may wait for the next time slot to begin before initiating the monitoring and control process depicted by FIGS. 18 and 19. Upon initiating this process, the control logic 115 sets an upper and lower threshold depending on the classification of the current time slot, as indicated by the usage history 161. In this regard, if the current time slot is a low water usage time slot, as indicated by the usage history 161, the control logic 115 preferably sets the upper and lower thresholds according to a low (as compared to thresholds associated with high water usage time slots) set of thresholds. As an example, the control logic 115 may set the lower and upper thresholds to a first set of thresholds (e.g., 110 degrees Fahrenheit and 115 degrees Fahrenheit, respectively) if the current time slot is a low water usage time slot. However, if the current time slot is a high water usage time slot, as indicated by the usage history 161, then the control logic 115 preferably sets the lower and upper thresholds to a second set of higher thresholds (e.g., 145 degrees Fahrenheit and 150 degree Fahrenheit, respectively).

For example, assume that the operational mode begins on a Tuesday at 10:00 a.m. As indicated by FIG. 17, such a time slot is classified as low water usage. Therefore, the control logic 115, in block 604, sets the upper and lower thresholds to the first set of lower thresholds (e.g., 110 degrees Fahrenheit and 115 degrees Fahrenheit, respectively) and uses the first set of lower thresholds to control the heating element 25, as will be described in more detail hereinbelow. In another example, assume that the operational mode begins on a Tuesday at 8:00 a.m. As indicated by FIG. 17, such a time slot is classified as high water usage. Therefore, the control logic 115, in block 604, sets the upper and lower thresholds to the second set of higher thresholds (e.g., 145 degrees Fahrenheit and 150 degree Fahrenheit, respectively) and uses the second set of higher thresholds to control the heating element 25, as will be described in more detail hereinbelow. Note that the upper and lower thresholds may be "set" by loading the thresholds into a particular register, by modifying a pointer to point to the thresholds, or by implementing any other suitable technique for indicating that these thresholds are to be used for controlling the activation of the heating element 25 during the current time slot.

In block 608, the control logic 115 takes a new temperature reading via the temperature sensor 152. If the temperature sensed in block 608 exceeds the lower threshold set in block 604, then the control logic 115 refrains from activating the heating element 25. Instead, the control logic 115 determines whether the current time slot has expired, as shown by blocks 612 and 615. If the current time period has not expired, the control logic 115 returns to block 608. However, if the current time period has expired, the control logic 115 determines the total activation time for the expired time slot, as shown by block 619. Techniques for determining the total activation time will be described in more detail hereafter. The total activation time refers to the total amount of time that the heating element 25 was activated during the current time slot. The control logic 115 then compares, in block 622, the total activation time to a time threshold, which is preferably the same time threshold used in blocks 521 and 577 (FIGS. 15 and 16) of the learn mode.

If the total activation time is less than the time threshold, then the expired time slot experienced low water usage. Thus, the control logic 115, in block 625, checks to determine whether the usage history 161 indeed indicates that the expired time slot is associated with low water usage. If so, then the usage history 161 has correctly predicted the expected water usage for the expired time slot. Thus, the control logic 115 begins monitoring the next time slot, as shown by block 631, and returns to block 604 to set the upper and lower thresholds for the next time slot based on the usage history 161. However, if the usage history 161 indicates that the expired time slot is associated with high water usage, then the usage history 161 has incorrectly predicted the expected water usage for the expired time slot. In other words, the usage history 161, based on the actual water usage experienced during the expired time slot, has misclassified the time slot. In such a situation, the control logic 115 preferably logs or otherwise indicates the misclassification in block 634. If a sufficiently high number of misclassifications are logged within a specified time period (i.e., if the frequency of misclassifications is high), then the control logic 115 may determine in block 637 to revert back to the learn mode in an attempt to redefine the usage history 161 such that it better predicts the time slot classifications. In response to such a determination, the control logic 115 transitions from the operational mode to the learn mode and repeats the process depicted by FIGS. 15 and 16, as shown by block 642.

If a determination is made in block 622 that the total activation time exceeds the time threshold, then the expired time slot experienced high water usage. Thus, the control logic 115, in block 645, checks to determine whether the usage history 161 indeed indicates that the expired time slot is associated with high water usage. If so, then the usage history 161 has correctly predicted the expected water usage for the expired time slot. Thus, the control logic 115 begins monitoring the next time slot, as shown by block 631, and returns to block 604 to set the upper and lower thresholds for the next time slot based on the usage history 161. However, if the usage history 161 indicates that the expired time slot is associated with low water usage, then the usage history 161 has incorrectly predicted the expected water usage for the expired time slot. In such a situation, the control logic preferably logs or otherwise indicates the misclassification in block 634 and then determines whether to revert back to the learn mode in block 637 according to the techniques described above.

If the control logic 115 determines in block 612 that the temperature just sensed in block 608 is less than the lower threshold, the control logic 115 activates the heating element 25 and begins tracking the activation time of the heating element 25, as shown by blocks 652 and 655 of FIG. 19. In block 661, the control logic 115 takes a new temperature reading and then determines, in block 665, whether the temperature sensed by this new reading is greater than the upper threshold. If so, the control logic 115 stops tracking the activation time and determines a value indicative of the amount of time that elapsed between blocks 665 and 668 (i.e., indicative of the approximate amount of time that the heating element 25 was activated). As shown by blocks 668 and 671, the control logic 115 then stores the value in the usage history 161 and deactivates the heating element 25. The control logic 115 also takes a new temperature reading in block 608 (FIG. 18) and continues monitoring the current time slot.

If the control logic 115 determines in block 665 that the temperature sensed by the new temperature reading is less than the upper threshold, the control logic 115 refrains from deactivating the heating element 25. Instead, the control logic 115 determines whether the current time slot has expired, as shown by block 675. If the current time period has not expired, the control logic 115 returns to block 661. However, if the current time slot has expired, the control logic 115 stops tracking the activation time and determines a value indicative of the amount of time that elapsed between blocks 655 and 682 (i.e., indicative of the approximate amount of time that the heating element 25 was activated). As shown by blocks 682 and 684, the control logic 115 then stores this value and determines the total activation time for the current time slot, which has now expired. The total activation time corresponds to a sum of all of the values stored during the expired time slot via blocks 668 and 682. The control logic 115 then compares, in block 686, the total activation time to a time threshold, which is preferably the same time threshold used in blocks 521 and 577 (FIGS. 15 and 16) of the learn mode.

If the total activation time is less than the time threshold, then the expired time slot experienced low water usage. Thus, the control logic 115, in block 688, checks to determine whether the usage history 161 indeed indicates that the expired time slot is associated with low water usage. If so, then the usage history 161 has correctly predicted the expected water usage for the expired time slot. Thus, the control logic 115 begins monitoring the next time slot, as shown by blocks 691 and 693. Note that implementation of block 693 is preferably identical to block 604 (FIG. 18).

However, if the usage history 161 indicates that the expired time slot is associated with high water usage, then the usage history 161 has incorrectly predicted the expected water usage for the expired time slot. In such a situation, the control logic 115 preferably logs or otherwise indicates the misclassification in block 695. If a sufficiently high number of misclassifications are logged within a specified time period (i.e., if the frequency of misclassifications is high), then the control logic 115 may determine in block 697 to revert back to the learn mode in an attempt to redefine the usage history 161 such that it better predicts the time slot classifications. In response to such a determination, the control logic 115 transitions from the operational mode to the learn mode and repeats the process depicted by FIGS. 15 and 16, as shown by block 699.

If a determination is made in block 686 that the total activation time exceeds the time threshold, then the expired time slot experienced high water usage. Thus, the control logic 115, in block 701, checks to determine whether the usage history 161 indeed indicates that the expired time slot is associated with high water usage. If so, then the usage history 161 has correctly predicted the expected water usage for the expired time slot. Thus, the control logic 115 begins monitoring the next time slot, as shown by blocks 691 and 693, and returns to block 661. However, if the usage history 161 indicates that the expired time slot is associated with low water usage, then the usage history 161 has incorrectly predicted the expected water usage for the expired time slot. In such a situation, the control logic preferably logs or otherwise indicates the misclassification in block 695 and then determines whether to revert back to the learn mode in block 697.

It should be noted that the controller 310 for controlling the temperature of water within a liquid cooling system 300, similar to the controller 110 described above, may be configured to operate in a learn mode and an operational mode. It should be apparent to one of ordinary skill in the art, upon examining this disclosure, that a methodology similar to the one depicted by FIGS. 15, 16, 18, and 19 may be utilized to implement such a cooling system 300. Indeed, FIGS. 20-23 depict an exemplary methodology that may be used by the controller 310 for controlling the activation and deactivation of a cooling element 305. As can be seen by comparing FIGS. 20-23 to FIGS. 15-19, the methodology depicted by FIGS. 20-23 is substantially similar to the one depicted by FIGS. 15-19. However, in FIGS. 20-23, blocks 711-718 are respectively performed in lieu of blocks 511, 547, 555, 561, 612, 652, 665, and 671.

It should be further noted that the categorizing of time slots may be based on temperature values in lieu of or in addition to temperature control element activation times. In this regard, the temperature of the water within the tank 17 tends to rapidly decrease during times of high water usage for reasons previously set forth above. Thus, the temperature values sensed by the temperature sensor 152 may be used to detect time periods of high water usage. More specifically, the control logic 115 or 315 may be configured to classify a time period or time slot as a high usage time slot if a rate of change of the temperatures sensed by the temperature sensor 152 during the time slot is relatively high, and the control logic 115 or 315 may be configured to classify a time period or time slot as a low usage time slot if the rate of change of the temperatures sensed by the temperature sensor 152 during the time slot is relatively low.

Figure 24:
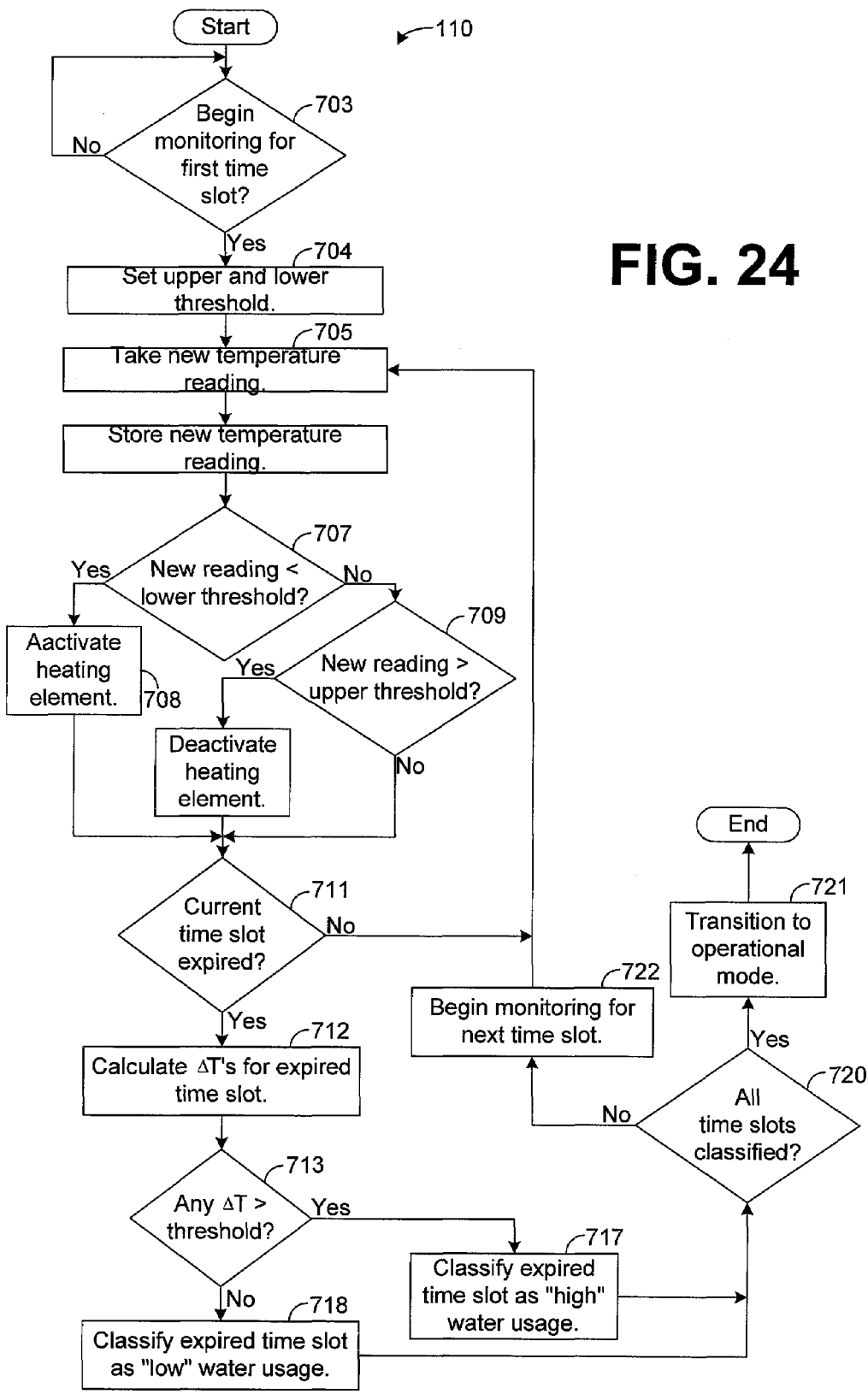
FIG. 24 is a flow chart illustrating an exemplary architecture and functionality of the controller depicted in FIG. 6 when the controller is operating in a learn mode and is determining time slot classifications based on the rates of change of sensed water temperature.
Figure 25:
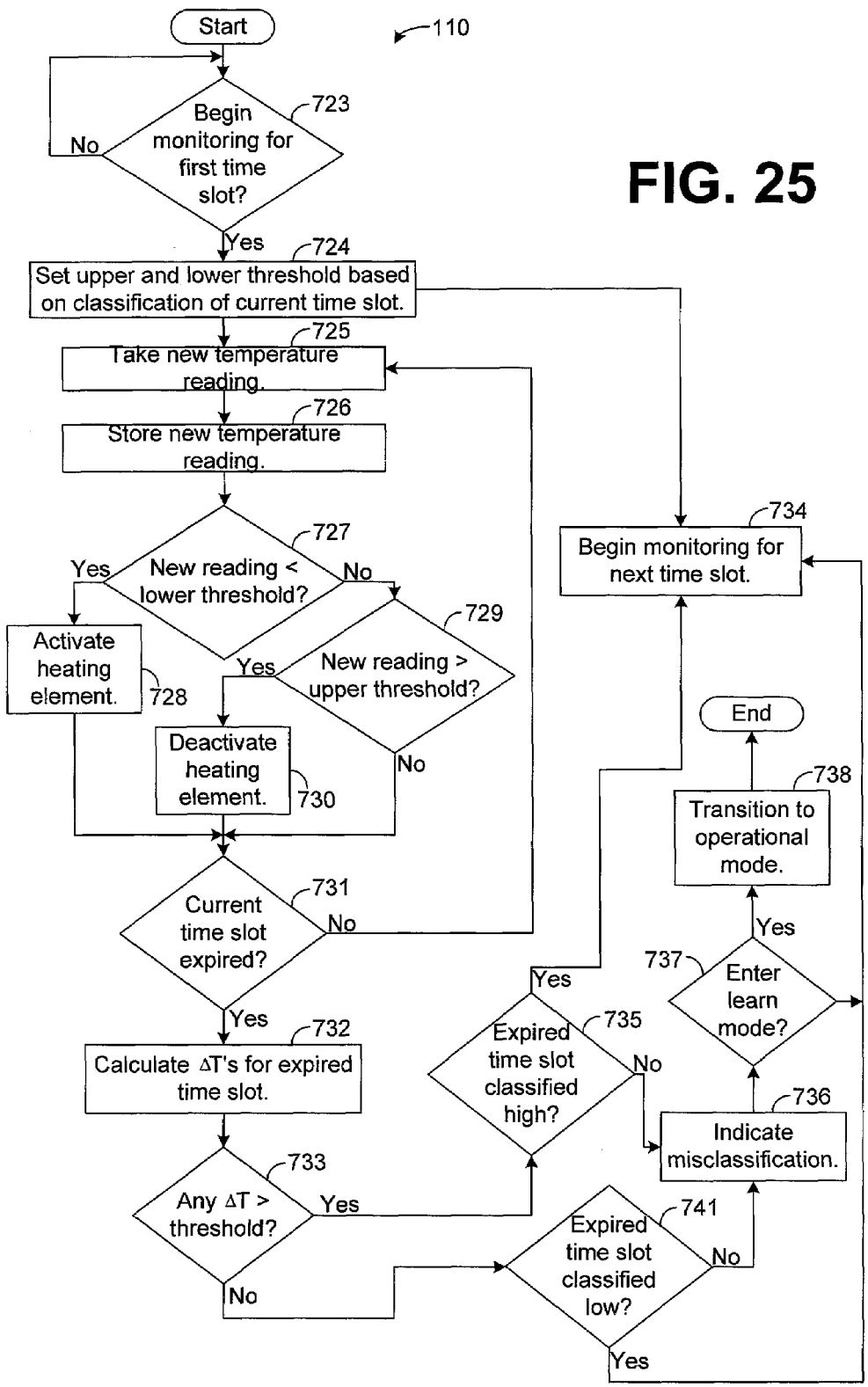
FIG. 25 is a flow chart illustrating an exemplary architecture and functionality of the controller depicted in FIG. 6 when the controller is operating in an operational mode and is determining time slot classifications based on the rates of change of sensed water temperature.

FIGS. 24 and 25 depict an exemplary methodology that may be employed by the control logic 115 to classify time slots based on sensed temperature values. In this regard, as shown by blocks 703 and 704 of FIG. 24, the control logic 115 sets an upper temperature threshold and a lower temperature threshold after beginning the learn mode. Then, the control logic 115 takes and stores a new temperature reading, as shown by blocks 705 and 706, based on the data provided by the temperature sensor 152. If the new reading is below the lower temperature threshold set in block 703, then the control logic 115 activates the heating element 25, as shown by blocks 707 and 708. However, if the new reading is higher than the upper threshold set in block 703, the control logic 115 deactivates the heating element 25, as shown by blocks 709 and 710. As shown by block 711, the control logic 115 continues implementing blocks 705-710 until the current time slot expires.

Once the time slot expires, the control logic 115 preferably determines, based on the temperature readings stored in block 706, varies rates of change of the temperatures sensed by the temperature sensor 152 during the expired time period, as shown by block 712. As an example, the control logic 115 may determine the rate of temperature change ($\Delta T$) for some fixed interval (e.g., every x minutes during the expired time slot, where x is any real number between 0 and 60 but preferably between 0 and a number significantly smaller than 60, such as 10, for example). Each such rate of temperature change may then be compared to a threshold to determine whether the expired time slot should be characterized as a high usage time slot or a low usage time slot. In particular, if any of the rates of change exceeds the threshold, then the control logic 115 may classify the expired time slot as a high usage time slot, as shown by blocks 713 and 717. However, if none of the rates of change exceeds the threshold, then the control logic 115 may classify the expired time slot as a low usage time slot, as shown by blocks 713 and 718. As in the embodiments previously described above, the control logic 115 preferably stores, in the usage history 161, data indicative of the time slot's classification.

As shown by blocks 720 and 721, the aforementioned process repeats for each time slot until all of the time slots have been monitored and classified. Once this occurs, the control logic 115 preferably exits the learn mode and enters the operational mode, as shown by blocks 720 and 722. As can be seen by comparing FIG. 25 to FIG. 24, the control logic 115, upon entering the operational mode, performs blocks 723-733 of FIG. 25 similar to blocks 703-713 of FIG. 24. However, in block 704, the control logic 115 sets the upper and lower thresholds for the current time slot based on the classification of the current time slot, as indicated by the usage history 161. As an example, if the current time slot is classified as a high usage slot by the usage history 161, the control logic 115 preferably selects upper and lower thresholds that are respectively higher than the thresholds selected when the current time slot is classified as a low usage time slot.

Further, a "yes" determination in block 733 indicates that the current time slot experienced high water usage. Thus, the control logic 115 determines in block 735 whether the expired time slot is classified as a high usage time slot by the usage history 161. If so, the usage history 161 correctly predicted the actual water usage for the expired time slot, and the control logic 115 begins monitoring for the next time slot, as shown by block 734. However, if the expired time slot is classified as a low usage time slot by the usage history 161, then the usage history 161 incorrectly predicted the actual water usage for the expired time slot. Therefore, the control logic 115 logs the misclassification in block 736, and the control logic 115 may then determine whether to revert back to the learn mode, as shown by blocks 737 and 738.

Conversely, a "no" determination in block 733 indicates that the current time slot experienced low water usage. Thus, the control logic 115 determines in block 741 whether the expired time slot is classified as a low usage time slot by the usage history 161. If so, the usage history 161 correctly predicted the actual water usage for the expired time slot, and the control logic 115 begins monitoring for the next time slot, as shown by block 734. However, if the expired time slot is classified as a low usage time slot by the usage history 161, then the usage history 161 incorrectly predicted the actual water usage for the expired time slot. Therefore, the control logic 115 logs the misclassification in block 736, and the control logic 115 may then determine whether to revert back to the learn mode, as shown by blocks 737 and 738. Note that a similar methodology may be used to control the state of a cooling element 305, if desired.

In yet another example, the control logic 115 or 315 may be configured to classify time slots based on the absolute temperature values sensed by the temperature sensor 152 rather than the rate of change of the sensed temperature. In this regard, during times of high water usage, the temperature of the water within the tank 17 is likely to reach a lower value than in times of low water usage. Thus, the control logic 115 or 315 may be configured to determine whether a time slot is a high or low usage time slot by comparing the highest or lowest sensed temperature value to a threshold.

In particular, the control logic 115 may be configured to classify a time slot as a high usage time slot if the lowest temperature value or a value close to the lowest temperature value sensed during the time slot falls below a specified threshold. If such a temperature value is higher than the threshold, then the control logic 115 may be configured to classify the time slot as a low usage time slot. Further, the control logic 315 of cooling system 300 may be configured to classify a time slot as a high usage time slot if the highest temperature value or a value close to the highest temperature value sensed during the time slot exceeds a specified threshold. If such a temperature values is lower than the threshold, then the control logic 315 may be configured to classify the time slot as a low usage time slot.

Additionally, the control logic 115 or 315 may be configured to classify times slots based on a combination of parameters, such as the activation times of temperature control elements 25 or 305, rates of change of water temperature, and/or absolute water temperatures. In this regard, each parameter may be a factor in the overall decision as to whether a time slot should be characterized as a high usage time slot or a low usage time slot.

Furthermore, the thresholds compared to the aforementioned parameters for determining water usage may be predefined, defined by a user, or dynamically determined by the control logic 115 or 315. To dynamically determine the thresholds, the control logic 115 or 315 may monitor the parameters over time to determine a pattern or range for the parameters during different types of water usage. For example, the control logic 115 or 315 may monitor the temperature sensed by the temperature sensor 152 and determine that the rate of temperature change usually remains within a particular range over time. It may be assumed that rates of temperature change toward the lower end of the range occur during low usage time periods and that the rates of temperature change toward the upper end of the range occur during high usage time periods. Thus, the control logic 115 or 315 may be configured to automatically set the thresholds used to classify time slots based on the detected range. For example, the control logic 115 or 315 may set a threshold half-way (or some other percentage) between the maximum and minimum values of the range and may use this threshold in blocks 713 and 733 of FIGS. 24 and 25.

In another example where the logic 115 or 315 uses temperature control element activation times to classify slots, the control logic 115 or 315 may monitor, over time, the total activation times for various time slots and determine that the total activation times usually remain within a particular range. It may be assumed that total activation times toward the lower end of the range occur during low usage time periods and that total activation times toward the upper end of the range occur during high usage time periods. Thus, the control logic 115 or 315 may be configured to automatically set the thresholds used to classify time slots based on the detected range. For example, the control logic 115 or 315 may set a threshold half-way (or some other percentage) between the maximum and minimum total activation times of the range and may use this threshold to classify time slots. In this regard, the control logic 115 may classify a time slot as a high usage time slot if the total activation time of its heating element 25 exceeds the threshold and may classify the time slot as a low usage time slot if the total activation time of its heating element 25 falls below the threshold.

In another example where the logic 115 uses absolute temperatures to classify time slots, the logic 115 may be configured to determine a value indicative of the lowest temperature detected by the temperature sensor 152 over a specified time interval. It may be assumed that such a value is detected during a high usage time period. Thus, the control logic 115 may set a threshold to some value slightly higher than foregoing determined value and may use this threshold to classify time slots. In this regard, if the temperature of the water falls below this threshold during a particular time slot, the control logic 115 may be configured to classify the time slot as a high usage time slot. Otherwise, the time slot may be classified as a low usage time slot.

Similarly, the logic 315 may be configured to determine a value indicative of the highest temperature detected by the temperature sensor 152 over a specified time interval. It may be assumed that such a value is detected during a high usage time period. Thus, the control logic 315 may set a threshold to some value slightly lower than foregoing determined value and may use this threshold to classify time slots. In this regard, if the temperature of the water exceeds this threshold during a particular time slot, the control logic 315 may be configured to classify the time slot as a high usage time slot. Otherwise, the time slot may be classified as a low usage time slot.

Warning of Temperature Control Element Failure

As set forth hereinabove, a value indicative of the resistance of the heating element 25 may be measured and compared to a threshold to determine when failure of the heating element 25 is imminent. When imminent failure of the heating element 25 is detected, a warning may be provided in order to enable the problem to be proactively addressed.

Furthermore, similar techniques may be used to predict when failure of a cooling element 305 is imminent and to provide a warning when it is determined that failure of the cooling element 305 is imminent. In this regard, an increase in the resistance of a cooling element 305 may indicate that failure of the cooling element 305 is imminent. Therefore, a monitoring element 162 (FIG. 12) may be used to determine a value indicative of the resistance of the cooling element 305, and the control logic 315 may compare this value to a threshold to determine whether failure of the cooling element 305 is imminent and, therefore, whether a warning should be provided. Note that other techniques for determining when failure of a heating element 25 or cooling element 305 are possible.

It should also be noted that it is not necessary for the control logic 115 and 315 to provide the functionality of both providing advanced warning of a failure of a temperature control element (e.g., heating element 25 or cooling element 305) and controlling the activation/deactivation state of the temperature control element as described herein. More specifically, it is possible for the control logic 115 and 315, in combination with the monitoring element 162, to monitor the state (e.g., resistance) of a temperature control element 25 or 305 and to provide a warning of imminent failure of the temperature control element 25 or 305 without controlling the activation and deactivation of the temperature control element 25 or 305, according to the techniques described herein. Conversely, it is possible for the control logic 115 and 315 to control the activation and deactivation of a temperature control element 25 or 305, according to the techniques described herein, without monitoring the state of temperature control element 25 or 305 for the purposes of providing advanced warning of the element's failure.

Figure 26:
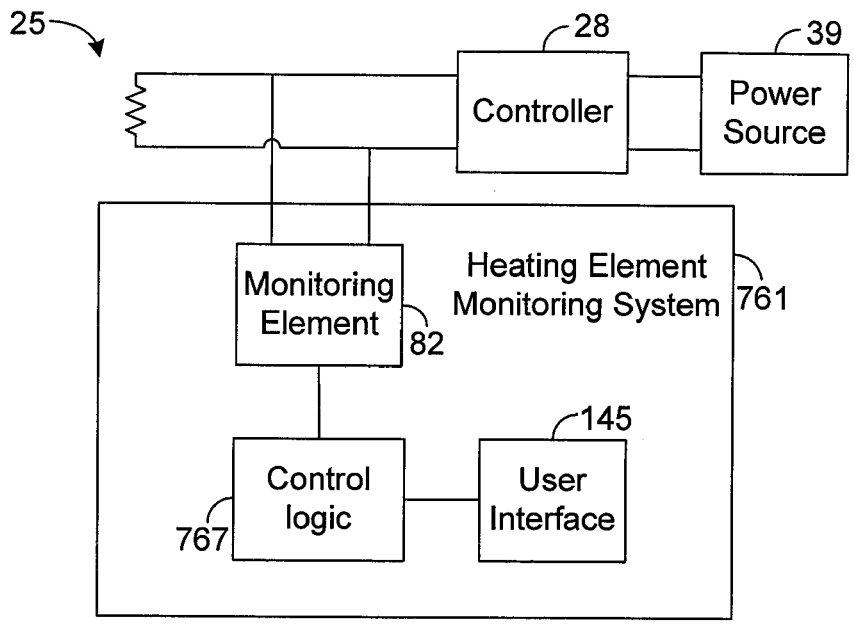
FIG. 26 is a block diagram illustrating an exemplary embodiment of a heating element monitoring system that may be used to provide advanced warning of an imminent failure of a heating element.
Figure 27:
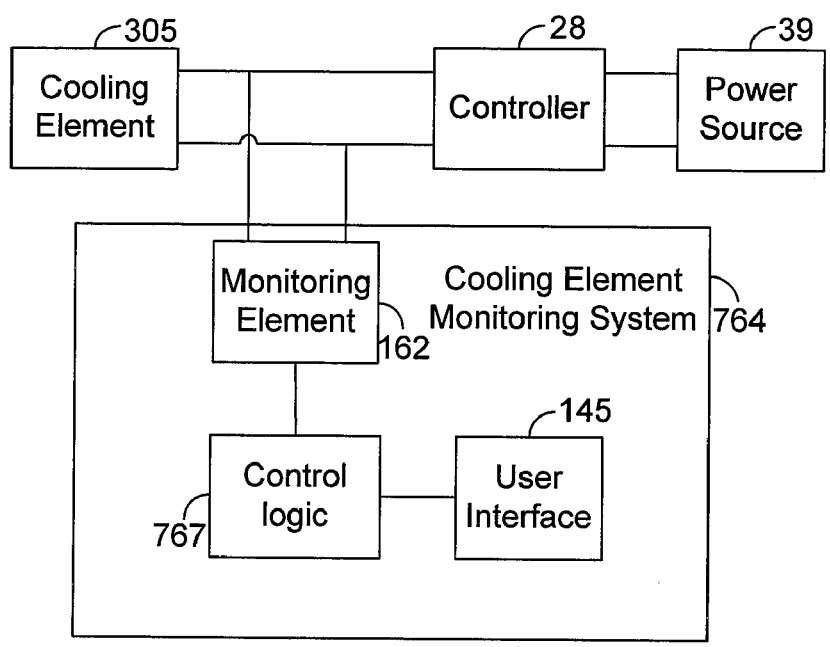
FIG. 27 is a block diagram illustrating an exemplary embodiment of a cooling element monitoring system that may be used to provide advanced warning of an imminent failure of a cooling element.

Indeed, FIGS. 26 and 27 depict embodiments where control of the activation and deactivation of a temperature control element is retained by a conventional controller 28 while a monitoring system 761 or 764 is configured to monitor the state of a temperature control element 25 or 305 according to the techniques described herein in order to determine when failure of the temperature control element is imminent. Further, FIG. 28 depicts an exemplary operation of the monitoring systems 761 and 764 in providing advanced warning of a failure of a temperature control element.

Figure 28:
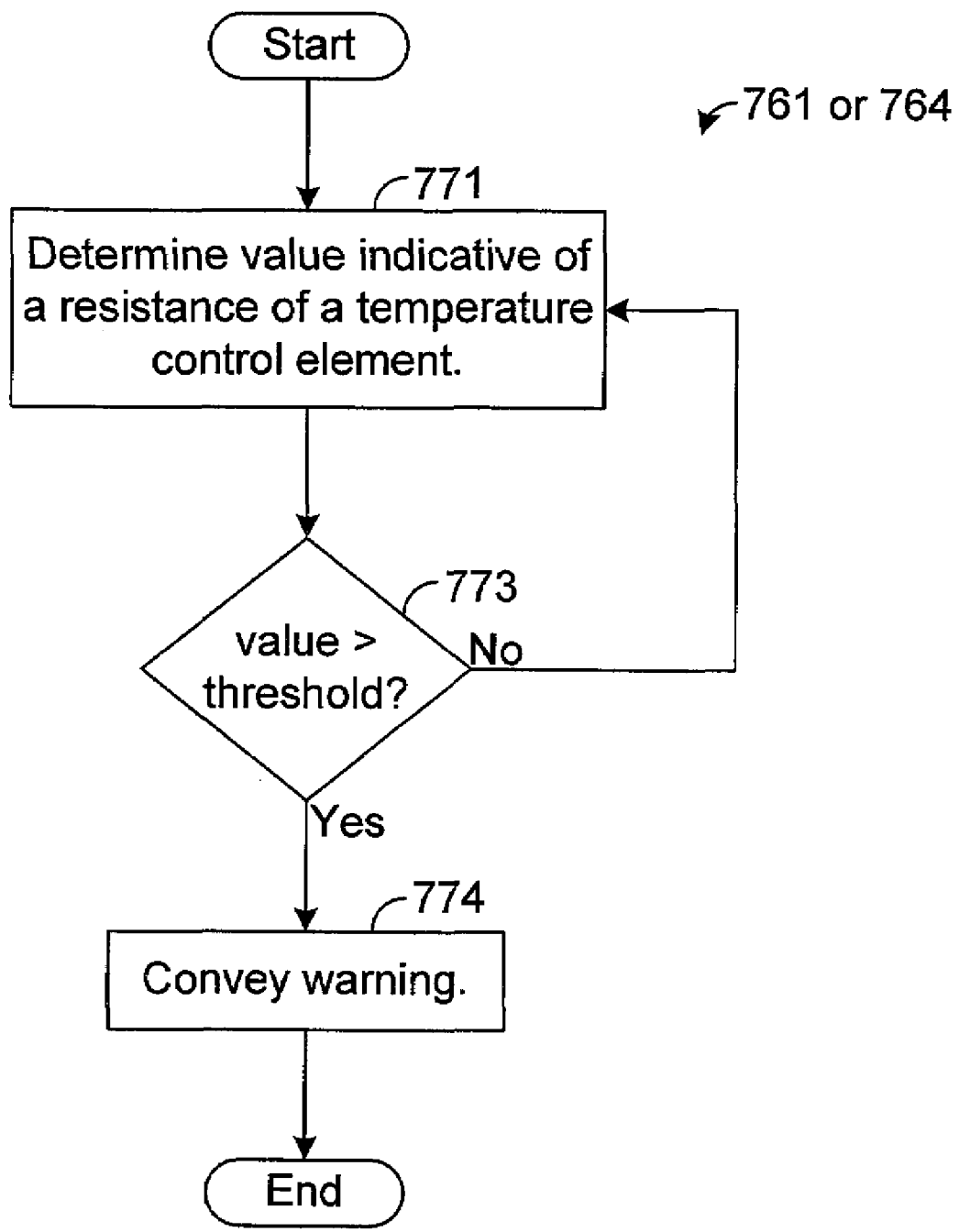
FIG. 28 is a flow chart illustrating an exemplary architecture and functionality of control logic, such as depicted in FIGS. 26 and 27.

In this regard, FIG. 28 depicts an embodiment where a conventional controller 28 controls activation of a heating element 25 and where a monitoring element 162 and control logic 767 determine when failure of the heating element 25 is imminent. More particularly, the monitoring element 162, in block 771 of FIG. 28, preferably determines a value indicative of the heating element's resistance, and the control logic 115 preferably compares this value to a threshold. The threshold is preferably set such that when the determined value exceeds the threshold, failure of the heating element 25 is imminent. Thus, when the determined value exceeds the threshold, the control logic 767 controls the state of a user interface 145 such that a warning regarding the imminent failure of the heating element 25 is conveyed to a user, as shown by blocks 773 and 774 of FIG. 28. As an example, the user interface 145 may comprise an LED (not shown) that is normally "off" (i.e., does not emit light) when failure of the heating element 25 is not imminent. When the control logic 767 detects an imminent failure of the heating element 25, the control logic 767 may activate the LED such that it emits light. In such an example, the emission of light from the LED is indicative of an imminent failure of the heating element 25.

Similarly, FIG. 27 depicts an embodiment where a conventional controller 28 controls activation of a cooling element 305 and where a monitoring element 162 and control logic 727 determine when failure of the cooling element 305 is imminent. More particularly, the monitoring element 162, in block 771 of FIG. 28, preferably determines a value indicative of the cooling element's resistance, and the control logic 767 preferably compares this value to a threshold. The threshold is preferably set such that when the determined value exceeds the threshold, failure of the cooling element 305 is imminent. Thus, when the determined value exceeds the threshold, the control logic 767 controls the state of a user interface 145 such that a warning regarding the imminent failure of the cooling element 305 is conveyed to a user, as shown by blocks 773 and 774 of FIG. 28. As an example, the user interface 145 may comprise an LED (not shown) that is normally "off" (i.e., does not emit light) when failure of the cooling element 305 is not imminent. When the control logic 767 detects an imminent failure of the cooling element 305, the control logic 767 may activate the LED such that it emits light. In such an example, the emission of light from the LED is indicative of an imminent failure of the cooling element 305.

Of course, it is not necessary for a conventional controller 28 to control the activation and deactivation of the temperature control element 25 or 305 being monitored by the control logic 767. According to the techniques previously described hereinabove, the control logic 767 used to monitor a temperature control element 25 or 305 for imminent failure may also provide the functionality of controlling the activation and deactivation of the temperature control element 25 or 305. Note that the control logic 767 may be implemented via hardware, software, or any combination thereof. When implemented in software, the control logic 767 may be stored on a computer-readable medium.

It should be further noted that it is not necessary for the value compared to a threshold in block 773 of FIG. 28 to indicate the magnitude of the temperature control element's resistance. For example, as previously described hereinabove, it is possible for measured current values or voltage values to be indicative of the resistance of the temperature control element. In another example, the monitoring element 162 may be configured to measure the change in the temperature control element's resistance over time. A threshold may be set such that failure of the temperature control element 25 or 305 is imminent when such a measured value exceeds the threshold. In such a case, the control logic 727 may be configured to convey a warning when the measured value, which represents a difference in the temperature control element's resistance over time, exceeds the foregoing threshold. Various other techniques for predicting when failure of the temperature control element 25 or 305 are possible.

Hysteresis Control

As previously described hereinabove, the control logic 115 and 315 may be configured to provide hysteresis. In this regard, during a time slot when it is desirable for the temperature of the water within the tank 17 to be maintained at or close to a desired temperature (e.g., 130 degrees Fahrenheit), the control logic 115 or 315 may be configured to activate and deactivate at slightly different temperatures (e.g., 125 and 135 degrees Fahrenheit) in order to provide hysteresis. If desired, the control logic 115 and/or 315 may be configured to control hysteresis based on the usage history 161.

As an example, the control logic 115 or 315 may be configured to provide a greater hysteresis effect for time slots associated with low water usage by the usage history 161 and a lesser hysteresis effect for time slots associated with high water usage. For example, for time slots of low water usage, the control logic 115 may activate and deactivate one or more temperature control elements 25 when the temperature of the water respectively exceeds and falls below the temperature thresholds of 115 degrees Fahrenheit and 125 degrees Fahrenheit, thereby providing a 10 degree differential between the two thresholds. However, for time slots of high water usage, the control logic 115 may activate and deactivate one or more temperature control elements 25 when the temperature of the water exceeds and falls below 142 degrees Fahrenheit and 146 degrees Fahrenheit, thereby providing only a 4 degree differential between the two thresholds.

Note that there are various advantages that may be achieved by controlling the threshold hysteresis, as described above. For example, the threshold hysteresis may be controlled in order to increase the efficiency and/or performance of the system 100 or 300. In this regard, assume that it is desirable for the approximate temperature of the water within the tank 17 to be approximately 130 degrees Fahrenheit (e.g., a user sets the desired temperature to approximately 130 degrees Fahrenheit) for a particular time period. During such a time period, the control logic 115 of the liquid heating system 100 may be configured to activate the heating element 25 based on a lower temperature threshold of 125 degrees Fahrenheit and to deactivate the heating element 25 based on an upper threshold temperature of 135 degrees Fahrenheit, thereby providing a ten degree hysteresis effect. However, if a high usage event (i.e., an event drawing a significant amount of water from the tank 17) occurs, it is possible for the temperature within the tank 17 to fall to undesirably low levels substantially below the lower temperature threshold.

Moreover, if temperature thresholds providing less hysteresis are used in lieu of the foregoing thresholds, then the lowest temperature to which the water falls due to the same high usage event may be higher than the lowest temperature for an embodiment using temperature thresholds that provide greater hysteresis. In this regard, assume that a lower temperature threshold of 128 degrees and an upper temperature threshold of 132 degrees are used to control the state of the heating element 25, thereby providing only a four degree hysteresis effect. In such an embodiment, the heating element 25 is activated more frequently than in the previously described embodiment (i.e., the embodiment having a ten degree hysteresis effect). Indeed, the control logic 115 is likely to respond (e.g., activate the heating element 25) more quickly in response to a high usage event. As a result, the lowest temperature reached by the water due to the high usage event may be higher for the embodiment having temperature thresholds that provide a smaller hysteresis effect (i.e., that have a lower temperature difference between the upper threshold and the lower threshold).

Thus, for time periods or time slots associated with high usage patterns by the usage history 161, the control logic 115 preferably decreases the hysteresis (i.e., decreases the temperature difference between the upper threshold and lower threshold) of the thresholds used to control the heating element 25 in addition to or in lieu of increasing the average temperature of the thresholds. Further, for time periods or time slots associated with high usage patterns by the usage history 161, the control logic 315 preferably decreases the hysteresis effect of the thresholds used to control the cooling element 305 in addition to or in lieu of decreasing the average temperature of the thresholds.

Figure 29:
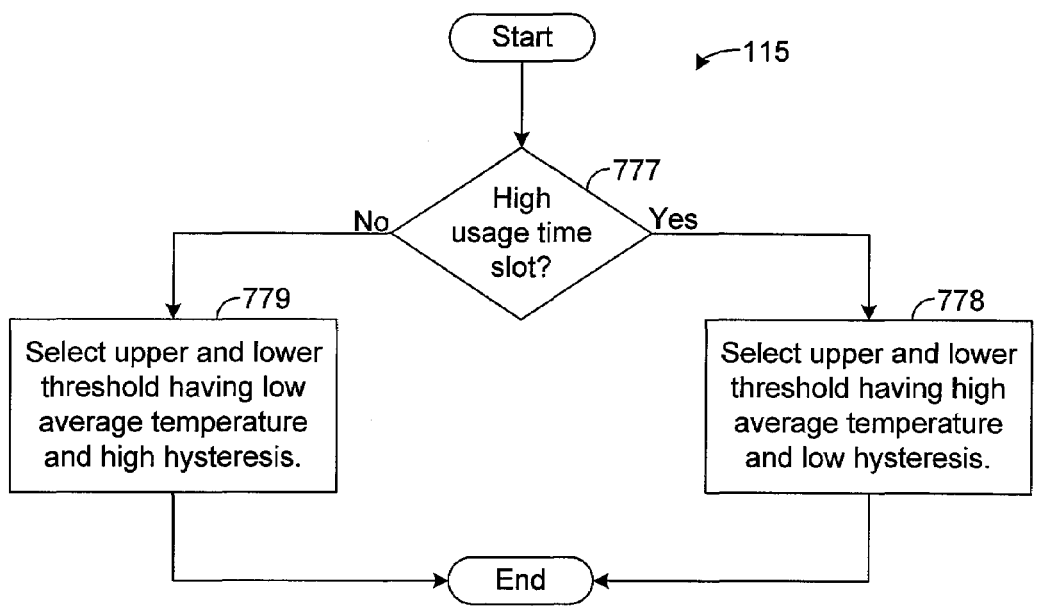
FIG. 29 is a flow chart illustrating an exemplary architecture and functionality of control logic, such as depicted in FIG. 6, in setting an upper threshold and a lower threshold for use during a current time slot.

As an example, in implementing block 604 or 693 of FIGS. 18 and 19, the control logic 115 may select an upper threshold and a lower threshold having a high temperature average and a low hysteresis, as shown by blocks 777 and 778 of FIG. 29, if the current time slot being monitored is a high usage time slot, as indicated by the usage history 161. Note that the temperature average ($T_{avg}$) may be calculated according to the equation:

$$T_{avg}=(T_{upper}+T_{lower})/2$$

and the hysteresis (HYS) may be calculated according to the equation:

$$HYS=T_{upper}-T_{lower}.$$

Further, the control logic 115 may select an upper threshold and a lower threshold having a low temperature average and a high hysteresis, as shown by blocks 777 and 779 of FIG. 29, if the current time slot being monitored is a low usage time slot, as indicated by the usage history 161. Of course, in other embodiments, the control logic 115 may be configured to only adjust the temperature average or the hysteresis based on the classification of the current time slot, if desired. In this regard, it is not necessary to select the temperature thresholds such that both the temperature average and the hysteresis of the selected thresholds are different for different time slot classifications.

Figure 22:
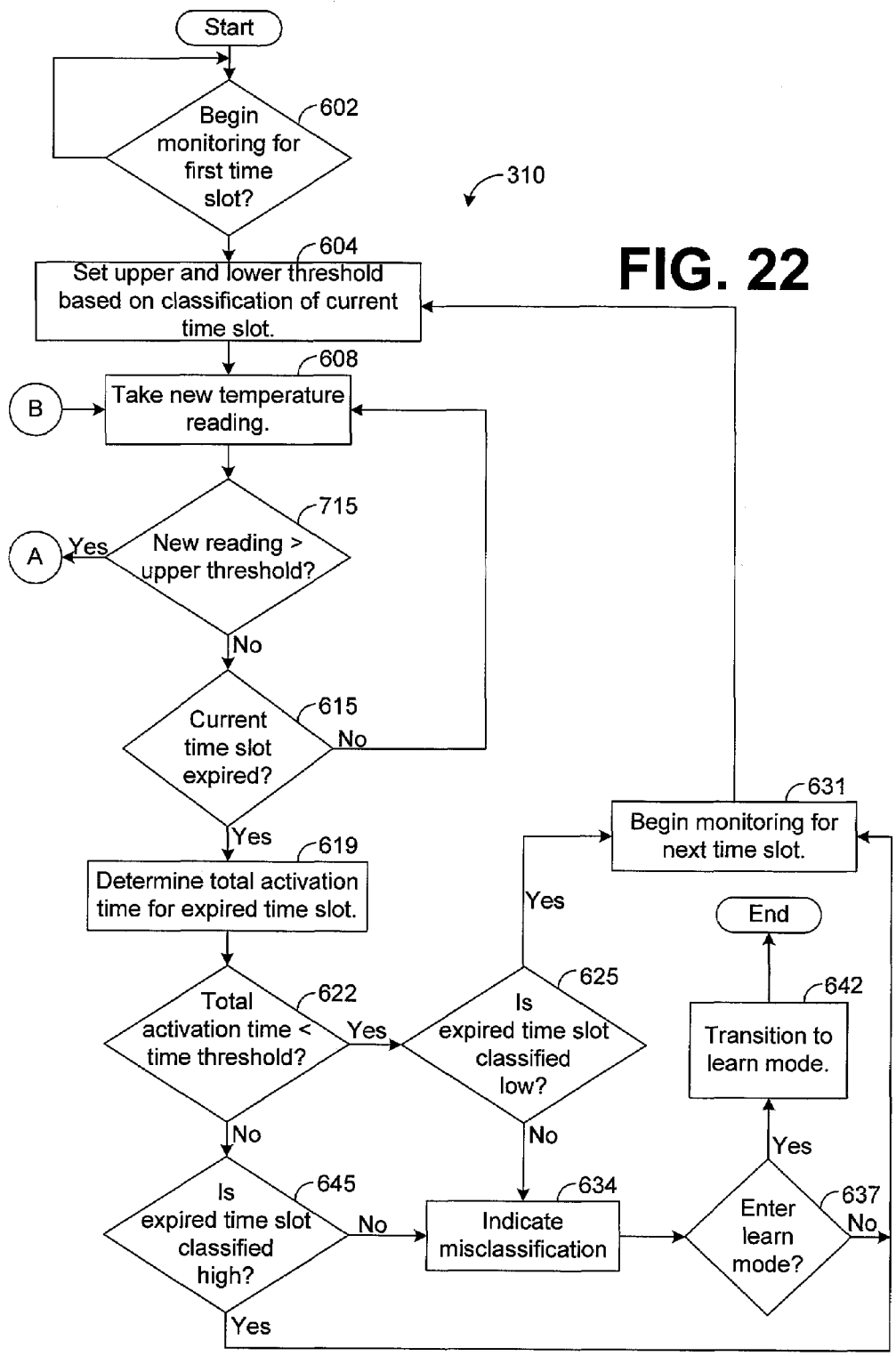
FIGS. 22 and 23 depict a flow chart illustrating an exemplary architecture and functionality of the controller depicted in FIG. 12 when the controller is operating in an operational mode in accordance with an exemplary embodiment of the present invention.
Figure 23:
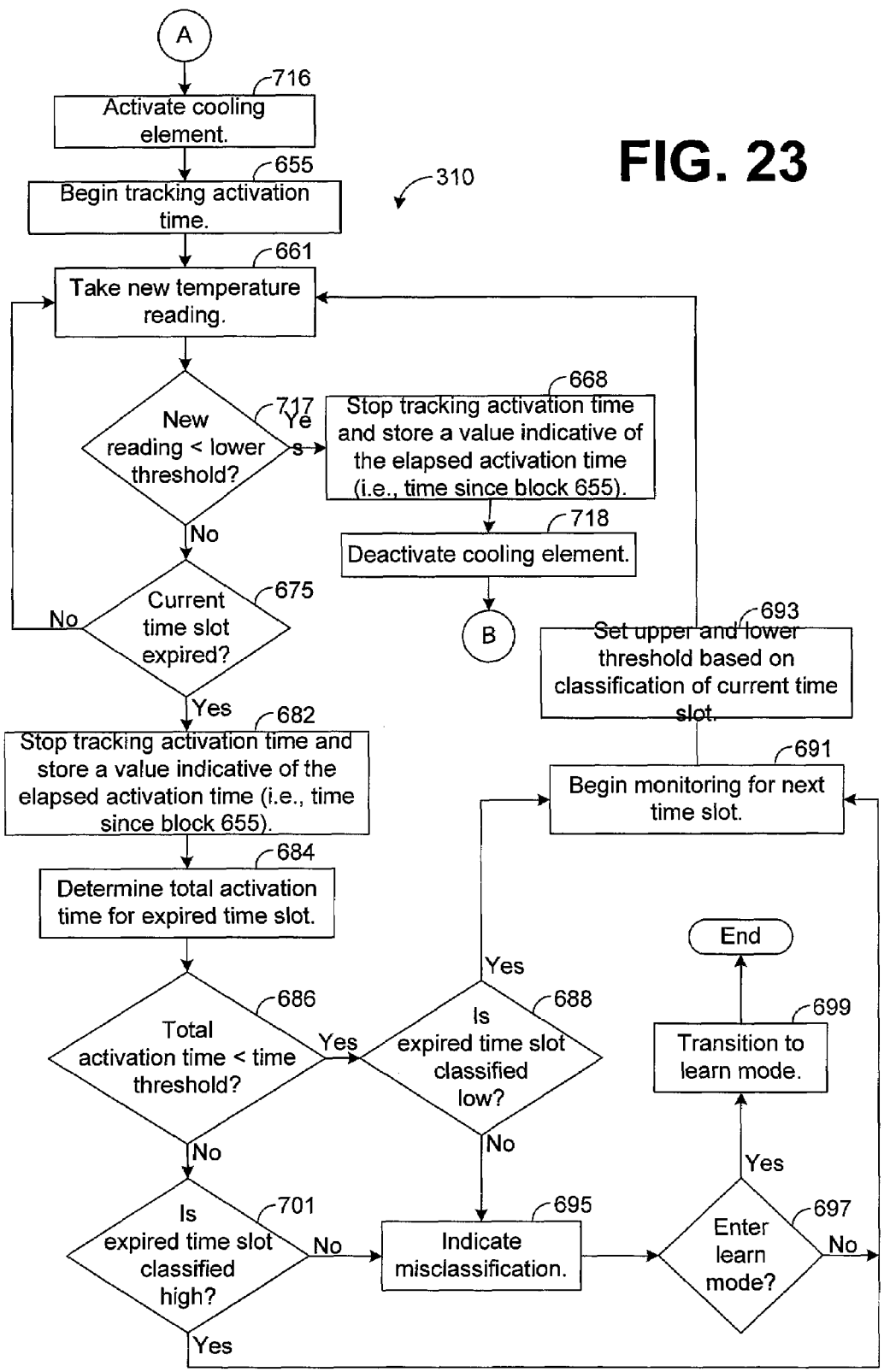
Figure 30:
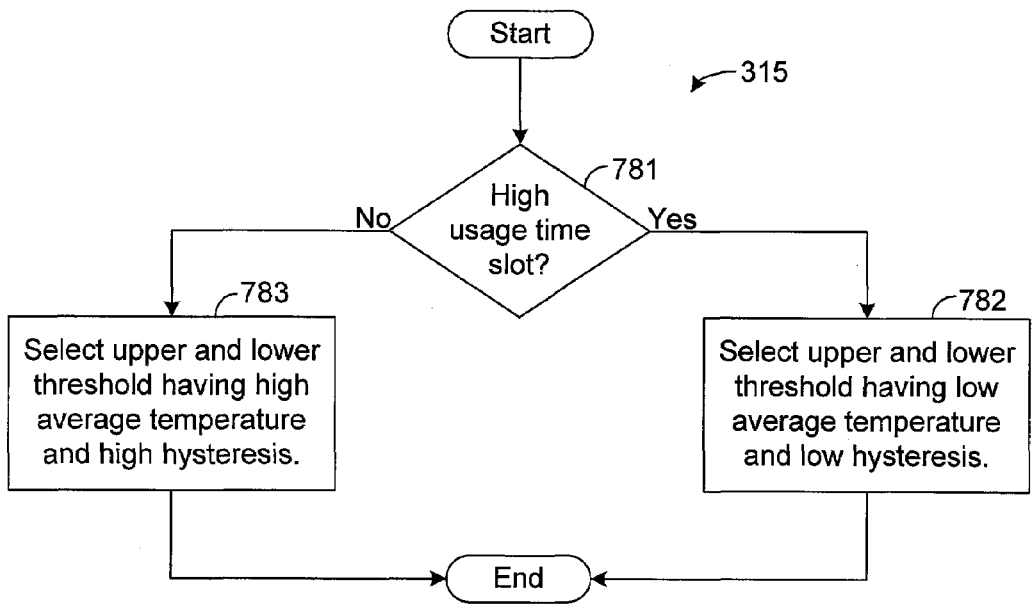
FIG. 30 is a flow chart illustrating an exemplary architecture and functionality of control logic, such as depicted in FIG. 12, in setting an upper threshold and a lower threshold for use during a current time slot.

Conversely, in implementing block 604 or 693 of FIGS. 22 and 23, the control logic 315 may select an upper threshold and a lower threshold having a low temperature average and a low hysteresis, as shown by blocks 781 and 782 of FIG. 30, if the current time slot being monitored is a high usage time slot, as indicated by the usage history 161. Further, the control logic 315 may select an upper threshold and a lower threshold having a high temperature average and a high hysteresis, as shown by blocks 781 and 783 of FIG. 30, if the current time slot being monitored is a low usage time slot, as indicated by the usage history 161. Of course, in other embodiments, the control logic 315 may be configured to only adjust the temperature average or the hysteresis based on the classification of the current time slot, if desired.

Note that the control logic 115 and/or 315 may also change the hysteresis for time slots of the same classification. For example, two time slots may both be classified as high water usage time slots. Nevertheless, during the learn mode, one of the time slots experience a higher amount of water usage than the other, and the parameters used to classify time slots (e.g., total activation times of temperature control elements 25 or 305, temperature change rates, absolute temperatures, etc.) may be a basis on which the control logic 115 and/or 315 provides different hysteresis for the two time slots.

As an example, assume that it is desirable to maintain the temperature within the tank at approximately 140 degrees Fahrenheit for high water usage time slots and that the time slots are classified based on total activation times of one or more temperature control elements 25 or 305, as described above. The control logic 115 or 315, for one high usage time slot, may be configured to activate and deactivate one or more temperature control elements 25 or 305 when the tank's water respectively falls below and exceeds 135 degrees Fahrenheit and 145 degrees Fahrenheit. However, another high usage time slot may be associated with a higher total activation time measured during the learn mode. Thus, it may be desirable to provide a smaller hysteresis effect for the foregoing time slot, and the control logic 115 or 315 may be configured to control the activation and deactivation of the temperature control element 25 or 305 via different thresholds. For example, to provide a smaller hysteresis effect, the control logic 115 or 315 may be configured to activate and deactivate one or more temperature control elements 25 or 305 within the tank 17 when the tank's water falls below and exceeds 138 degrees Fahrenheit and 141 degrees Fahrenheit.

In another example, absolute temperatures or temperature change rates sensed by the temperature sensor 152 may provide a basis for controlling or setting the hysteresis. In this regard, during a time slot of exceptionally high water use, the temperature of the water within the tank 17 of the system 100 may fall to an undesirably low level even though the time slot may be classified as a high usage time slot and, therefore, be associated with relatively high temperature thresholds for activating and deactivating the temperature control element 25 or 305. Thus, it may be particularly desirable to utilize a smaller hysteresis effect for such a time slot in an effort to keep the water temperature from falling to such an undesirable level for future occurrences of the time slot.

Moreover, if the control logic 115 determines that, during a particular time slot, the temperature of the water fell below a specified threshold or that the temperature change rate exceeded a specified threshold, the control logic 115 may be configured to set the temperature thresholds for future occurrences of the particular time slot such that a particularly small hysteresis is realized for the time slot. By using such thresholds to control a heating element 25, the control logic 115 is likely to activate the heating element 25 more quickly in response to a high usage event occurring during the time slot, thereby helping to prevent the water temperature from falling as far when the expected high usage event occurs.

Note that various other methodologies for selecting a desired hysteresis bounds for activating and deactivating a temperature control element 25 or 305 during a particular time period or time slot are possible without departing from the principles of the present invention.

Multiple Temperature Control Elements

It should be noted that multiple temperature control elements 25 or 305 may be employed within a single tank 17, particularly if the tank 17 is relatively large requiring significant activation of the temperature control elements over time. A single controller 110 or 310 may be used to control each of the temperature control elements 25 or 305 according to techniques similar to those described hereinabove, or multiple controllers 110 or 310 may be used to control different ones of the temperature control elements 25 and 305 according to techniques similar to those described hereinabove. In this regard, methodologies similar to those described hereinabove may be used to determine when to activate and deactivate the temperature control elements 25 and 305.

When a controller 110 or 310 determines that activation of a temperature control element 25 or 305 is desirable according to the techniques described hereinabove, the controller 110 or 310 may activate only one of the temperature control elements 25 or 305 within the tank 17 or may activate a plurality of the temperature control elements 25 or 305 within the tank 17. Note that for determining water usage history for a tank 17, the controller 110 or 310 preferably sums the activation times of all the temperature control elements 25 or 305 within the tank for each relevant time period. For example, to determine the total activation time of a time slot for a tank 17 within the heating system 100, the controller 110 preferably sums the activation times, for the time slot, of each heating element 25 within the tank 17. Further, to determine the total activation time of a time slot for a tank 17 within the cooling system 300, the controller 310 preferably sums the activation times, for the time slot, of each cooling element 305 within the tank 17.

Figure 31:
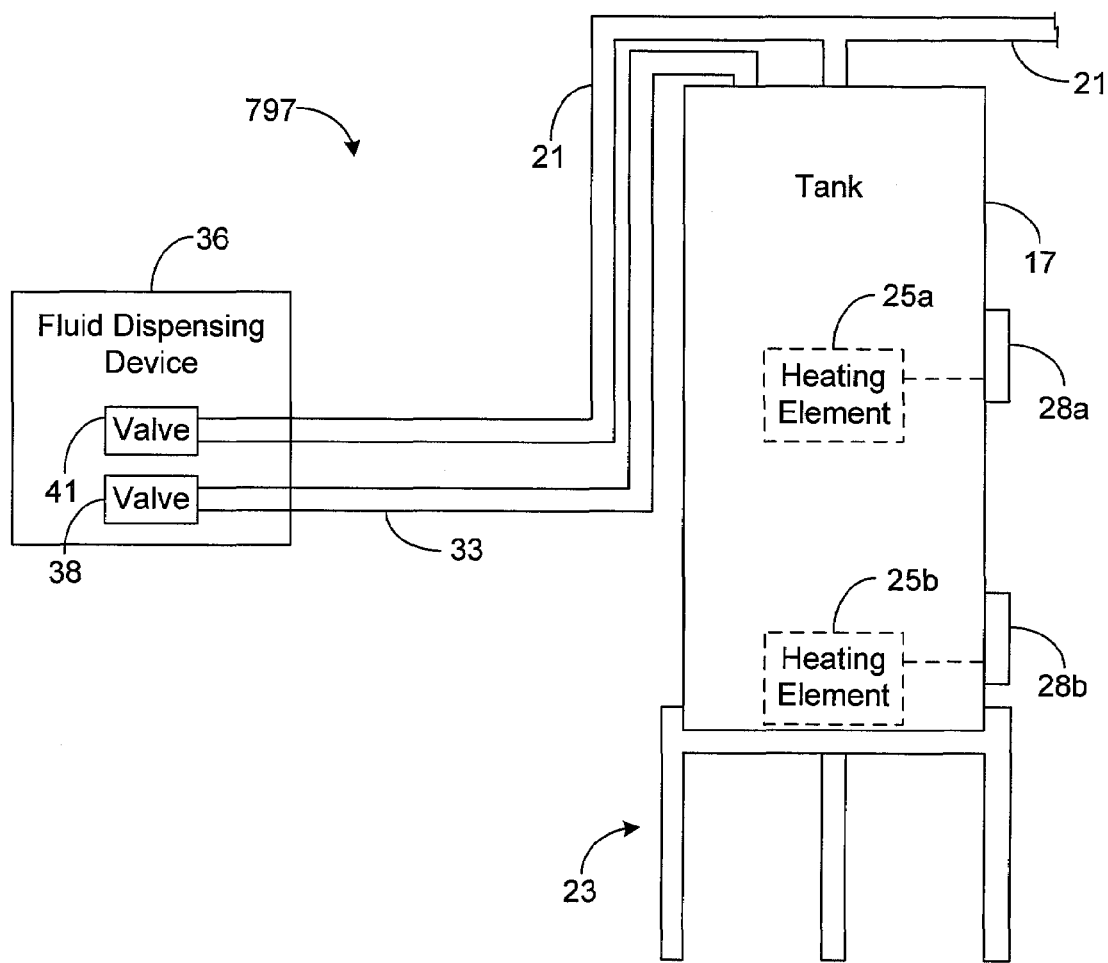
FIG. 31 is a block diagram illustrating a conventional water heating system employing multiple heating elements in accordance with the prior art.

Note that it is possible for conventional heating and cooling systems employing multiple temperature control elements and controllers to be retrofitted with one or more controllers in accordance with the present invention. As an example, refer to FIG. 31, which depicts a conventional heating system 797 having multiple heating elements 25a and 25b, each of which is controlled via a different conventional controller 28a or 28b. Both controllers 28a and 28b may be removed and replaced with a controller 110 (FIG. 6) configured in accordance with the present invention. Such a controller 110 may be used to control both heating elements 25a and 25b, or each of the heating elements 25a and 25b may be controlled by a different one of a plurality of controllers 110 that are added to the system 797.

Figure 32:
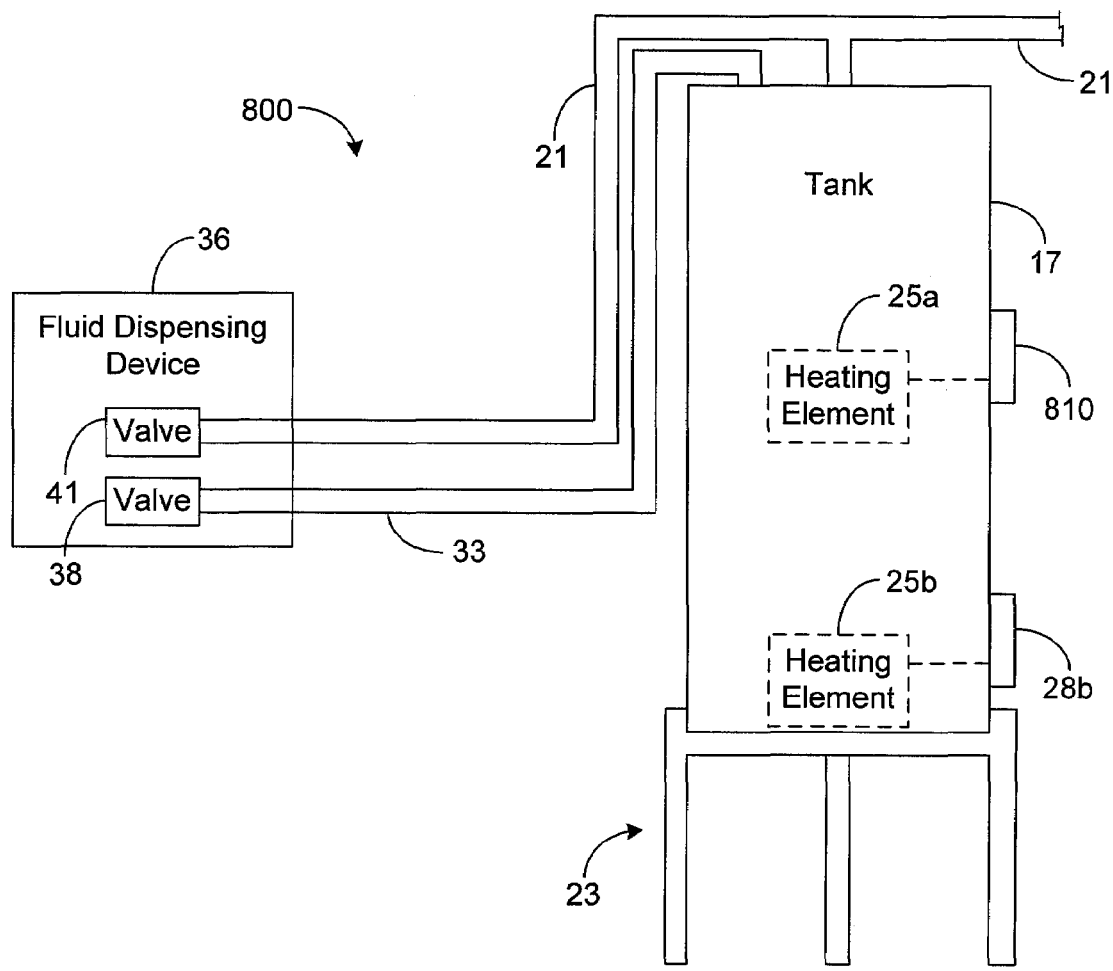
FIG. 32 is a block diagram illustrating a liquid heating system employing multiple heating elements in accordance with an exemplary embodiment of the present invention.

In one exemplary embodiment, one of the controllers 28a or 28b may be removed and replaced with a controller, and the other controller 28a or 28b may be allowed to remain. FIG. 32 depicts a system 800 that is constructed by removing one of the controllers 28a of FIG. 31 and replacing it with a controller 810 configured to operate in accordance with the principles of the present invention. In this regard, the controller 810 may control one of the heating elements 25a according to the techniques previously described hereinabove, and the controller 28b may control the other heating element 25b.

Figure 33:
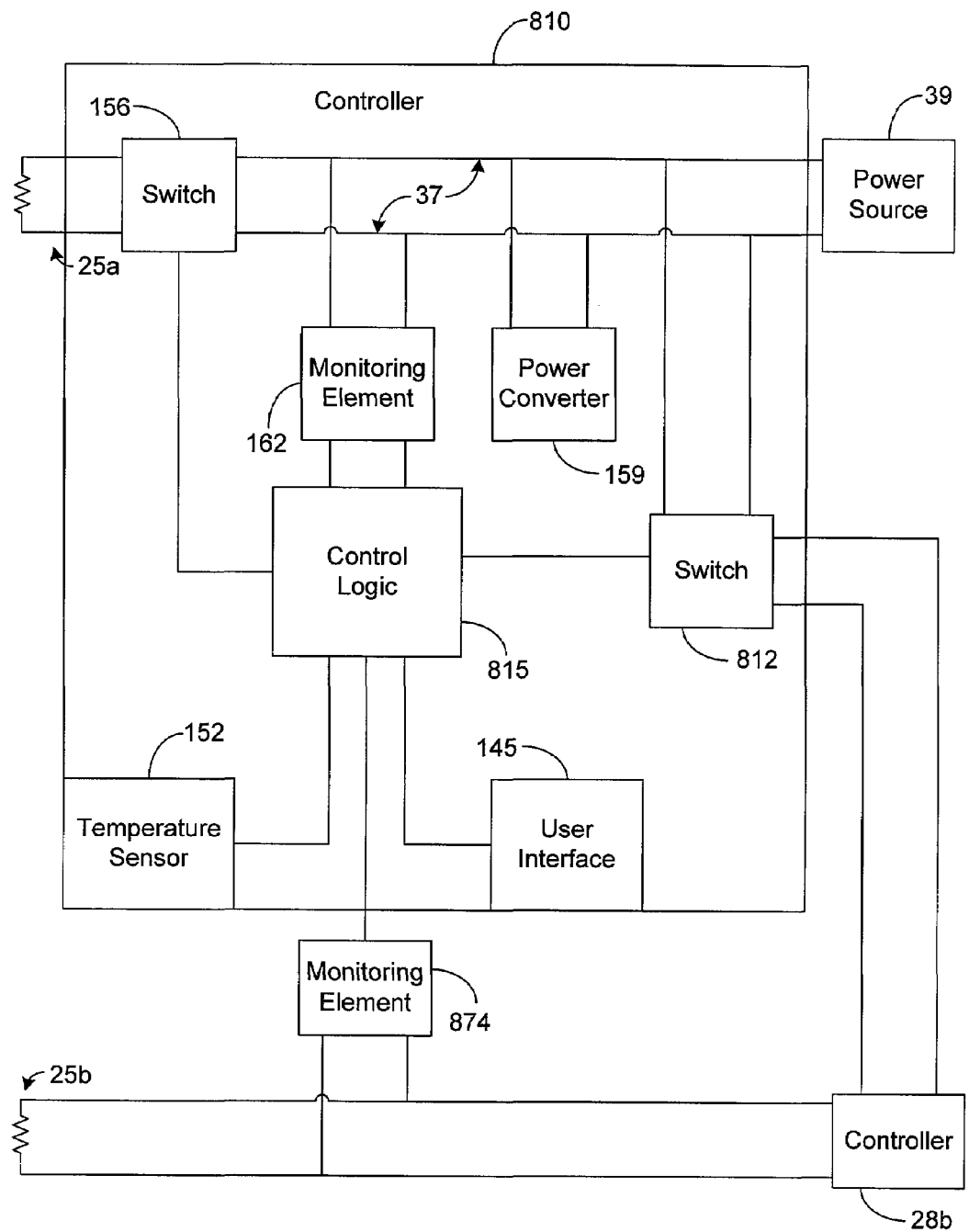
FIG. 33 is a block diagram illustrating a more detailed view of a controller depicted in FIG. 32.

In addition, the controller 810 of FIG. 32 may be configured to control the operation of the heating element 25b that is also controlled by conventional controller 28b. FIG. 33 depicts an exemplary configuration of the controller 810 for such an embodiment. As can be seen by comparing FIG. 33 to FIG. 6, the controller 810 of FIG. 31 may be similar to the controller 110 of FIG. 6. Indeed, the control logic 815 of the controller 810 may control the operation of the heating element 25a via the switch 156 via techniques previously described hereinabove. Further, the controller 810 preferably also comprises another switch 812 used by the control logic 815 to control the operational state of the switch 25b. In this regard, rather than connecting the power source 39 directly to the controller 28b, the power source 39 is connected to the controller 28b through the switch 812. Note that the control logic 815, similar to the control logic 115 of FIG. 6, may be implemented in hardware, software, or any combination thereof.

Moreover, if the heating element 25b is to be activated, the control logic 815 may transmit, to the switch 812, a control signal that causes the switch 812 to close thereby causing electrical current to flow from the power source 39 to the controller 28*b*. As previously described above, the conventional controller 28*b* is configured to activate the heating element 25*b* if the water temperature sensed by the controller 28*b* is below the threshold set for the controller 28*b*. In such a situation, the controller 28*b* allows electrical current from the power source 39 to pass through the controller 28*b* to the heating element 25*b* provided that the water temperature measured by the controller 28*b* is less than the threshold temperature utilized by the controller 28*b*. To deactivate the heating element 25*b*, the control logic 815 may transmit, to the switch 812, a control signal that causes the switch 812 to open thereby preventing electrical current from flowing to the heating element 25*b* from the power source 39. In such a situation, the heating element 25*b* is in a deactivation state.

Note that there are various methodologies that may be employed by the controller 810 to control the activation state of the heating elements 25*a* and 25*b*. For example, when the control logic 815 determines that the temperature of the water within the tank 17 has fallen below a threshold such that, according to the techniques described herein, the water is to be heated, the control logic 815 may attempt to activate both heating elements 25*a* and 25*b* by closing both switches 156 and 812 or may attempt to selectively activate only one heating element 25*a* or 25*b* by closing only one of the switches 156 or 812. Further, when the control logic 815 determines that the temperature of the water within the tank 17 has exceeded a threshold such that, according to the techniques described herein, heating of the water is no longer desirable, the control logic 815 preferably ensures that both heating elements 25*a* and 25*b* are deactivated by ensuring that both switches 156 and 812 are open.

Also, in another embodiment, the control logic 815 may attempt to selectively activate one heating element 25*a* or 25*b* when the temperature of the water, as sensed by one temperature sensor 152, is within one temperature range, and the control logic 815 may attempt to activate both heating elements 25*a* and 25*b* when the temperature of the water is within another temperature range. For example, if the water temperature is above a first threshold (e.g., 150 degrees Fahrenheit), the control logic 815 may be configured to ensure that both heating elements 25*a* and 25*b* are deactivated. However, if the water temperature is between two thresholds (e.g., 130 degrees Fahrenheit and 150 degrees Fahrenheit), then the control logic 815 may be configured to selectively activate only one heating element 25*a* or 25*b*. However, if the water temperature falls below the lower of the foregoing two thresholds (i.e., 130 degrees Fahrenheit), then the control logic 815 may be configured to attempt to activate both heating elements 25*a* and 25*b*.

Note that depending on the configuration of the system 800, simultaneous activation of both heating elements 25*a* and 25*b* may draw a significant amount of current causing a fire hazard or causing a circuit breaker (not shown) to trip. For such systems 800, it may be desirable for the control logic 815 to attempt to activate only one heating element 25*a* or 25*b* at a time. Furthermore, in other embodiments other numbers (e.g., three or more) of heating elements may be employed without departing from the principles of the present invention.

As shown by FIG. 33, a monitoring element 874 may be employed to enable the control logic 815 to verify activation of the heating element 25*b*. In this regard, in the configuration shown by FIG. 33, it is possible for the conventional controller 28*b* to prevent activation of the heating element 25*b* even when the switch 812 is placed in a closed state by the control logic 815. In such a situation, it is possible for the control logic 815 to misidentify the correct water usage pattern unless steps are taken to verify or ensure activation of the heating element 25*b*.

In this regard, if the activation of the heating element 25*b* is not verified or ensured, it is possible for the control logic 815 to place the switch 812 into a closed state and to monitor the operation of the system 800 assuming that the heating element 25*b* is in an activation state. If the controller 28*b*, in reality, prevents activation of the heating element 25*b* due to the temperature of the water not exceeding the temperature threshold being utilized by the controller 28*b*, then it is possible for the control logic 815 to miscalculate the total amount of actual activation time for the heating elements 25*a* and 25*b*. Thus, in some situations, the control logic 815 may mischaracterize a particular time period or time slot as a high usage time slot instead of properly characterizing the time slot as a low usage state. To prevent such an error, the control logic 812, after placing the switch 812 into a closed state, may verify that the monitoring element 874 actually detects current or a voltage before assuming that the heating element 25*b* is in an activation state.

Thus, when calculating the total activation time for a particular time period or time slot, the control logic 815 may sum the total amount of time that the switch 156 has been put in a closed state during the time period and the total amount of time that the switch 812 has been put in a closed state during the time period. These two sums may be added to produce a total activation time. The control logic 815 may then sum the total amount of time that the switch 812 was closed without current being detected by the monitoring element 874. This sum is indicative of the total time period that the control logic 815 attempted to activate the heating element 25*b*, but activation of the heating element 25*b* was prevented by the controller 28*b*. Moreover, the control logic 815 may subtract the foregoing sum from the total activation time to yield an actual total activation time that accurately reflects the total amount of time that both heating elements 25*a* and 25*b* were actually activated during the time period. Such techniques effectively add the time that the switch 812 is closed to the total activation time only if the control logic 815 is able to verify, via the monitoring element 834, that the heating element 25*b* is activated. Note that other techniques for ensuring an accurate total activation time calculation are possible.

It should be noted that the controller 810 may be configured to utilize a plurality of parameters to classify and monitor time slots. In this regard, the plurality of parameters may be utilized to provide a better indication of usage patterns as compared to the utilization of any single parameter. For example, assume that the conventional controller 28*b* is allowed to remain and to control the heating element 25*b*, as described above for the foregoing embodiment depicted by FIG. 32. Before classifying time slots, the controller 810 may monitor the state of various parameters to determine patterns indicative of idle time periods (i.e., time periods when no or extremely low water usage occurs), low usage time periods, and high usage time periods.

For example, the control logic 815 of the controller 810 may monitor the temperatures sensed by the controller's temperature sensor 152 and the activation states of upper and lower heating elements 25*a* and 25*b*. In this regard, idle time periods are likely to be characterized by relatively constant temperature change rates sensed by the sensor 152. Further, if similar thresholds are used to control both of the elements 25*a* and 25*b*, then idle time periods are also likely to be characterized by short activation times of the lower element 25*b* and no or extremely short activation times of the upper element 25*a*. Further, periods of low usage are likely to be characterized by more erratic temperature change rates and slightly longer activation times of the lower heating element 25b, and periods of high usage are likely to be characterized by a combination of high temperature change rates and comparatively long activation times of both heating elements 25a and 25b.

Moreover, the foregoing parameters may be monitored and patterns indicative of idle time periods may be automatically identified. In this regard, relatively constant temperature change rates may be a key factor to identify such time periods. This is particularly true in embodiments where the amount of thermal loss associated with the tank 17 may vary, for example, when the tank 17 is located outdoors or in a room, such as a garage, that is not insulated. In this regard, the amount of thermal loss may vary drastically depending on the time of day as atmospheric temperatures typically decrease at night or depending on the season of the year as atmospheric temperatures typically decrease in winter and increase in summer. Moreover, even though activation times of the elements 25a and/or 25b for idle time periods may vary due to atmospheric temperature fluctuations, a relatively constant temperature change rate over a short duration (e.g., less than approximately one hour) may indicate an idle time period regardless of the aforementioned atmospheric temperature fluctuations. Thus, the control logic 115 may detect idle time periods by detecting when the temperature change rate sensed by the sensor 152 remains substantially constant and when the activation times of the elements 25a and 25b are relatively low.

After detecting idle time periods, the behavior of the heating elements 25a and 25b may be monitored to identify low or high usage time periods. For example, normal activation times of the heating elements 25a and 25b for idle time periods may be determined for various times of the day once idle time periods for such times of the day have been identified. The control logic 115 may then use these various normal activation times as reference times to classify time slots such that the water usage classification determined by the control logic 115 accounts for thermal loss variations.

To better illustrate the foregoing, assume that the activation time of the lower heating element 25b, in general, increases substantially during the night as compared to the day due to more significant thermal losses at night. In such an example, the control logic 115 may mischaracterize a low usage pattern at night as a high usage pattern since the activation times of the heating elements 25a and 25b generally increase at night regardless of water use. Moreover, by identifying idle times during the day and at night, the control logic 115 may account for the foregoing effect.

As an example, when classifying a time slot during the day, the control logic 115 may compare the total activation time of the element 25b to the total activation time of the element 25b measured during a known idle time period occurring close to the time slot (i.e., occurring during the day). Depending on the difference, the control logic 115 may classify the time slot. In particular, the control logic 115 may classify the time slot as a high usage time slot only if the difference is relatively large (e.g., exceeds a threshold).

Further, when classifying a time slot at night, the control logic 115 may compare the total activation time of the element 25b for the time slot to the total activation time of the element 25b measured during a known idle time period occurring close to the time slot (i.e., occurring at night). Depending on the difference, the control logic 115 may classify the time slot. By using reference activation times from idle time slots occurring during or close to the same time of day as a particular time slot being classified, the difference between the total activation time of the particular time slot and the reference activation time is a better indication of actual water usage.

To better illustrate the foregoing, assume that the tank 17 experiences more significant thermal losses at night generally causing higher total activation times for the heating elements 25a and 25b for nighttime time slots as compared to daytime time slots. Prior to performing the learn mode depicted by FIGS. 15 and 16, the control logic 115 may monitor the temperature change rates sensed by the temperature sensor 152 in order to identify idle time slots. In this regard, the control logic 115 detects that a particular time slot is an idle time slot if the temperature change rate sensed by the sensor 152 remains relatively constant during the particular time slot. Further, by comparing sensed temperature change rates for the idle time slots, the control logic 115 may discover that daytime idle time slots have constant temperature rate changes that generally fall within a first temperature range and that nighttime idle time slots have constant temperature rate changes that generally fall within a second temperature range, which is significantly higher than the first temperature range.

Thus, upon entering the learn mode, the control logic 115 may select the activation time thresholds used in blocks 521 and 577 of FIGS. 15 and 16 based on the time of day of the time slot being monitored. For example, if the current time slot being monitored by the methodology depicted by FIGS. 15 and 16 occurs during the daytime (i.e., the time period previously associated with idle time slots having lower temperature change rates), the control logic 115 may utilize a first activation threshold in blocks 521 and 577. However, if the current time slot being monitored by the methodology depicted by FIGS. 15 and 16 occurs during the nighttime (i.e., the time period previously associated with idle time slots having higher temperature change rates), the control logic 115 may utilize a second activation threshold in blocks 521 and 577, where the second activation threshold is significantly higher than the first temperature threshold in order to account for the greater nighttime thermal losses associated with the tank 17. In particular, the first activation threshold may correspond to (e.g., be slightly higher than) the total activation threshold detected for a daytime idle time slot, and the second activation threshold may correspond to (e.g., be slightly higher than) the total activation threshold detected for a nighttime idle time slot.

It should be noted that similar techniques may be employed to account for varying thermal losses due to seasonal changes. In this regard, the control logic 115 may detect that idle time periods for the same time of day are associated with greater temperature change rates during the winter months and with lesser temperature change rates during the summer months. Thus, the control logic 115 may select the activation thresholds used in blocks 521 and 577 based on the time of year. More specifically, the control logic 115 may select lower total activation time thresholds for time slots in the summer months and higher total activation time thresholds for time slots in the winter months. Further, it should be emphasized that the foregoing techniques for accounting for thermal loss variations have been presented for illustrative purposes, and various other techniques for accounting for thermal loss variations are possible without departing from the principles of the present invention.

Indeed, it should be noted that idle time periods may be detected by monitoring parameters other than temperature change rates. For example, idle time periods may be detected by monitoring water temperature patterns or activation patterns of a temperature control element 25 or 305. In this regard, such water temperature patterns and activation patterns tend to repeat during idle time periods as the water is repetitively heated to an upper temperature threshold and then allowed to cool to a lower temperature threshold. The heating and cooling during idle time periods tend to be a respectively constant rates. However, in contrast, the heating and cooling during non-idle time periods tend to be erratic depending on the different patterns of water use. Such a phenomena tends to cause the water temperature and/or temperature control element activation patterns, during non-idle time periods, to be erratic as well. Thus, the control logic 115 or 315 may identify an idle time period by identifying when repetitive patterns for water temperature and/or temperature control element activations occur.

Figure 34:
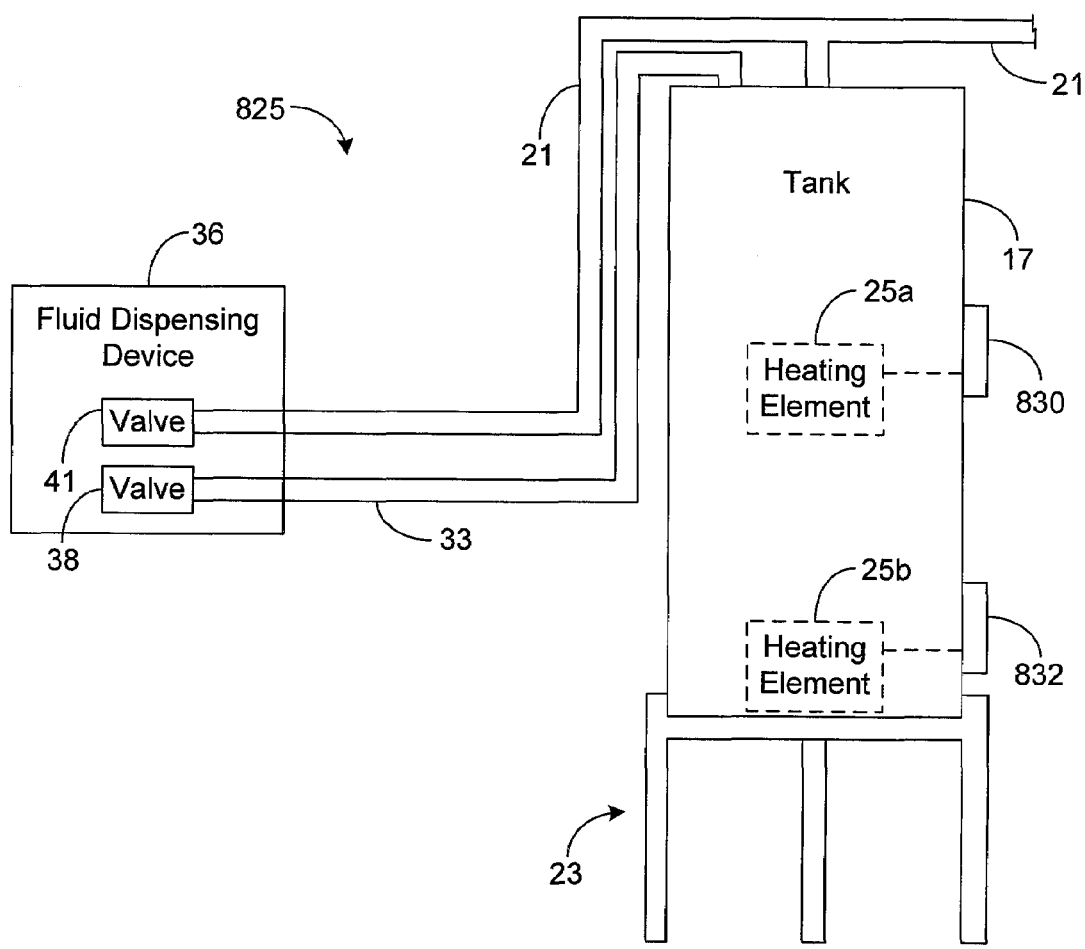
FIG. 34 is a block diagram illustrating a liquid heating system employing multiple heating elements in accordance with an exemplary embodiment of the present invention.

Turning now to another exemplary embodiment of the present invention, both of the conventional controllers 28a and 28b (FIG. 32) may be removed in order to form a liquid heating system 825, such as is depicted by FIG. 34. In particular, one of the conventional controllers 28a is replaced with a controller 830 in accordance with the present invention, and the other conventional controller 28b is replaced with a control module 832, which will be described in more detail hereinbelow. Note that the control module 832 may reside on a base 51 (FIGS. 8 and 9), which can be easily connected to the tank 17 according to techniques described hereinabove in the context of connecting controller 110 to the tank 17 via the base 51.

As shown by FIG. 33, the controller 830 may be similar to the controller 810 of FIG. 33. Indeed, the controller 830 may comprise control logic 835 for controlling the operation of the heating elements 25a and 25b. The control logic 835 may be implemented in hardware, software, or any combination thereof.

Figure 35:
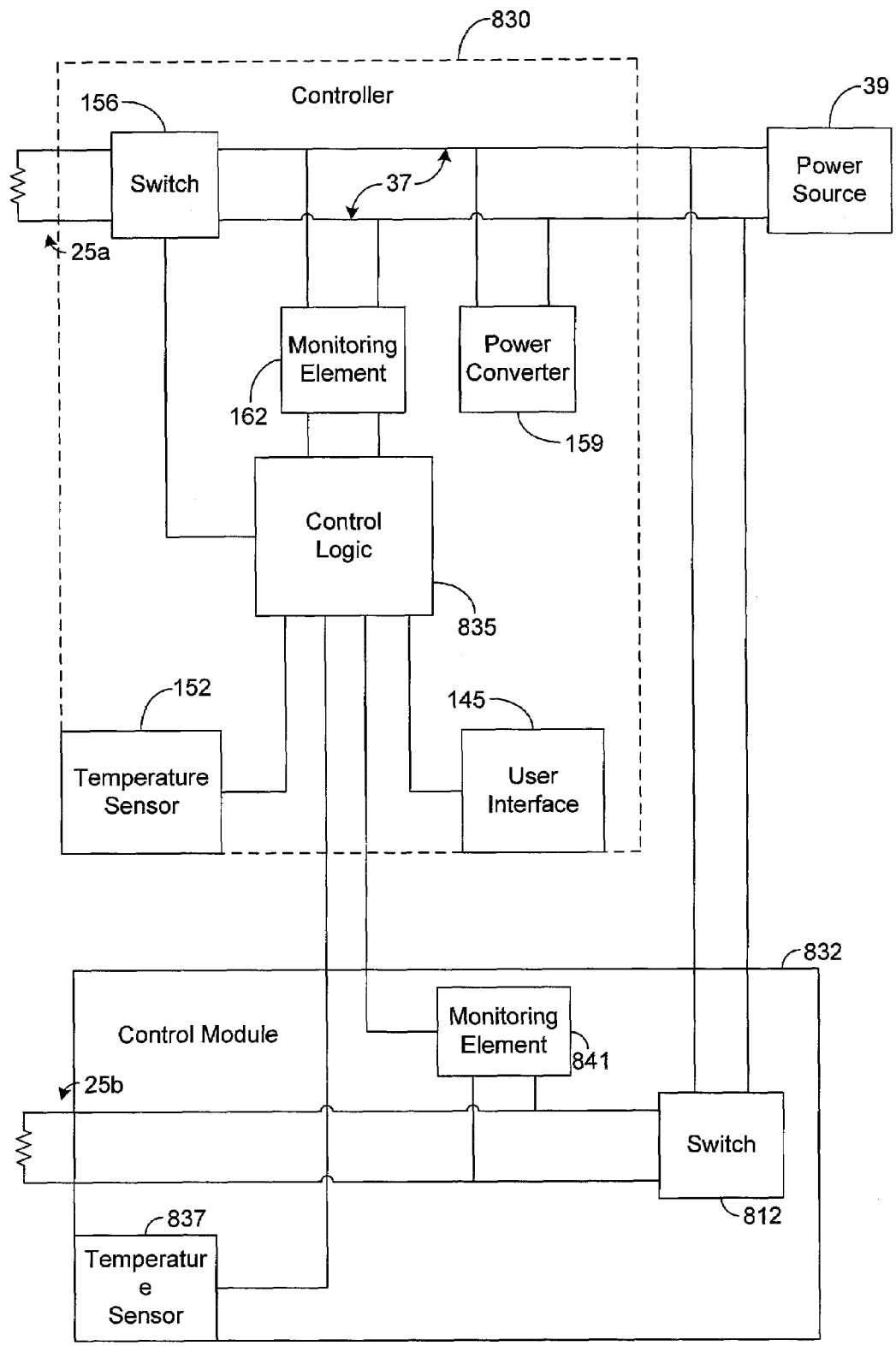
FIG. 35 is a block diagram illustrating a more detailed view of a controller and a control module depicted in FIG. 34.

According to the techniques previously described hereinabove, the control logic 835 may activate and deactivate the heating elements 25a and 25b. In particular, the control logic 835 may be configured to control the state of the heating element 25a via switch 156 and may be configured to control the state of the heating element 25b via switch 812, which may reside within the controller 830 or may reside within the control module 832, as shown by FIG. 35. Further, the control logic 835 may determine whether to activate or deactivate the heating elements 25a and 25b according to the same or similar techniques used by the control logic 815 of FIG. 33.

As shown by FIG. 35, the control module 832 may comprise a temperature sensor 837 configured to detect water temperature at or close to the proximity of the heating element 25b. The control logic 835 may be configured to activate and deactivate the heating element 25a based on the temperatures sensed by the temperature sensor 152, and the control logic 835 may be configured to activate and deactivate the heating element 25b based on the temperatures sensed by the temperature sensor 837. In an alternative embodiment, the control logic 835 may be configured to activate and deactivate both of the heating elements 25a and 25b based on the temperatures sensed by only one of the temperature sensors 152 or 837.

Furthermore, the control module 832 may also comprise a monitoring element 841 configured to detect when failure of the control element 25b is imminent according to techniques previously described hereinabove. When an imminent failure of the control element 25b is detected, the control logic 835 may be configured to convey a warning to a user via user interface 145.

Note that accounting for thermal loss variations may be simplified when temperature sensors are located close to both the bottom and top of the tank 17. In this regard, the temperature change rate of both upper and lower sensors 152 and 837 increases for time periods associated with higher thermal losses and decreases for time periods associated with lower thermal losses. Thus, by simply comparing the temperature change rate (i.e., the rate that the sensed temperature changes over a given time period) of an upper sensor 152 and a lower temperature sensor 837, the control logic 835 can determine water usage.

In this regard, similar temperature change rates, as sensed by the upper sensor 152 and the lower sensor 837, indicate an idle time period. Slightly different temperature change rates, as sensed by the upper sensor 152 and the lower sensor 837, indicate low water usage, and significantly different temperature change rates, as sensed by the upper sensor 152 and the lower sensor 837, indicate high water usage. Thus, the control logic 835 may be configured to determine the difference between temperature change rates detected by the upper sensor 152 and the lower sensor 837 and to classify a current time slot based on this difference. In this regard, if the difference exceeds a particular threshold, the control logic 835 may classify the time slot as a high water usage time slot. Note that multiple temperature sensors may be used to classify time slots in the foregoing manner regardless of whether multiple heating elements 25a and 25b are employed.

Figure 36:
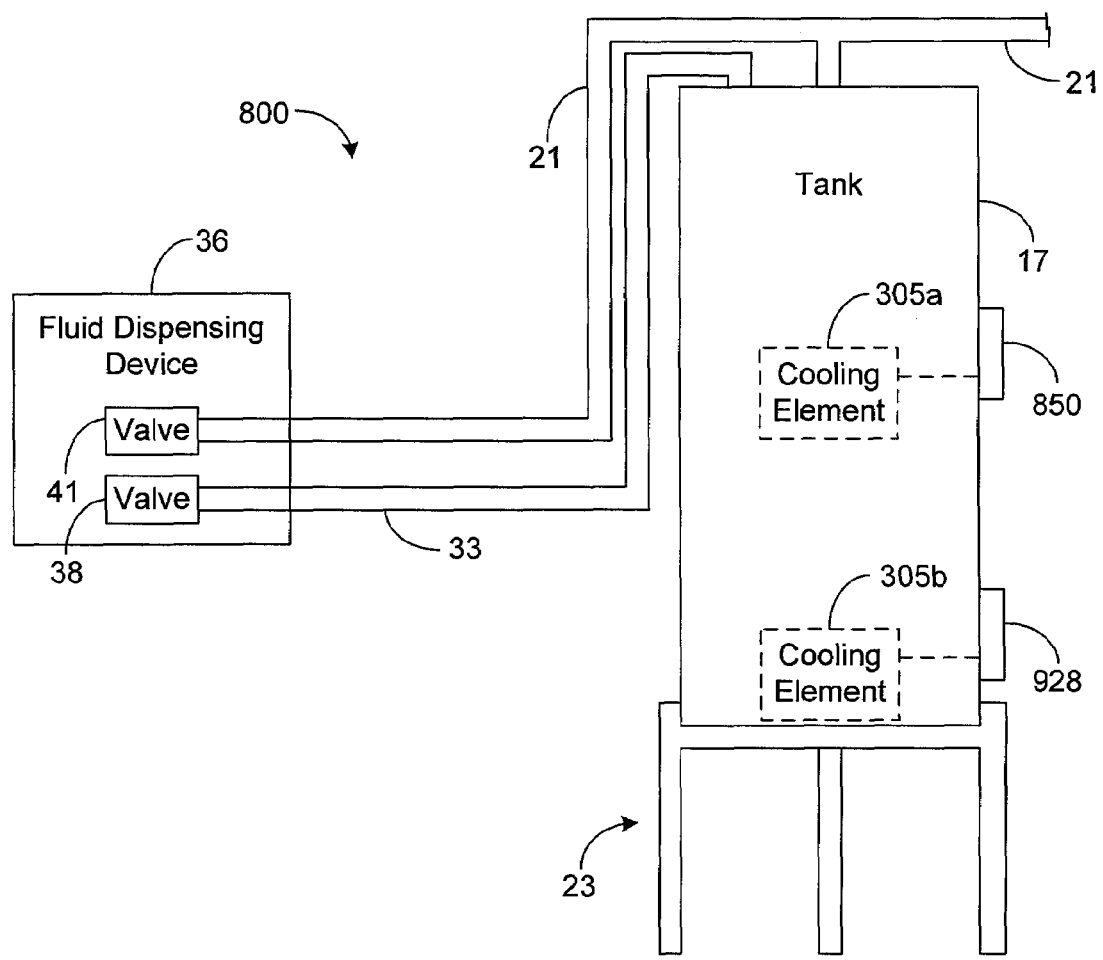
FIG. 36 is a block diagram illustrating a liquid cooling system employing multiple heating elements in accordance with an exemplary embodiment of the present invention.

It should be noted that techniques similar to those described above for controlling multiple heating elements 25a and 25b may be employed to control multiple cooling elements 305a and 305b, such as is depicted by FIG. 36. In this regard, a single controller 850 may be used to control multiple cooling elements 305a and 305b, or multiple controllers 850 may be used to control different ones of multiple cooling elements 305a and 305b. Further, if a conventional cooling system is retrofitted to include both a controller 850 in accordance with the present invention and a conventional controller 928, then an exemplary configuration of the controller 850 may be similar to the previously described configuration of controller 810 for system 800, as can be seen by comparing FIGS. 33 and 37.

In particular, the control logic 852, which may be implemented in hardware, software, or any combination thereof, may control activation and deactivation of the cooling element 305b by controlling the state of a switch 932 similar to how the control logic 815 (FIG. 33) controls the operation of the heating element 25b via switch 812. Further, the controller 850 may employ a monitoring element 934, similar to the monitoring element 874 of FIG. 33, in order to enable the control logic 852 to verify that the cooling element 305b is actually activated when the switch 932 is closed. The control logic 852 then adds the time that the switch 932 is closed to the total activation time associated with a particular time period or slot only if the control logic 850 is able to verify, via the monitoring element 934, that the cooling element 305b is activated. Various techniques for achieving the foregoing are possible such as, for example, summing the amount of time that the switches 156 and 812 are closed during the time period and then reducing the summed amount by the amount of time that the switch 932 is closed without the cooling element 305b being activated. Further, the techniques described above for accounting for thermal loss variations may be employed within a liquid cooling system in order to account for thermal loss variations associated with the tank 17 of the cooling system.

In addition, for embodiments employing multiple temperature control elements 25 or 305, it may be desirable to selectively activate the temperature control elements 25 or 305 such that the total activation of each elements 25 or 305, over time, is substantially equal. In this regard, most temperature control elements 25 or 305 have a finite operation life that is generally decreased as the elements 25 or 305 are used. Thus, the more a temperature control element 25 or 305 is activated, the sooner the element 25 or 305 is likely to fail. Moreover, by ensuring that each temperature control element 25 or 305 within a particular tank 17 is activated for substantially the same amount of time, the amount of time before failure of any one of the elements 25 or 305 can be increased.

Therefore, if multiple heating elements 25a and 25b are employed within a tank 17, the logic 815 (FIG. 33) preferably maintains a running sum of the total life-time activation of each heating element 25a and 25b. The logic 815 also attempts to selectively activate the heating elements 25a and 25b such that the total life-time activation of each heating element 25a and 25b remains substantially equal to the total life-time activation of the other heating elements 25a and 25b. Further, if multiple cooling elements 305a and 305b are employed within a particular tank 17, the logic 852 (FIG. 37) preferably maintains a running sum of the total life-time activation of each cooling element 305a and 305b. The logic 852 also attempts to selectively activate the cooling elements 305a and 305b such that the total lifetime activation of each cooling element 305a and 305b remains substantially equal to the total lifetime activation of the other cooling elements 305a and 305b.

Figure 38:
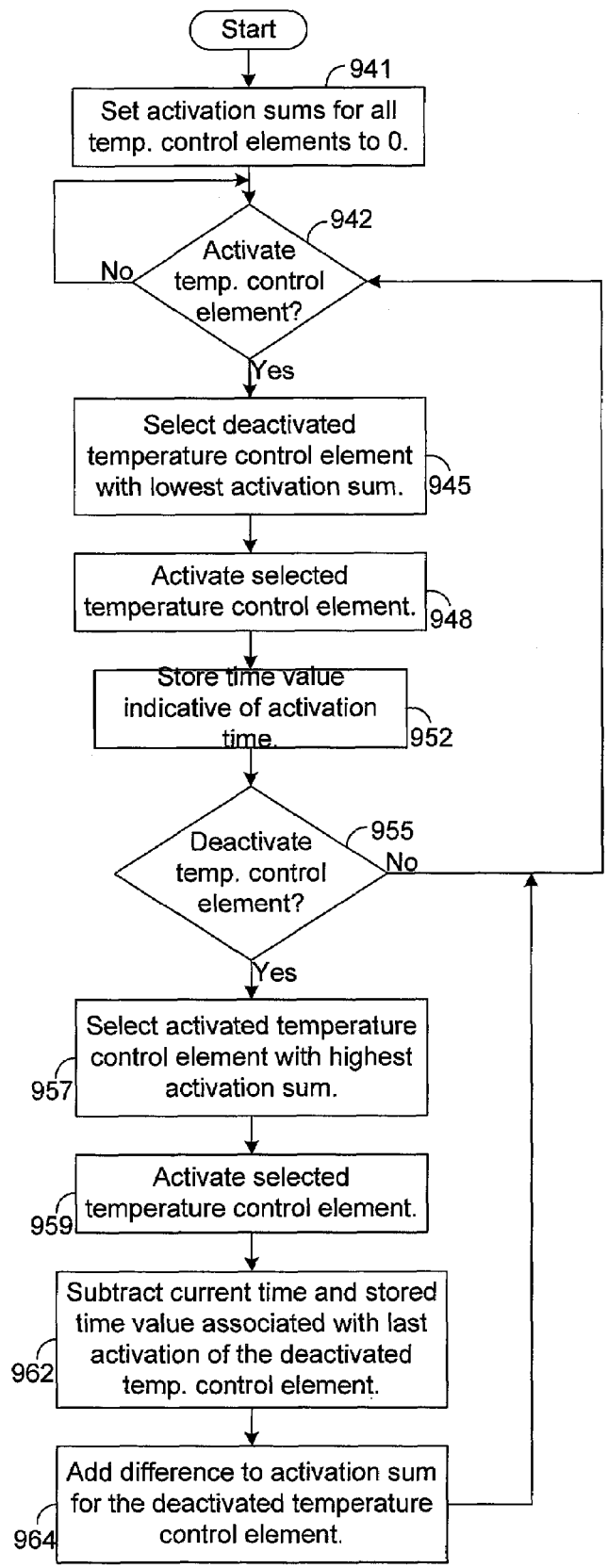
FIG. 38 is a flow chart illustrating an exemplary architecture and functionality of control logic, such as is depicted in FIGS. 36 and 37.

There are various techniques that may be employed by the control logic 815 and 852 to ensure that the total lifetime activation of the temperature control elements within a particular tank 17 remain substantially equal. FIG. 38 depicts an exemplary methodology to ensure that the total lifetime activation of the temperature control elements within a particular tank 17 remain substantially equal. FIG. 38 will now be described in more detail assuming that the control logic 815 is implementing the methodology of FIG. 33 in an effort to ensure that the total life-time activation of multiple heating elements 25a and 25b within the tank 17 remain substantially equal. However, it should be noted that the same methodology may be implemented by the control logic 852 to ensure that the total lifetime activation of multiple cooling elements 305a and 305b within a tank 17 remain substantially equal.

In order to ensure that the total life-time activation of multiple heating elements 25a and 25b within a tank 17 remain substantially equal, the control logic 815, for each heating element 25a and 25b, preferably maintains an activation sum indicative of the element's total life-time activation. As shown by block 941 of FIG. 38, the control logic 815 initially sets the value of the activation sum for each heating element 25a or 25b to zero. After initializing the activation sums, the control logic 815 preferably monitors the temperature of the water within the tank 17 and determines when heating elements 25a and 25b are to be activated. Note that the control logic 815 may employ techniques similar to those described hereinabove for determining whether the heating elements 25a and 25b and are to be activated. That is, the control logic 815 may determine to selectively activate and deactivate heating elements 25a and 25b based on a usage history 161 of the heating elements 25a and 25b.

Indeed, the methodology, depicted by FIGS. 15-19 may be employed to determine when the heating elements 25a and 25b are to be activated. In this regard, the control logic may activate one of the heating elements when performing blocks 547 and 655 and may deactivate the heating elements 25a and 25b when performing blocks 561 and 671. However, in other embodiments, other techniques may be employed to determine when heating elements 25a and 25b are to be activated and deactivated. In fact, conventional techniques and/or techniques other than those described hereinabove may be employed by the logic 815 to determine when heating elements 25a and 25b are to be activated and deactivated. As an example, one or more conventional controllers may determine when the water is to be heated, and in response to an indication from such a controller that the water is to be heated, the control logic 815 may select which of the heating elements 25a and 25b are to be activated according to the techniques described below.

In any event, when the control logic 815 determines that the water within the tank 17 is to be heated (e.g., when the temperature of the water falls below a temperature threshold indicating that heating or additional heating of the water is to be initiated), the logic 815 preferably selects, for activation, the heating element 25a or 25b having the lowest activation sum, as shown by blocks 942 and 945. If more than one heating element 25a or 25b has the same lowest activation sum, then the control logic 815 may randomly select one such heating element 25a or 25b or may select one of the heating elements 25a or 25b with the lowest activation sum based on any known or future-developed algorithm.

As shown by blocks 948 and 952, the control logic 815 activates the selected heating element 25a or 25b and stores a time value indicative of the current time, as indicated via clock 134 (FIG. 7), when the selected heating element 25a or 25b activated in block 948. As will be described in more detail hereafter, this stored value will be used to update the activation sum of the activated heating element 25a or 25b.

When the control logic 815 determines heating of the water within the tank 17 is to be stopped or reduced (e.g., when the temperature of the water exceeds a threshold indicating that heating of the water is to be stopped or reduced), the logic 815 preferably selects, for deactivation, the activated heating element 25a or 25b having the highest activation sum, as shown by blocks 955 and 957. If more than one activated heating element 25a or 25b has the highest activation sum, then the control logic 815 may randomly select one such heating element 25a or 25b or may select one of the activated heating elements 25a or 25b with the highest activation sum based on any known or future-developed algorithm. As shown by block 959, the control logic 815 deactivates the selected heating element 25a or 25b. The control logic 815 then retrieves, in block 962, the time value that was stored when the deactivated heating element 25a or 25b was previously activated and subtracts this retrieved time value from the current time, as indicated via clock 134 (FIG. 7), thereby determining the amount of time that the heating element 25a or 25b was activated. In block 964, the control logic 815 adds the difference (i.e., the result of block 962) to the activation sum of the deactivated element 25a or 25b such that its activation sum accurately reflects the total life-time activation time for the element 25a or 25b.

Figure 37:
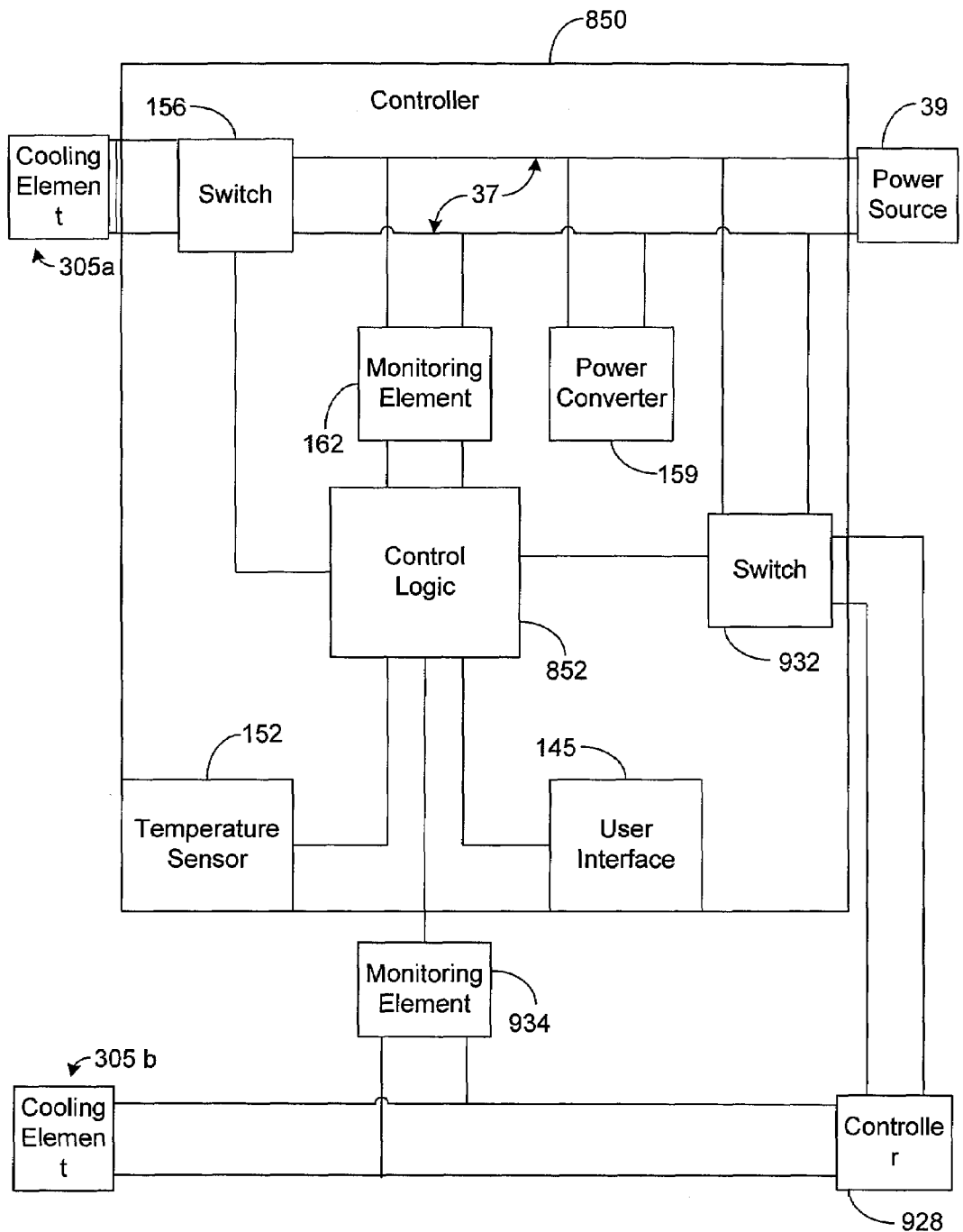
FIG. 37 is a block diagram illustrating a more detailed view of a controller depicted in FIG. 36.

Note that, when one of the heating elements 25a or 25b fails, the other heating elements 25a or 25b are likely to be close to failure as all of the heating elements 25a or 25b should have approximately the same total life-time activation. Thus, when one of the heating elements 25a or 25b fails, all of the heating elements 25a or 25b, including the ones that have yet to fail, are preferably replaced. Upon replacement, the methodology of FIG. 37 is preferably repeated such that the activation sums associated with the replaced heating elements 25a or 25b are re-initialized to zero via implementation of block 941.

In addition, it should be noted that FIG. 32 depicts an exemplary methodology for ensuring that each of the temperature control elements 25 or 305 within the same tank 17 is activated for substantially the same amount of time over the life of the temperature control elements 25 or 305. Other methodologies for achieving the same or similar effects are possible.

Although the present invention has been described above as a employing a tank 17 to hold and dispense water, it should be noted that other types of liquids may be held and dispensed by the tank 17. Further, the temperature of such liquids may be controlled according to the same techniques described hereinabove for controlling the temperature of water within the tank 17.

In addition, it should be noted that it is not necessary for a temperature control element 25 or 305 to be completely turned off when deactivated. In this regard, a heating element 25 is "deactivated" when the state of the element 25 is controlled such that the amount of heat provided by the element 25 is significantly reduced. Further, a cooling element 305 is "deactivated" when the state of the element 305 is controlled such that the amount of cooling provided by the element 305 is significantly reduced. Similarly, a heating element 25 is "activated" when the state of the element 25 is controlled such that the amount of heat provided by the element 25 is significantly increased, and a cooling element 305 is "activated" when the state of the element 305 is controlled such that the amount of cooling provided by the element 305 is significantly increased.

Moreover, the tank's water usage may be monitored via techniques other than those described hereinabove. For example, the tank's water usage may be monitored by tracking the amount of heating or cooling provided by the temperature control elements 25 or 305 within the tank 17. In this regard, rather than calculating total activation time of the heating elements 25, a value indicative of the total amount of heat provided by the heating elements 25 may be calculated for a particular time period in order to determine the water usage associated with the time period. In general, the more heat provided by the heating elements 25, the higher the water usage. Note that the amount of current provided to a heating element 25 may be monitored in order to determine a value indicative of an amount of heat generated by the heating element 25. Similarly, rather than calculating a total activation time of the cooling elements 305, a value indicative of the total amount of cooling provided by the cooling elements may be calculated for a particular time period in order to determine the water usage associated with the time period.

In another example, the amount of water drawn into or out of the tank 17 may be tracked in order to monitor the tank's water usage. In this regard, at least one sensor (not shown) for detecting the amount of water passing through each inlet of the tank 17 and/or at least one sensor (not shown) for detecting the amount of water passing through each outlet of the tank 17 may be employed to track water usage. Other techniques for monitoring water usage are possible in yet other embodiments.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A liquid heating system, comprising:
   a tank for storing a liquid;
   a first heating element mounted on the tank;
   a first controller configured to activate the first heating element if a temperature of the liquid within a first region of the tank falls below a threshold; and
   a second controller configured to enable or disable the first controller by controlling, based on a temperature of the liquid, whether electrical power is delivered to the first controller.

2. The system of claim 1, further comprising a second heating element mounted on the tank, wherein the second controller is configured to activate the second heating element if a temperature of a liquid within a second region of the tank falls below a threshold.

3. The system of claim 1, wherein the first controller comprises a temperature-based switch configured to control an activation state of the first heating element.

4. The system of claim 3, wherein the second controller comprises a temperature sensor and is configured to control whether the electrical power is delivered to the temperature-based switch based on the temperature sensor.

5. The system of claim 1, wherein the first controller comprises a first switch configured to control, based on the temperature of the liquid within the first region, whether electrical power is delivered to the first heating element.

6. The system of claim 5, wherein the second controller comprises a second switch coupled to the first switch.

7. A method for retrofitting an existing liquid heating system with a new controller, the existing liquid heating system having a first controller for controlling a first heating element mounted on a tank and a second controller for controlling a second heating element mounted on the tank, the first and second controllers mounted on the tank, the second controller having a temperature-based switch for controlling, based on a temperature of a liquid within the tank, whether electrical power is provided to the second heating element, the method comprising the steps of:
   mounting the new controller on the tank; and
   coupling the new controller to the second controller such that a switch within the new controller controls whether electrical power is delivered to the temperature-based switch.

8. The method of claim 7, further comprising the step of coupling the new controller to the first heating element.

9. The method of claim 8, further comprising the step of removing the first controller from the tank.

\* \* \* \* \*